United States Patent
Kubota et al.

(10) Patent No.: US 7,860,624 B2
(45) Date of Patent: Dec. 28, 2010

(54) VEHICULAR STEERING CONTROL APPARATUS

(75) Inventors: Masahiro Kubota, Yokohama (JP);
Hiroshi Mouri, Yokohama (JP);
Masayuki Watanabe, Kanagawa (JP);
Nami Horiguchi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1080 days.

(21) Appl. No.: 11/235,281

(22) Filed: Sep. 27, 2005

(65) Prior Publication Data
US 2006/0069481 A1 Mar. 30, 2006

(30) Foreign Application Priority Data
Sep. 27, 2004 (JP) ............... 2004-280340
Apr. 1, 2005 (JP) ............... 2005-106519

(51) Int. Cl.
*B62D 6/00* (2006.01)
*B62D 5/04* (2006.01)

(52) U.S. Cl. ............... 701/41; 701/1; 701/42; 701/43; 701/44; 180/443; 180/444; 180/445; 180/446

(58) Field of Classification Search ........ 701/1, 701/41–44; 180/443–446
See application file for complete search history.

(56) References Cited

U.S. PATENT DOCUMENTS

| | | | | |
|---|---|---|---|---|
| 5,482,129 A | * | 1/1996 | Shimizu | 180/446 |
| 5,698,956 A | * | 12/1997 | Nishino et al. | 318/432 |
| 5,992,557 A | * | 11/1999 | Nakamura et al. | 180/446 |
| 6,148,948 A | * | 11/2000 | Shimizu et al. | 180/446 |
| 6,152,254 A | * | 11/2000 | Phillips | 180/422 |
| 6,360,151 B1 | | 3/2002 | Suzuki et al. | |
| 6,751,538 B2 | * | 6/2004 | Endo | 701/41 |
| 2002/0056587 A1 | * | 5/2002 | Shibasaki et al. | 180/443 |
| 2003/0069676 A1 | * | 4/2003 | Kanda | 701/41 |
| 2003/0120404 A1 | * | 6/2003 | Endo | 701/41 |
| 2004/0206571 A1 | * | 10/2004 | Nishizaki et al. | 180/446 |
| 2007/0205041 A1 | * | 9/2007 | Nishizaki et al. | 180/446 |

FOREIGN PATENT DOCUMENTS

| | | |
|---|---|---|
| EP | 0 199 347 A1 | 10/1986 |
| JP | 08-332964 A | 12/1996 |
| JP | 3412579 B2 | 3/2003 |
| WO | WO-01/12492 A1 | 2/2001 |

* cited by examiner

*Primary Examiner*—Jack Keith
*Assistant Examiner*—Chuong P Nguyen
(74) *Attorney, Agent, or Firm*—Foley & Lardner LLP

(57) ABSTRACT

A vehicular steering control apparatus is comprised of a steering system of receiving a steering torque inputted by a driver, a torque control actuator connected to the steering system to produce an actuator torque relative to the steering torque and a steering controlling section connected to the torque actuator. The steering controlling section controls the torque control actuator and increases a phase delay of the actuator torque relative to the steering torque toward a neighborhood of 180° as the frequency of the inputted steering torque increases.

53 Claims, 60 Drawing Sheets

LATERAL G/STEERING TORQUE
FREQUENCY CHARACTERISTIC
OF CONVENTIONAL EXAMPLE

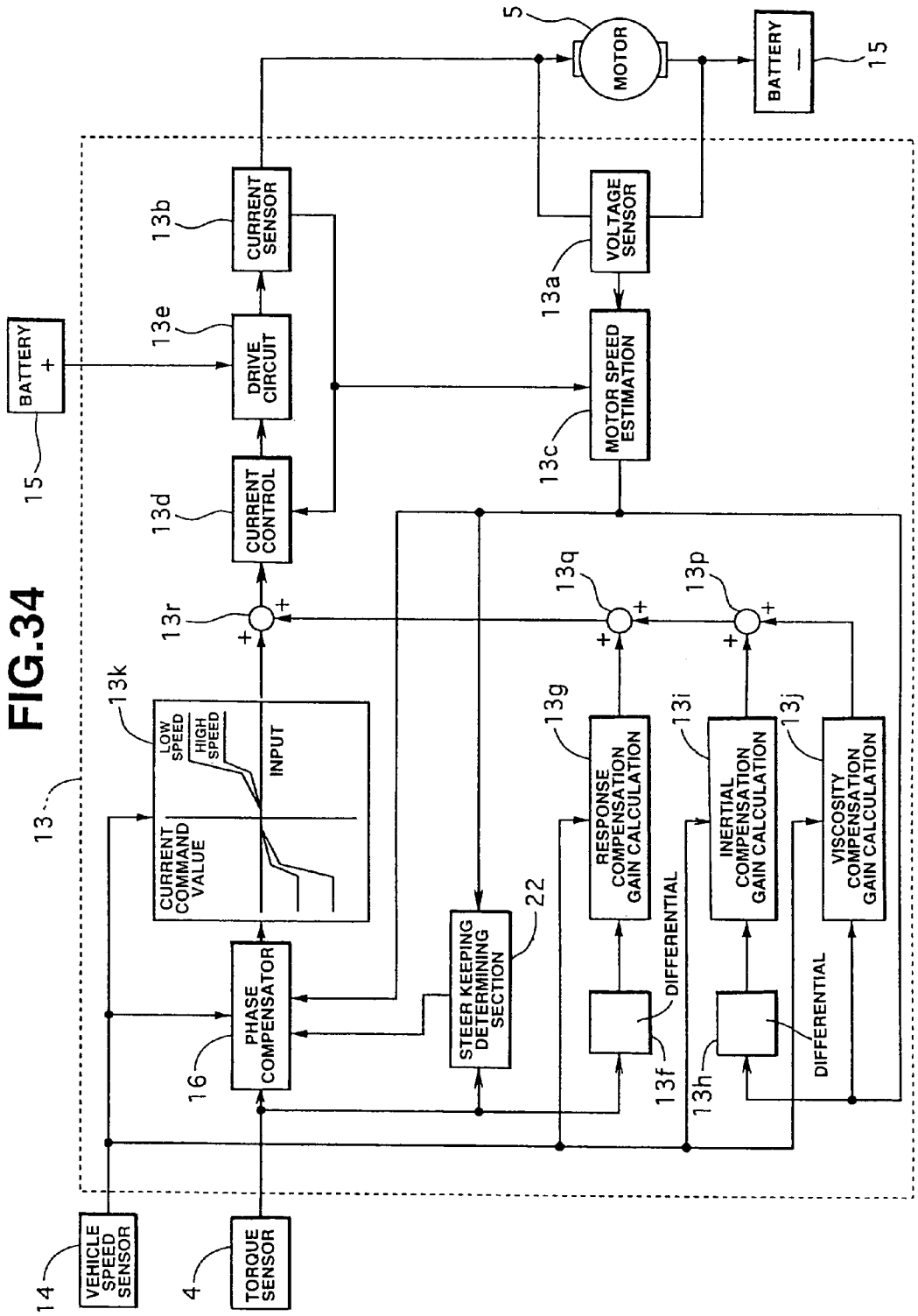

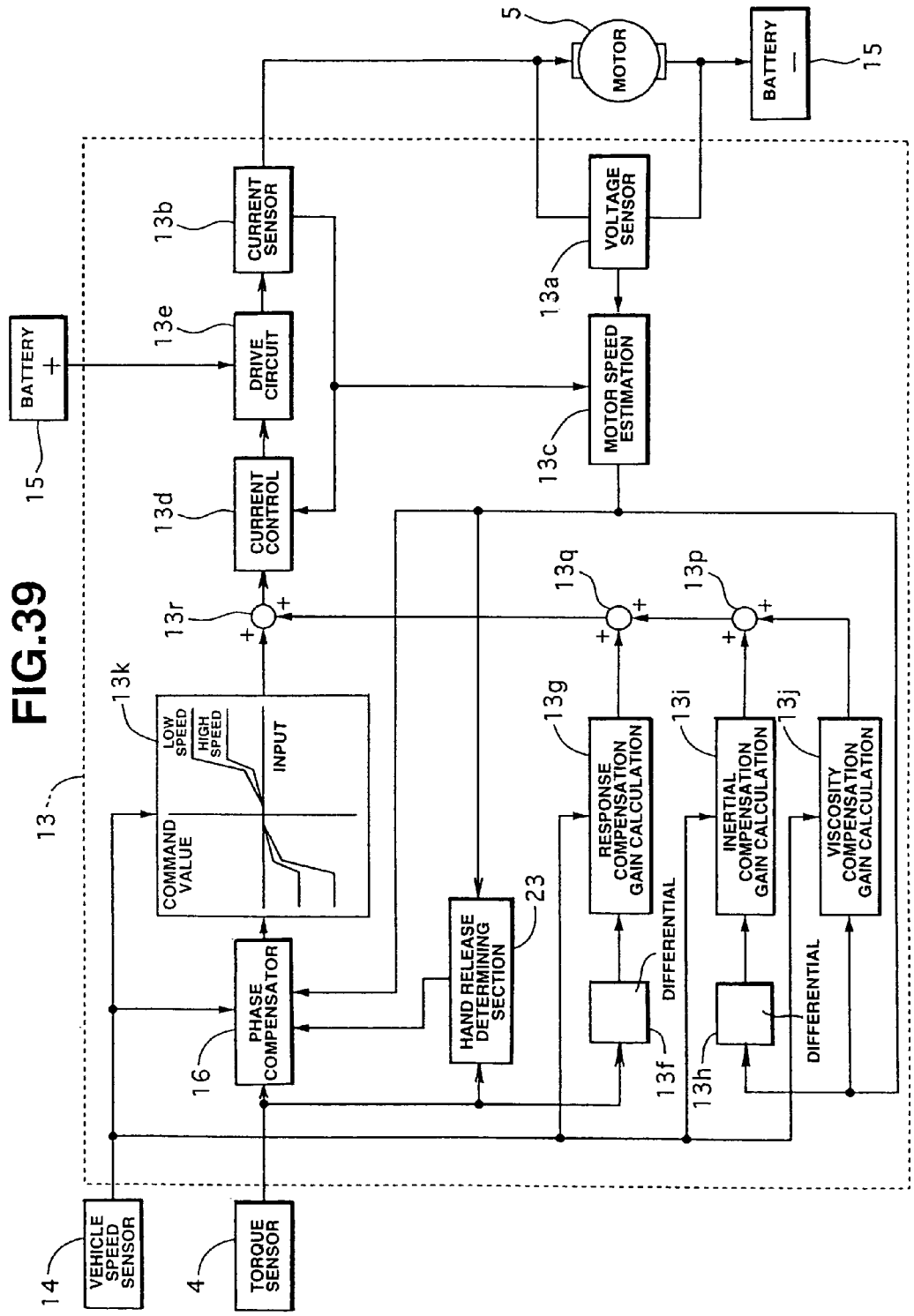

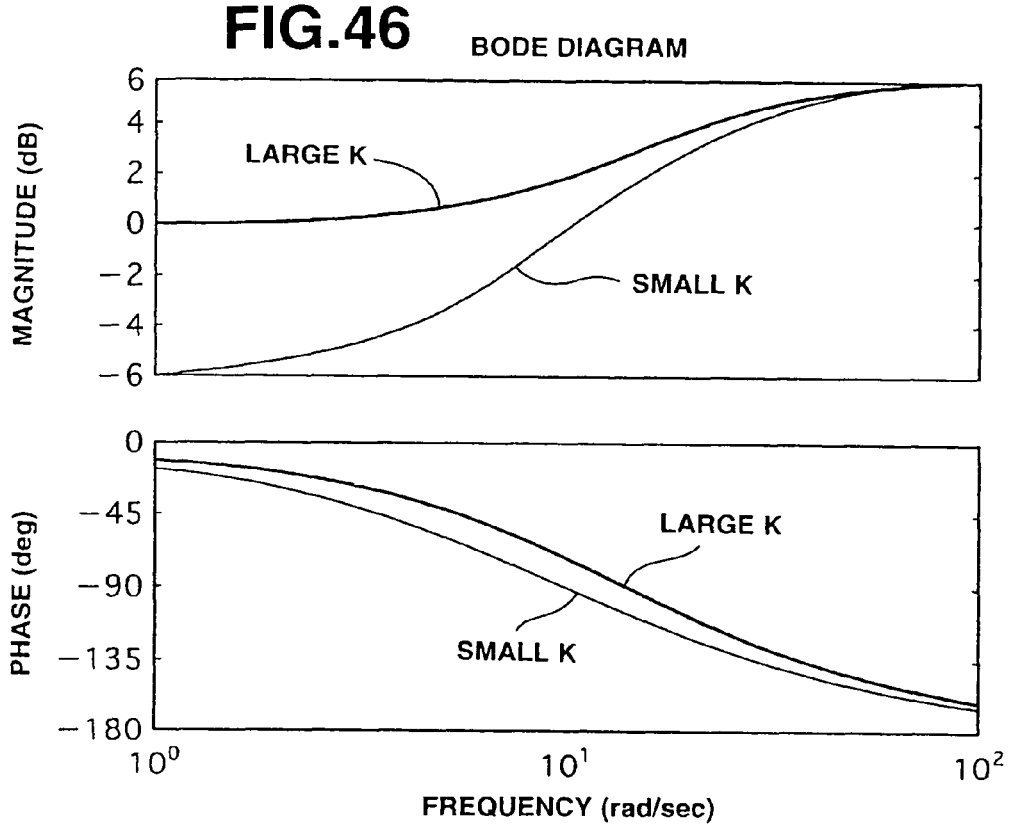
FIG.46 BODE DIAGRAM
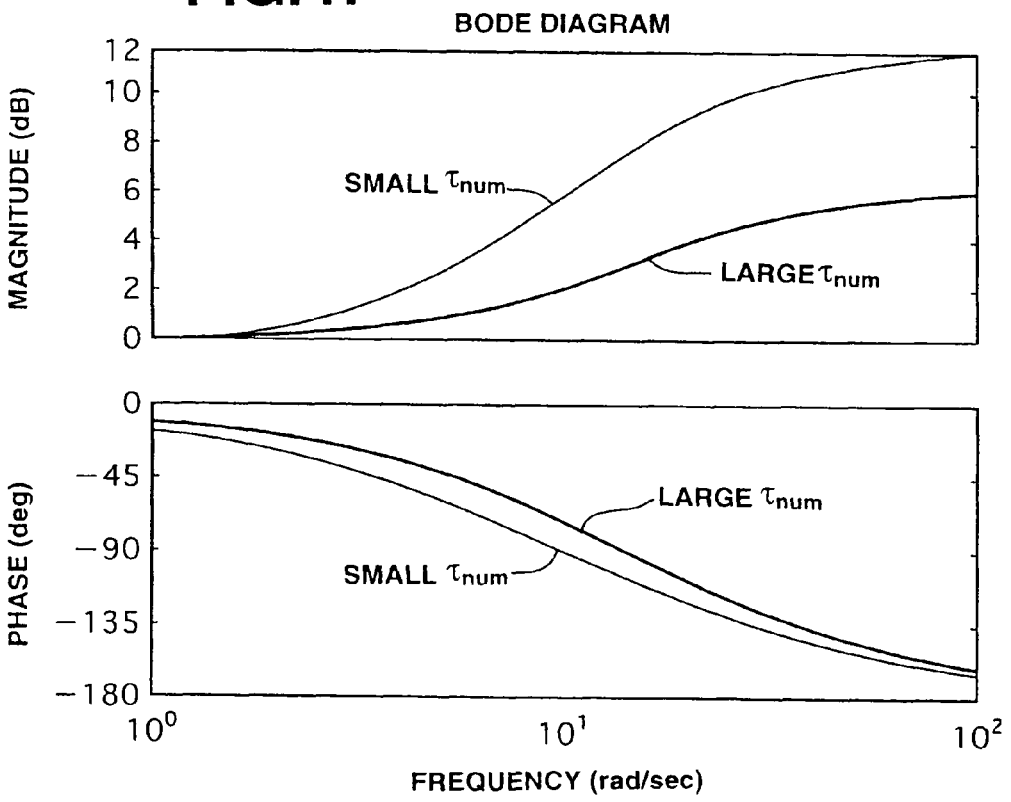
FIG.47 BODE DIAGRAM

VEHICULAR STEERING CONTROL APPARATUS

BACKGROUND OF THE INVENTION

The present invention relates to a vehicular steering control apparatus, and more specifically to an electric power steering apparatus which comprises a torque control actuator and a steering system which receives a steering torque from a driver through a steering wheel.

U.S. Pat. No. 6,360,151 corresponding to Japanese Published Patent Application No. 2001-114121 discloses an electric power-steering apparatus wherein an assist motor is controlled using an inertia phase compensation quantity

SUMMARY OF THE INVENTION

However, this electric power steering apparatus is arranged to calculate an inertia phase compensation quantity for compensating an inertia of a steering system including a motor so as to prevent a driver from having a feeling of an inertia during a low speed running, and to decrease the inertia phase compensation quantity during the high speed running as compared with that during the low speed running so as to apply a steady feeling of a steering-wheel control in the form of an inertia generation (a driver feels a steering torque heavy at the moment that a steering wheel is steered) to a driver during a high speed running. Since this electric power steering apparatus is arranged to remain the inertia during the high speed running to be preferably compensated, the driver feels the unnatural feeling by sensing the inertia during the steering operation.

It is therefore an object of the present invention to provide a vehicular steering control apparatus which obtains a preferable steering characteristic during the high speed running, by improving a damping of the vehicle behavior during the steering torque input.

An aspect of the present invention resides in a vehicular steering control apparatus which comprises: a steering system receiving a steering torque inputted by a driver; a torque control actuator connected to the steering system to produce an actuator torque relative to the steering torque; and a steering controlling section connected to the torque actuator, the steering controlling section controlling the torque control actuator, the steering controlling section increasing a phase delay of the actuator torque relative to the steering torque toward a neighborhood of 180° as the frequency of the inputted steering torque increases.

Another aspect of the present invention resides in a vehicular steering control apparatus which comprises: a steering system receiving a steering torque inputted by a driver; a torque control actuator connected to the steering system to produce an actuator torque relative to the steering torque; and a steering controlling section connected to the torque control actuator, the steering controlling section controlling the torque control actuator, the steering controlling section increasing a phase delay and a gain of the actuator torque relative to the steering torque, the steering controlling means executing a control of performing a frequency characteristic of setting the phase delay in the neighborhood of 180°.

A further aspect of the present invention resides in a method of controlling a vehicular steering through a steering system which receives a steering torque inputted by a driver and a torque control actuator which is connected to the steering system to produce an actuator torque relative to the steering torque. The method comprises a step of increasing a phase delay of the actuator torque relative to the steering torque toward a neighborhood of 180° as the frequency of the inputted steering torque increases.

Another aspect of the present invention resides in a method of controlling a vehicular steering through a steering system which receives a steering torque inputted by a driver and a torque control actuator which is connected to the steering system to produce an actuator torque relative to the steering torque. The method comprises: a step of increasing a phase delay and a gain of the actuator torque relative to the steering torque; and a step of executing a control of performing a frequency characteristic of setting the phase delay in the neighborhood of 180°.

The other objects and features of this invention will become understood from the following description with reference to the accompanying drawings.

BRIEF DESCRIPTION OF THE DRAWINGS

FIG. 34 is a control block diagram of the vehicular steering control apparatus of a seventh embodiment.

FIG. 39 is a control block diagram of the vehicular steering control apparatus of a ninth embodiment.

FIG. 46 is a graph showing the frequency characteristic in case that a coefficient K is changed in a phase compensation means of the eleventh embodiment.

FIG. 47 is a graph showing a frequency characteristic in case that a coefficient τnum is changed in the phase compensation means of the eleventh embodiment.

DETAILED DESCRIPTION OF THE INVENTION

Hereinafter, there are discussed embodiments of a vehicular steering control apparatus according to the present invention, with reference to the drawings.

First Embodiment

Figure 1:
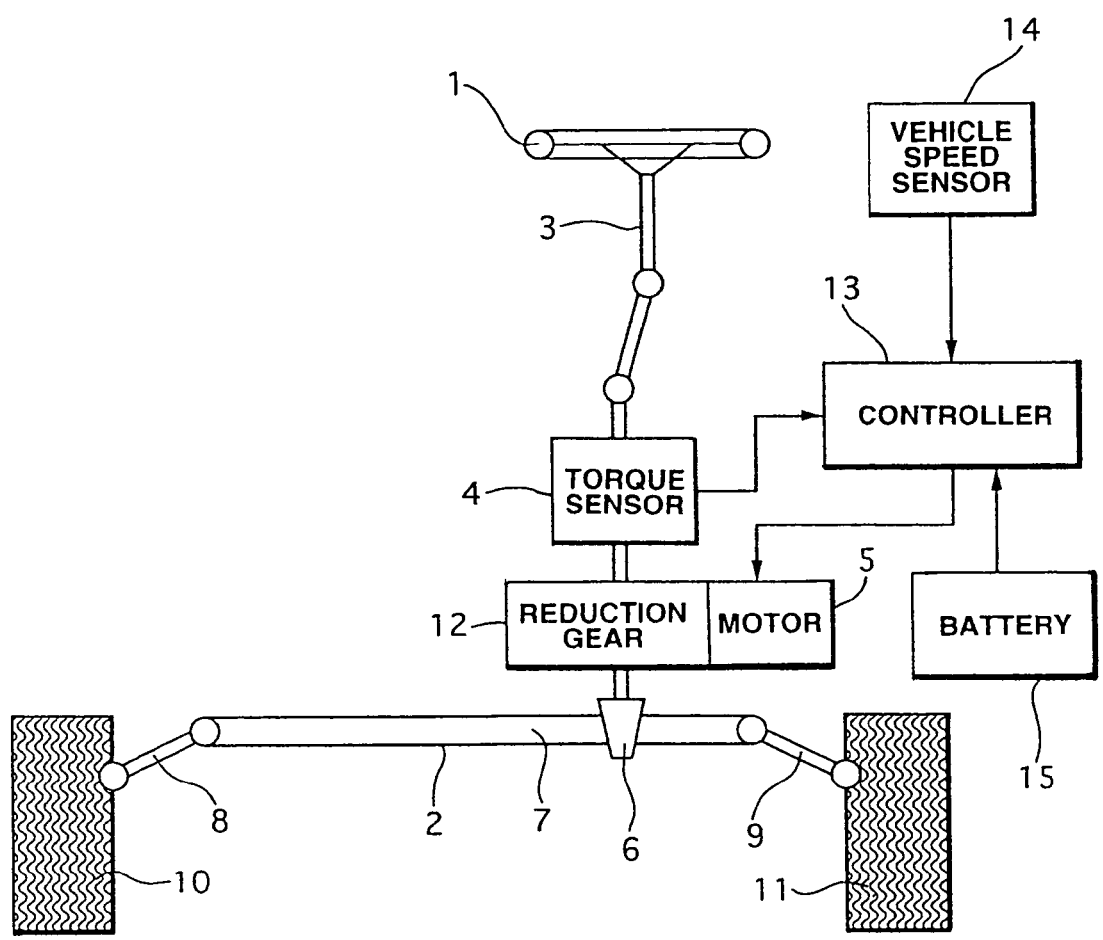
FIG. 1 is a view showing an electric power steering apparatus which employs a vehicle steering control apparatus according to a first embodiment of the present invention.

FIG. 1 shows an electric power steering apparatus which employs a vehicular steering control apparatus according to a first embodiment of the present invention. A steering system of the electric power steering apparatus comprises a steering wheel 1 steered by a driver, a steering mechanism 2 for executing a steering operation, a steering shaft 3 connecting steering wheel 1 and steering mechanism 2, a torque sensor 4 for detecting a steering torque applied to steering wheel 1, and a motor 5 as a torque control actuator for assisting a driver's steering force. Torque sensor 4 is attached to steering shaft 3.

Steering wheel 1 is disposed at a position opposite to the driver in a passenger compartment of the vehicle so as to be rotatable on steering shaft 3. Steering mechanism 2 is constructed by a rack-and-pinion type steering device which comprises a pinion 6 integrally connected at a lower end of steering shaft 3 and a rack shaft 7 meshed with pinion 6. Rack shaft 7 is fixed to a vehicle front part (not shown) to be slidable in a vehicle lateral direction. Both ends of rack shaft 7 is connected to steered wheels 10 and 11 through left and right tie rods 8 and 9, respectively.

Motor 5 is connected to steering shaft 3 through a reduction gear 12 for converting a torque generated by motor 5 into a rotational torque of steering shaft 3. A controller 13 acting as a steering controlling means controls a motor current supplied to motor 5.

Figure 2:
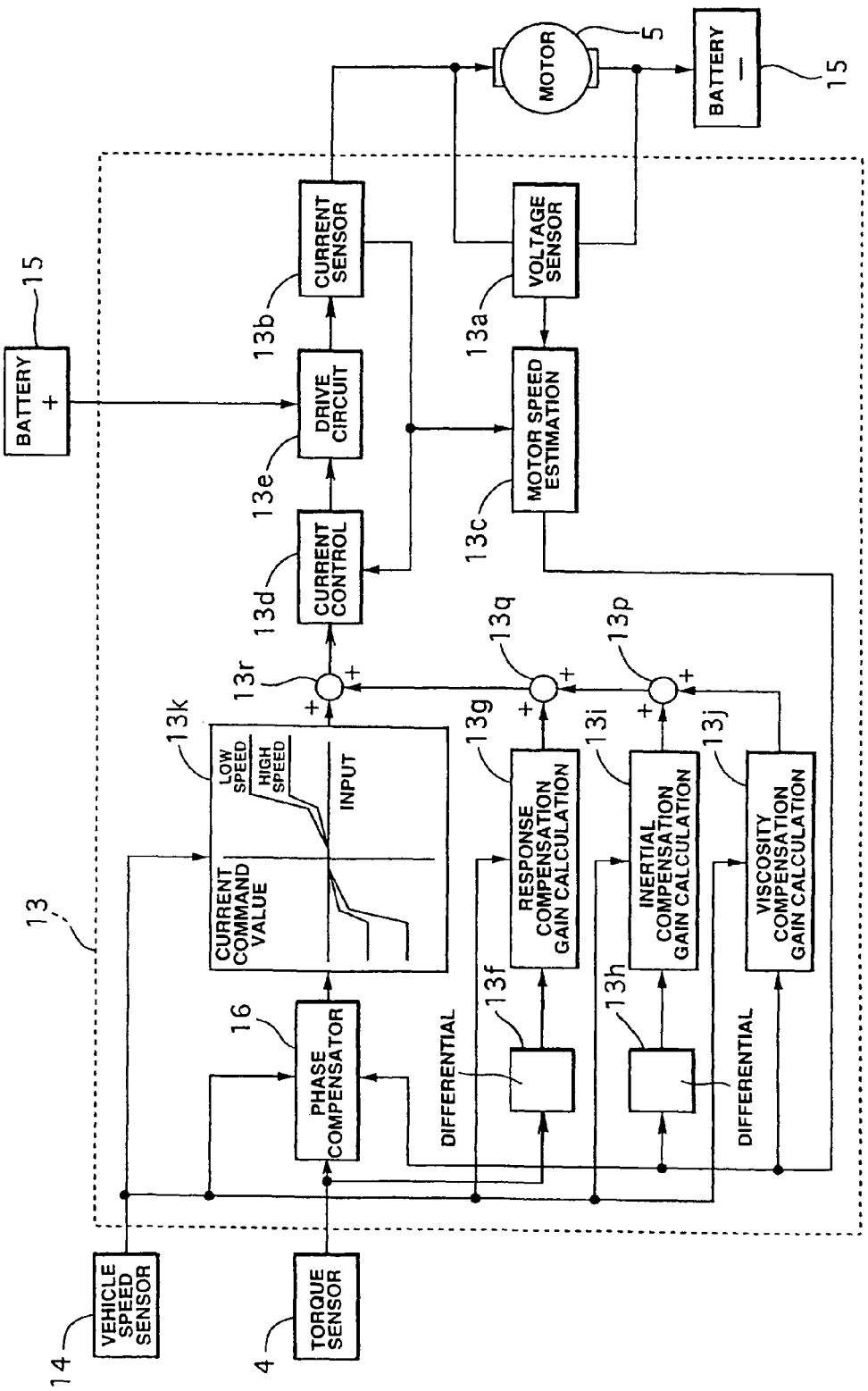
FIG. 2 is a block diagram showing a control executed the vehicle steering control apparatus.

Subsequently, there is discussed a control system of the first embodiment with reference to FIG. 2, which shows a block diagram showing a control of the vehicular steering control apparatus according to the first embodiment of the present invention.

When steering wheel 1 is steered by the driver, steering wheels 10 and 11 mechanically connected to steering wheel 1 are steered to an intended direction according to a steered degree of steering wheel 1. During this steering operation, a torsional load detected by torque sensor 4 is inputted to controller 13. Further, controller 13 receives signals from a vehicle speed sensor 14 of detecting a running speed of the vehicle and the like.

Controller 13 is equipped with a voltage sensor for detecting a voltage (motor voltage) between motor terminals and a current sensor 13b for detecting a motor current. A motor speed estimating block 13c of controller 13 estimates a revolution speed of motor 5 using the motor voltage and the motor current. Controller 13 is further equipped with a current control block 13d which receives a current command value calculated using the steering torque, the motor revolution speed and the vehicle speed. Current control block 13d calculates a drive current from the current command value with reference to the motor current detected by current sensor 13b. A drive circuit 13e of controller 13 produces a motor drive current corresponding with the calculated drive current using an electric power supplied from a battery 15, and supplies the motor drive current through current sensor 13b to motor 5 to control the operation of motor 5.

Further, controller 13 concurrently executes several compensation controls for solving a strange feeling inherent in the electric power steering apparatus.

The first of the compensation controls is a responsibility compensation control for compensating a response delay due to inertia and friction of the steering system. For this responsibility compensation control, controller 13 comprises a differentiator 13f and a responsibility compensation gain calculation block 13g which improve the responsibility of the electric power steering apparatus by flowing an assist current (responsibility-compensation current command value) having a positive correlation with a differential of the steering torque to motor 5.

The second of the compensation controls is an inertia compensation for compensating an inertia of the steering system, particularly an inertial of motor 5. For this inertia compensation, controller 13 comprises a differentiator 13h and an inertial compensation gain calculation block 13i. Differentiator 13h calculates a motor angular speed by differentiating a motor speed estimated from a counter electromotive force of motor 5. Inertial compensation gain calculation block 13i obtains an inertial force of motor 5 by summing the calculated motor angular speed and a motor inertia which has been previously measured, and supplies a current (inertia-compensation current command value) for canceling the motor inertial force to motor 5.

The third of the compensation controls is a viscosity compensation control which puts a viscosity of a steering system in a suitable state. For this viscosity compensation control, controller 13 comprises a viscosity compensation gain calculation block 13j for calculating a viscosity compensation gain (viscosity-compensation current command value) according to the motor speed estimated from the counter electromotive force of motor 5. This viscosity compensation control aims to reproduce a characteristic corresponding to that of a hydraulic power-steering apparatus and is arranged to reproduce a viscosity caused by a hydraulic circuit in the electric power steering apparatus. The above-discussed responsibility compensation, inertia compensation and viscosity compensation may be common compensations, or may be arranged to vary a gain according to the vehicle speed and the steering speed and the like.

The fourth of the compensation controls is a phase compensation for obtaining a preferable steering feeling by improving a damping of a vehicle behavior during the steering torque input. For this phase compensation, controller 13 comprises a phase compensator 16 for compensating a phase in the frequency characteristic of the steering torque according to the vehicle speed, the steering torque and the steering speed (corresponding to the motor speed), and a current command value calculation block 13k for calculating a current command value from the steering torque obtained at phase compensator 16 and the vehicle speed. In this first embodiment according to the present invention, controller 13 controls motor 5 to increase an assist quantity of the steering torque toward the opposite direction in response to a transient change of the steering torque in the high frequency range of the steering torque, by processing the detected steering toque at the phase compensator 16.

The responsibility compensation current command value, the inertia compensation current command value, the viscosity compensation current command value and the phase compensation current command value are added by adders 13p, 13q, and 13r of controller 13, and the sum of them are supplied to current control block 13d as the current command value.

Phase compensator 16 has a characteristic represented by the following first-order advance/first-order delay transfer function.

$$(K \cdot \tau num \cdot S)/(1 + \tau den \cdot S)$$

wherein S is a Laplace operator, K is a gain (=0, >0, <0), $\tau num$ is a first-order-advance time constant ($\geq 0$) and $\tau den$ is a first-order-delay time constant ($\geq 0$).

The characteristic of the first-order-advance time constant $\tau num$ of phase compensator 16 is changed according to the steering torque, the vehicle speed, and the steering speed (motor speed).

Figure 3:
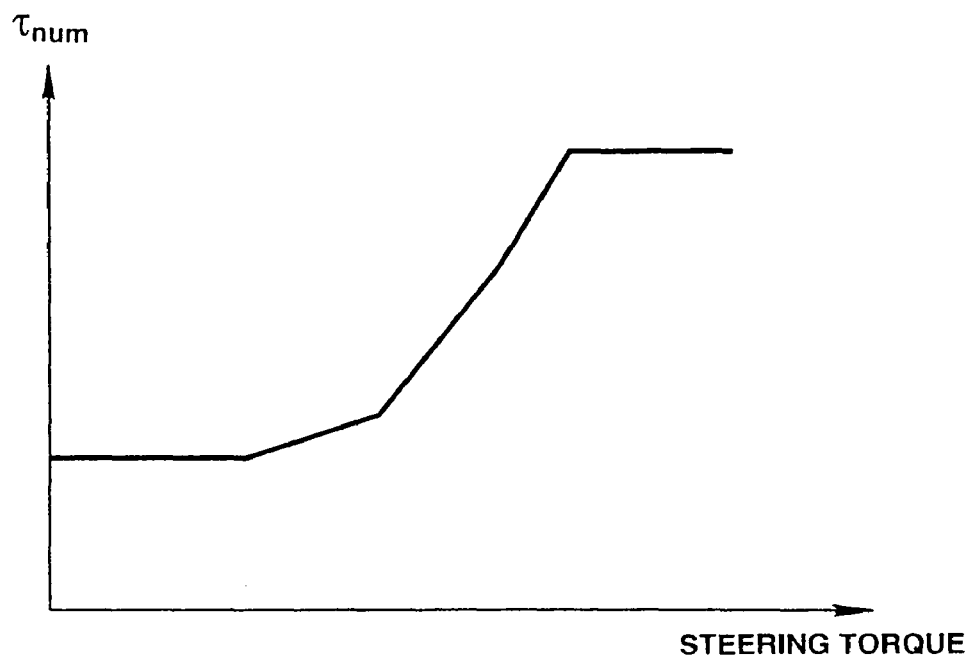
FIG. 3 is a graph showing a relationship of a first-order advance time constant relative to a steering torque in a phase compensator of the first embodiment.

FIG. 3 shows a setting of the first-order advance time constant $\tau num$ relative to the steering torque. The first-order-advance time constant $\tau num$ is set to increase as the steering torque increases. That is, the counter assist quantity increases as the steering torque increases.

Figure 4:
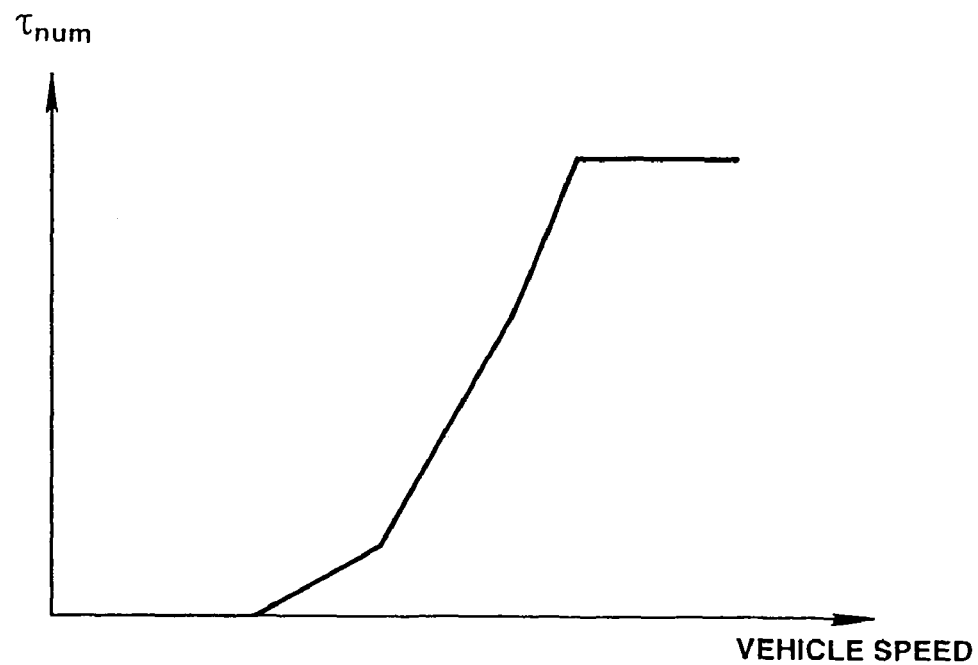
FIG. 4 is a graph showing a characteristic of the first-order advance time constant relative to a vehicle speed in the phase compensator of the first embodiment.

FIG. 4 shows a setting of the first-order-advance time constant $\tau num$ relative to the vehicle speed. The first-order-advance time constant $\tau num$ is set to increase as the vehicle speed increases. That is, the counter assist quantity increases as the vehicle speed increases.

Figure 5:
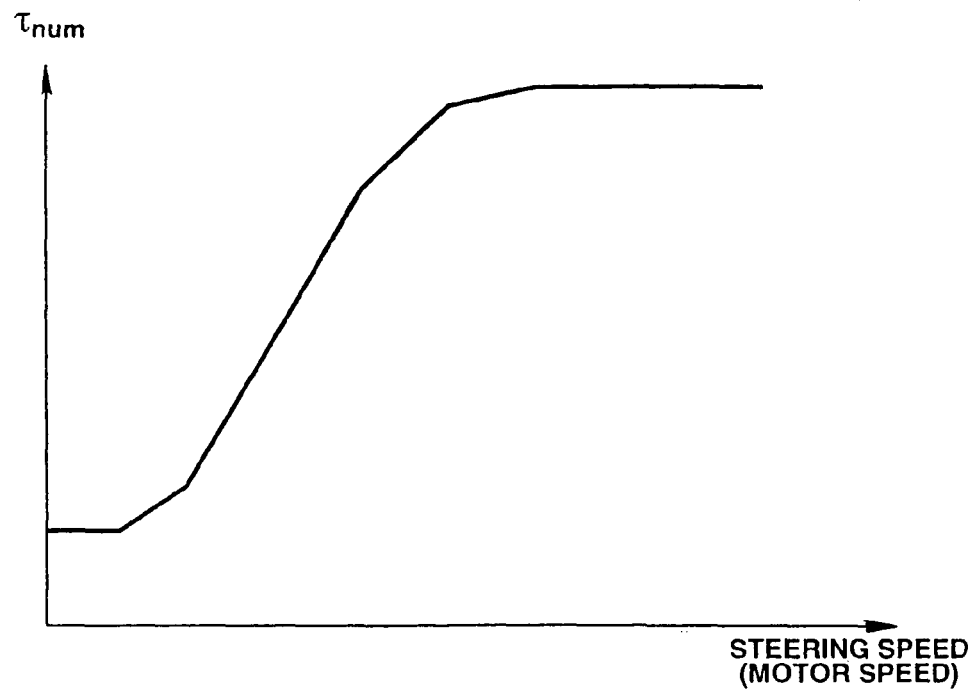
FIG. 5 is a graph showing a characteristic of the first-order advance time constant relative to a steering speed in the phase compensator of the first embodiment.

FIG. 5 shows a setting of the first-order-advance time constant $\tau num$ relative to the steering speed. The first-order-advance time constant $\tau num$ is set to increase as the steering speed increases. That is, the counter assist quantity increases as the steering speed increases.

The steering speed corresponding to the motor revolution speed is calculated using the counter electromotive force of motor 5. More specifically, the steering speed is expressed by the following expression.

$$d\theta/dt = I \times (V - RI)/K$$

wherein $d\theta/dt$ is the steering speed, V is the motor voltage (terminal-to-terminal voltage of motor 5), I is the motor current, K is a counter electromotive force coefficient of motor 5, and R is an internal resistance of motor 5.

Since it may be considered that K and R are almost constant values, it is possible to calculate the revolution speed $d\theta/dt$ of motor 5 by measuring the motor voltage V and the motor current I. Since motor 5 and steering shaft 3 are mechanically connected with each other, the product of the revolution speed $d\theta/dt$ of motor 5 and a reduction speed ratio is estimated as the steering speed of steering wheel 1.

The characteristic of the first-order-delay time constant $\tau den$ of phase compensator 16 is changed according to the steering torque, the vehicle speed, and the steering speed (motor speed).

Figure 6:
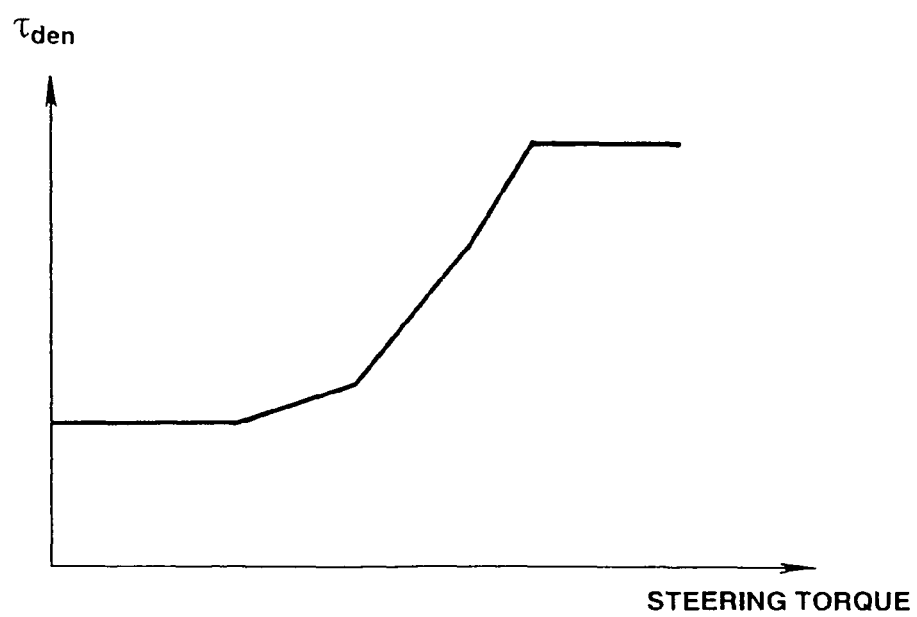
FIG. 6 is a graph showing a characteristic of a first-order delay time constant relative to the steering torque in the phase compensator of the first embodiment.

FIG. 6 shows a setting of the first-order delay time constant $\tau den$ relative to the steering torque. The first-order advance time constant $\tau num$ is set to increase as the steering torque increases. That is, the delay of the output increases as the steering torque increases.

Figure 7:
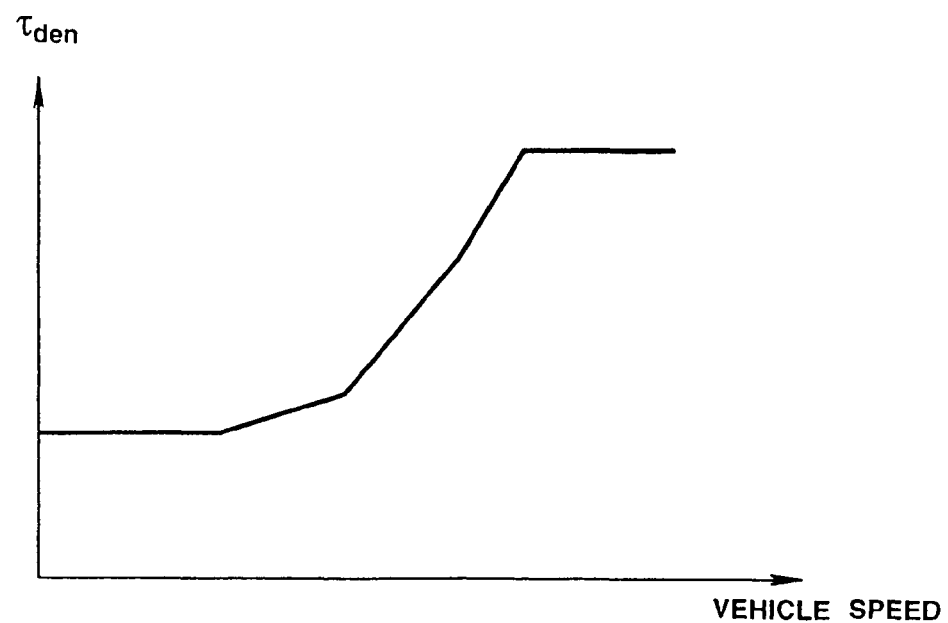
FIG. 7 is a graph showing a characteristic of the first-order delay time constant relative to the vehicle speed in the phase compensator of the first embodiment.

FIG. 7 shows a setting of the first-order delay time constant $\tau den$ relative to the vehicle speed. The first-order-delay time constant $\tau den$ is set to increase as the vehicle speed increases. That is, the delay of the output increases as the vehicle speed increases.

Figure 8:
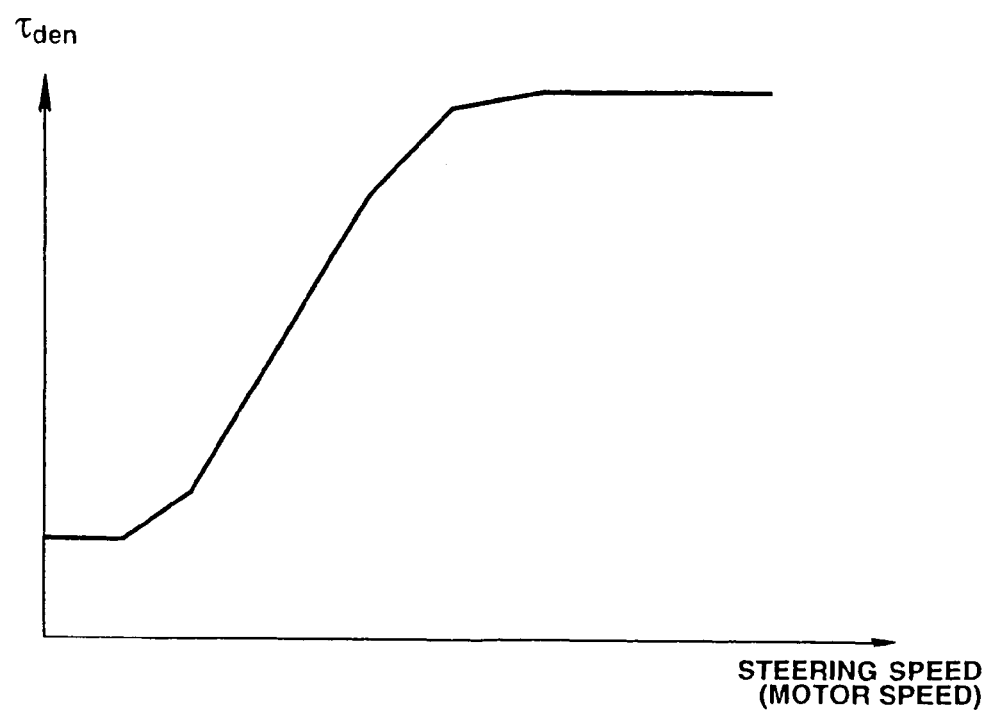
FIG. 8 is a graph showing a characteristic of the first-order delay time constant relative to the steering speed in the phase compensator of the first embodiment.

FIG. 8 shows a setting of the first-order-delay time constant $\tau den$ relative to the steering speed. The first-order-delay time constant $\tau den$ is set to increase as the steering speed increases. That is, the output of the delay increases as the steering speed increases.

Next, there is discussed the manner of operation of the steering control apparatus according to the first embodiment of the present invention.

[About the View of this Invention]

Although an electric power steering apparatus, a hydraulic-pump-type power-steering apparatus and a steer-by-wire apparatus respective have a merit that it is possible to freely control a steering reaction force applied to a driver using a degree of freedom of a motor reaction force, which is a desired assist quantity generated at a desired timing in a desired direction, the conventional controls of these apparatuses do not sufficiently utilize such merit.

During a high speed vehicle running, the driver drives the vehicle mainly by inputting the steering torque. Therefore, when the frequency characteristic of the vehicle behavior according to the steering torque input is effectively damped, the driver feels that such a steering characteristic is preferable.

The control characteristic for improving the damping of the vehicle behavior relative to the steering torque input using the steering torque is obtained by the following procedures.

Figure 9A:
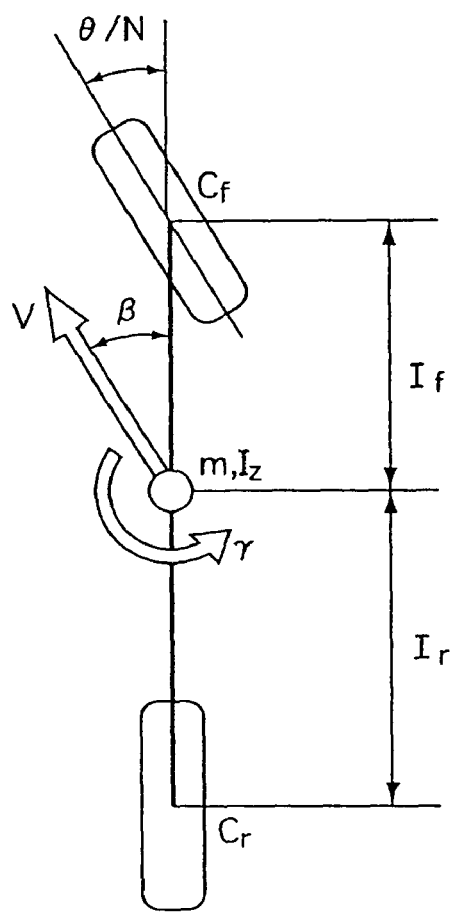
FIGS. 9A and 9B are views showing a two-wheel vehicle model whose equation of motion is employed in the calculation of a control characteristic.
Figure 9B:
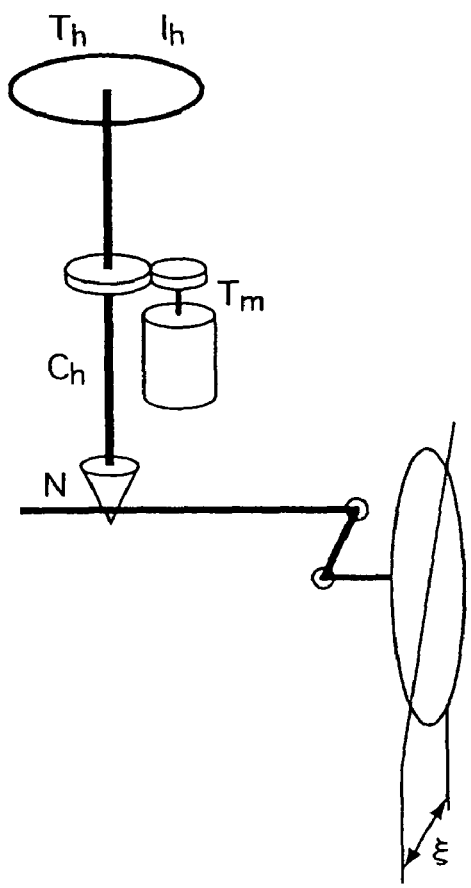

When a model shown in FIG. 9 is employed as a model of the motion equation used for the calculation, a vehicle system is expressed by the following equations (1) and (2) as a two-wheel model.

$$I_z\gamma' = l_f C_f\left(\frac{\theta}{N} - \frac{l_f}{V}\gamma - \beta\right) - l_r C_r\left(\frac{l_r}{V}\gamma - \beta\right) \quad (1)$$

$$mV(\beta' + \gamma) = C_f\left(\frac{\theta}{N} - \frac{l_f}{V}\gamma - \beta\right) + C_r\left(\frac{l_r}{V}\gamma - \beta\right) \quad (2)$$

A steering system is expressed by lower the dimension of the model so as to facilitate the understanding of the system as shown in the following expression (3).

$$I_h\theta'' + C_h\theta' + \frac{\xi}{N}C_f\left(\frac{\theta}{N} - \frac{l_f}{V}\gamma - \beta\right) = T_m + T_h \quad (3)$$

wherein $I_z$ is a moment of inertial of the vehicle, $\gamma$ is a yaw rate, $l_f$ is a distance between a front axle and a center of gravity of the vehicle, $C_f$ is a front-wheel cornering power, N is an overall steering ratio, V is the vehicle speed, $\beta$ is a slip angle, $I_r$ is inertia of the steering system, $C_h$ is a viscosity of the steering system, $\theta$ is a steering angle, $\xi$ is a trail, $T_m$ is a the motor torque, and $T_h$ is the steering torque.

Figure 10:
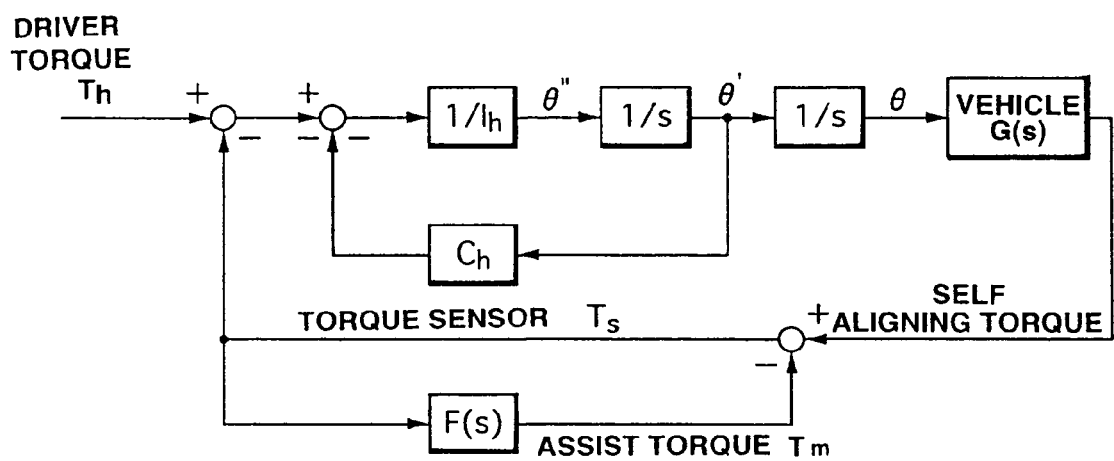
FIG. 10 is a block diagram showing a control procedure which has been rewritten from the model shown in FIGS. 9A and 9B into a control model of the electric power steering apparatus.

The model of FIG. 9 is rewritten to the control model of the electric power-steering apparatus, as shown in FIG. 10, and the control characteristic of the assist torque relative to the steering torque is discussed. Herein, the transfer function of the assist torque relative to the steering torque is set to F(S) wherein S is a Laplace operator. Improving the damping of the vehicle behavior relative the steering torque input corresponds to improving the damping of the steering angle relative to the steering torque input. It is because the vehicle behavior occurs from the steering angle (motion equation of a vehicle two-wheel model), and the steering torque is determined from the vehicle behavior (motion equation of a steering system). Then, when the transfer function of the steering angle relative to the steering torque is set to H(S), the following expression (4) is obtained form FIG. 10.

$$H(s) = \frac{\theta}{T_h} = \frac{1}{I_h s^2 + C_h s + \frac{G(s)}{1 + F(s)}} \quad (4)$$

wherein G(S) is the transfer function of he vehicle behavior relative to the steering angle input as shown in FIG. 10 and is expressed by the following expression (5).

$$G(s) = \frac{\xi C_f\left(\frac{\theta}{N} - \frac{l_f}{V} - \beta\right)}{\theta} \equiv \frac{G_n}{G_d} \quad (5)$$

The numerator and the denominator of the transfer function are placed with Gn and Gd, respectively. The characteristic of the target function of H(S) is set by the following expression (6), and a numerator and a denominator are made into Hn* and Hd*, respectively.

$$H(s)^* = \frac{\theta}{T_h} = \frac{1}{s^2 + 2s\omega_n S + \omega_n^2} = \frac{H_n^*}{H_d^*} \quad (6)$$

If an assist characteristic F(S) whose second-order system is expressed by H(s) is inversely calculated so as to improve the damping of the transfer function H(S) of transferring the steering torque to the steering angle, the following expression (7) is obtained.

$$F(s) = -1 + \frac{G_n H_n^*}{G_d[H_d^* - H_n^*(I_h s^2 + C_h s)]} \quad (7)$$

Figure 11A:
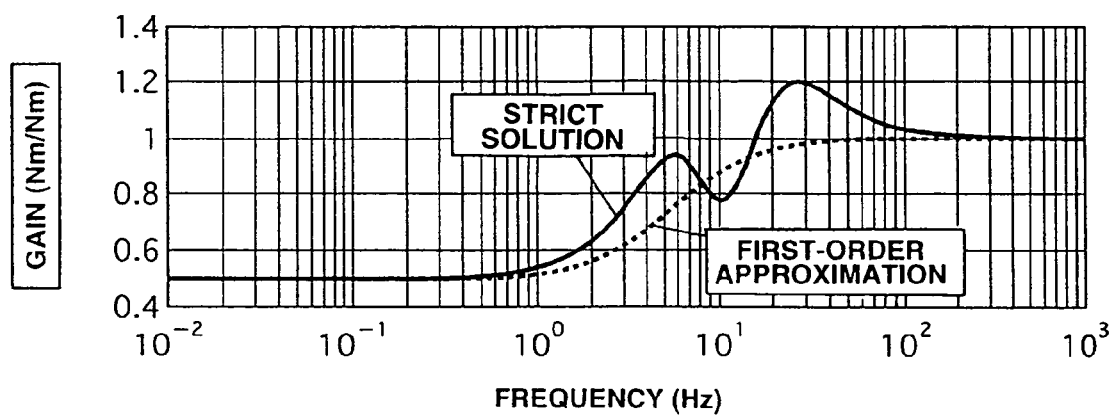
FIGS. 11A and 11B are graphs showing an strict solution and a first-order approximation of a frequency characteristic of a controller in case that an assist characteristic of a second-order system is calculated so as to improve the damping of a transfer function from the steering torque to the steering angle.
Figure 11B:
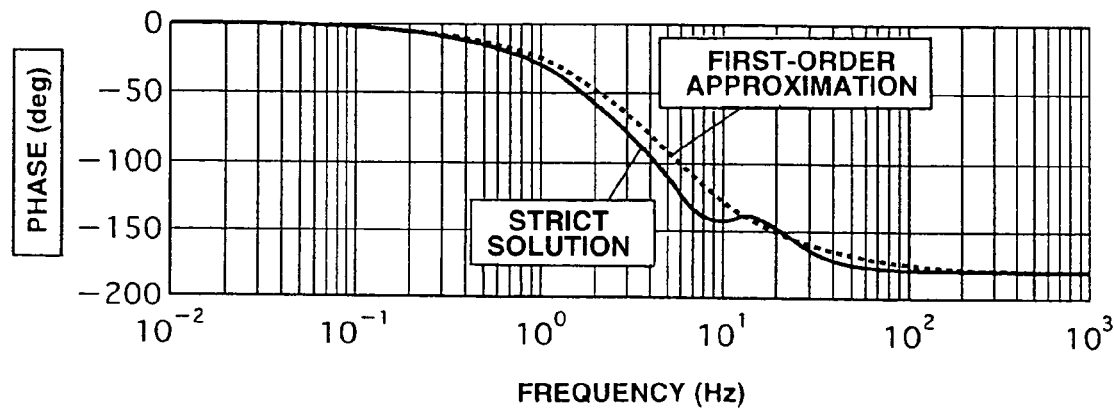

By calculating F(s), the strict solution of the frequency characteristic of the controller is obtained as shown by continuous lines in FIGS. 11A and 11B.

Figure 12A:
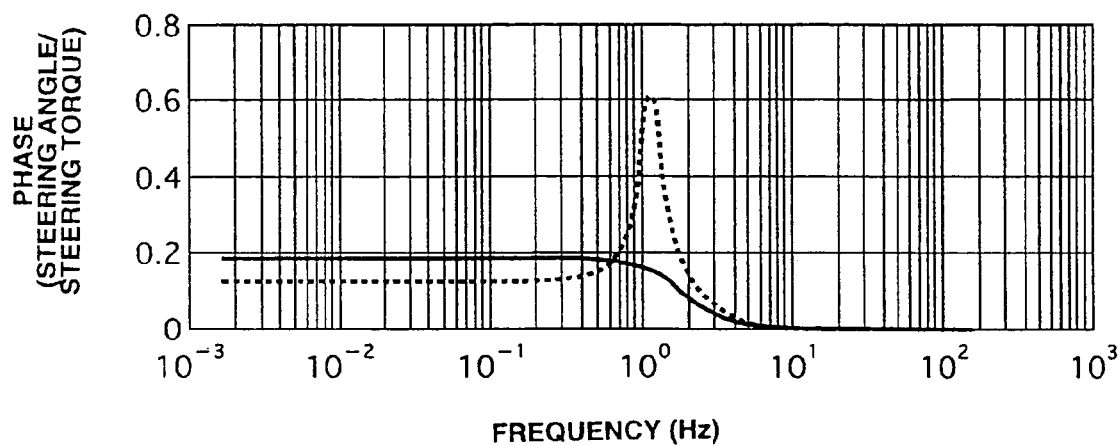
FIGS. 12A and 12B are graphs showing an strict solution and a first-order approximation of a frequency characteristic of the steering angle relative to the steering torque in case that the assist characteristic of a second-order system is calculated so as to improve the damping of the transfer function from the steering torque to the steering angle.
Figure 12B:
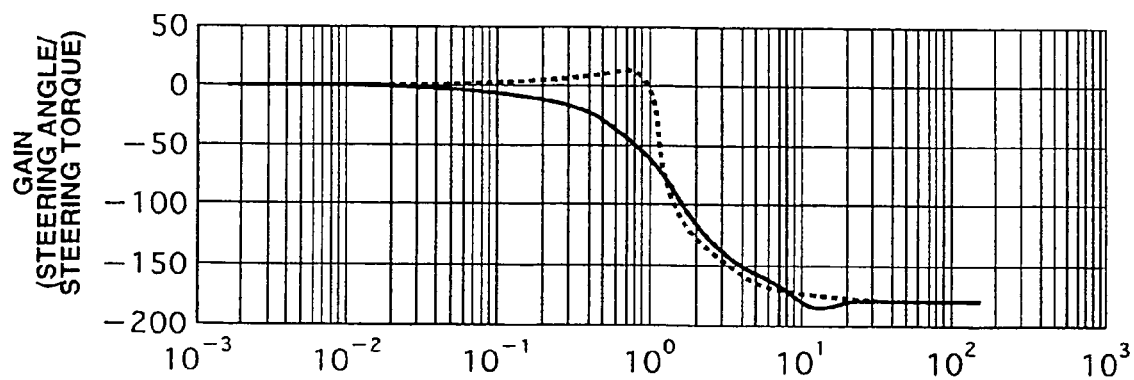

The frequency response of the steering angle relative to the steering torque during the performance of the above characteristics shown by FIGS. 11A and 11B is represented by continuous lines shown in FIGS. 12A and 12B. These continuous lines show that the damping has been improved.

If the physical meaning of the frequency response of the controller of F(S) is interpreted, it is preferable that the characteristic functions to assist the steering operation in the opposite direction so that the phase delay of the assist torque increases as the frequency of the steering torque input increases, in order to improve the damping of the vehicle behavior relative to the steering torque.

After being based on this interpretation, if a strict solution is approximated by a first-order/first-order form, the characteristic represented by dotted lines in FIGS. 11A and 11B are obtained. Therefore, it is possible to improve the damping of the vehicle behavior relative to the steering torque as is similar to the strict solutions.

Although the model of the steering system or vehicle is expressed by the simple expression in the above explanation, a further high-dimension model, which further actually expresses the vehicle model, may be employed. Although the ideal characteristic is expressed by the second-order expression, it may be expressed by a first-order expression or a further high-order expression, and the phase delay may be set constant.

Generally the time constant of the torque differential for the inertia compensation in a conventional example ranges from several milliseconds to about 10 milliseconds. Accordingly, even if it changes a gain how much in case of this damping time constant, it is difficult to improve the frequency characteristic shown in FIGS. 11A and 11B.

That is, the damping of the vehicle behavior in the frequency characteristic relative to the steering torque input cannot improve only by changing the torque differentiation controlled variable for the inertia compensation. For example, as shown in FIG. 13, as to the frequency characteristic of the lateral acceleration relative to the steering torque input, the damping thereof is degraded in the high speed range.

It is therefore an object of the present invention to obtain an ideal form of the vehicle behavior relative to the steering torque input. More specifically, it is commonly known that the driver mainly controls the vehicle motion by mainly generating the steering torque as an input during the high speed running. Therefore, the control of the vehicle will become easy for a driver by keeping the gain of the vehicle behavior (lateral acceleration and yaw rate) relative to the steering torque at a constant value, for example, as shown by the ideal characteristic of FIG. 13.

Figure 13:
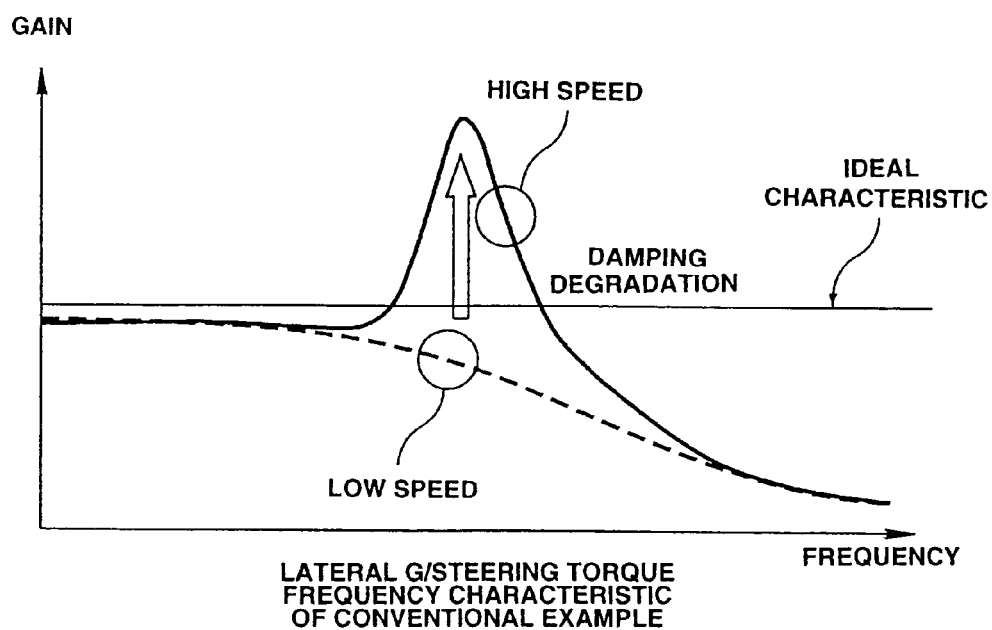
FIG. 13 is a graph showing a (lateral G)/(steering torque) frequency characteristic of a conventional steering control apparatus.

Then, regarding the vehicle behavior relative to the actual steering torque, the frequency characteristic of the vehicle behavior to the steering torque input of the vehicle has a problem that the damping in predetermined frequency degrades as the vehicle speed increases as shown in FIG. 13.

Figure 14:
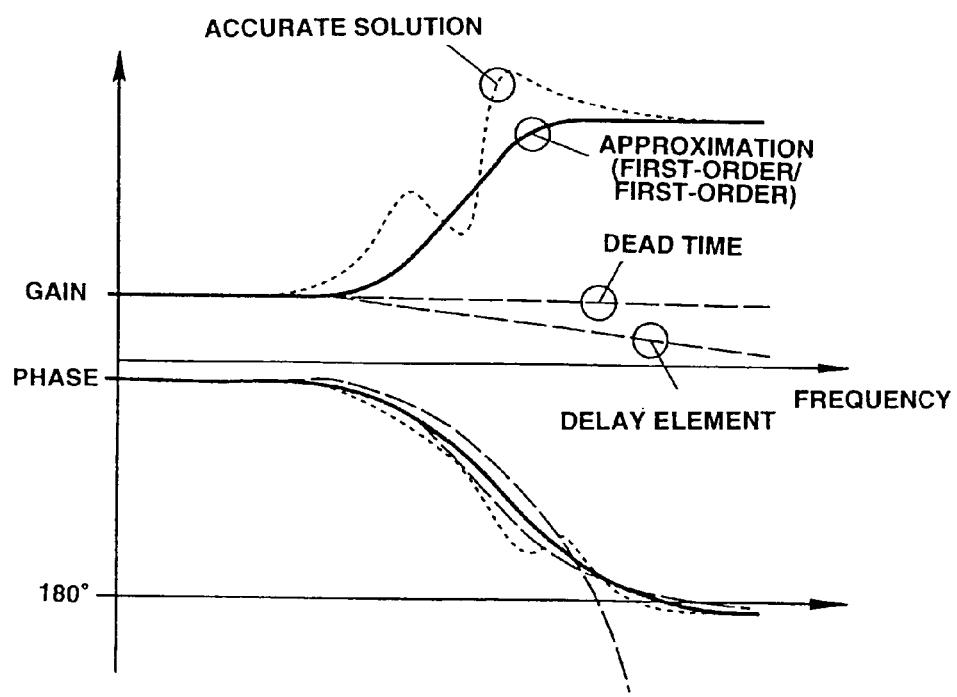
FIG. 14 is a graph showing a frequency characteristic of a gain and a phase of the motor torque relative to the steering torque in the compensator of the first embodiment.

FIG. 14 shows the controller characteristic for achieving the ideal characteristic, which has be calculated from the model of the vehicle and the steering system. More specifically, the assist characteristic relative to the steering torque is set such that the phase delay becomes large as the frequency of the input of steering torque becomes high.

[About Phase Compensation]

Next, there is discussed the phase compensation of the motor torque relative to the steering torque with phase compensator 16 of the first embodiment according to the present invention.

When phase compensator 16 is constructed by first-order-advance/first-order-delay as expressed by the following expression (8), the frequency characteristic is represented by a continuous line in FIG. 14. The important feature of the characteristic of phase compensator 16 of the present invention is to assist in the opposite direction against the direction of the steering toque as the frequency becomes high, that is, the phase delay becomes large and the phase is inversed.

$$C(s)=(K-\tau num \cdot S)/(1+\tau den \cdot S) \quad (8)$$

Figure 15:
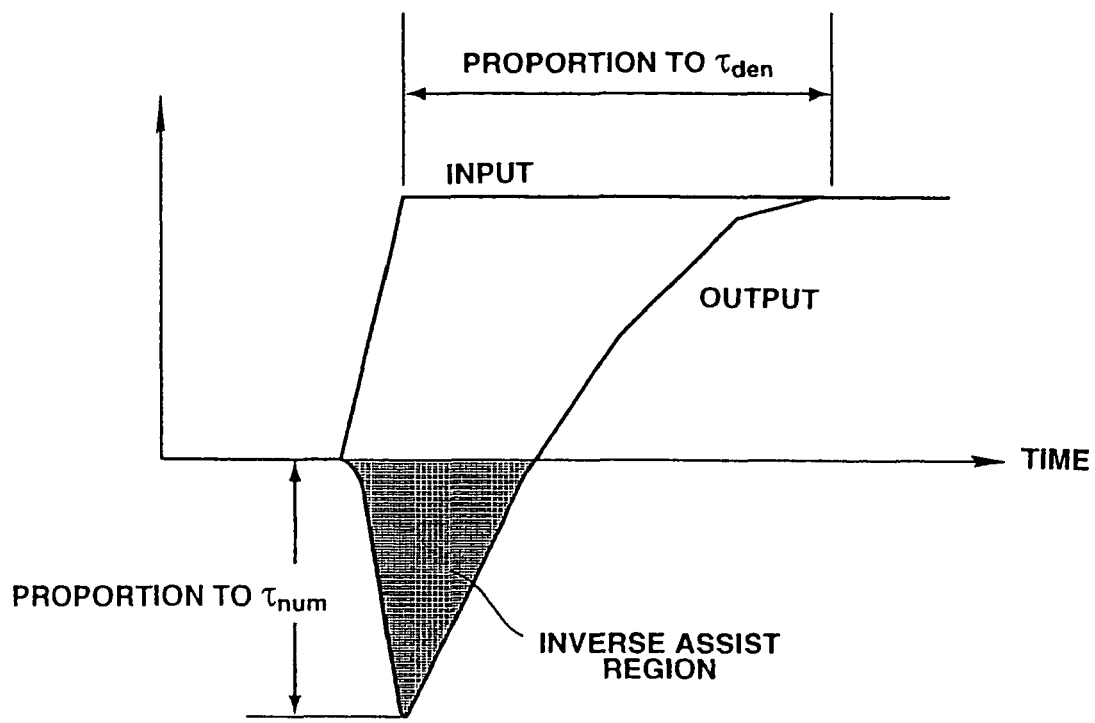
FIG. 15 is a graph showing an output characteristic in case that the steering torque is inputted stepwise in the phase compensator of the first embodiment.

The output of this phase compensator 16 performs the characteristic as shown in FIG. 15, when there is a transitional input, for example, a step-like steering torque input. In FIG. 15, the gain to the lower part of an output is determined by the first-order-advance damping time constant $\tau num$. The delay of an output is determined by the first-order-delay time constant $\tau den$. A static assist quantity relative to the steering torque is determined by gain K.

As understood from the time-series transition of the output, controller 13 executes the inverse assist in the direction of increasing the operation force of steering wheel 1 immediately after the transient input is inputted as the current command value (target current value), and then executes the assist of decreasing the operation force of steering wheel 1 according to the time elapse.

Therefore, when a transitional steering torque is detected in the first embodiment, for example, when a lane change is performed and the steering torque changes, in a steering-wheel steering process (steering torque increases), the assist torque in the generally inverse direction opposite to the changing direction of the steering torque is generated and the steering torque increases. In a steering-wheel return process wherein the steering torque decreases, the assist torque in the generally inverse direction opposite to the changing direction of the steering torque is also generated and the steering torque decreases. Accordingly, even if the same vehicle behavior occurs, the steering torque change becomes large and the gain of the vehicle behavior relative to steering torque is decreased. As a result, the damping performance shown in FIGS. 12A and 12B is improved and a preferable steering feeling is obtained, without applying the strange feeling to the driver.

If the input frequency of steering torque becomes high, the output of the inverse assist torque is increased. Therefore, relative to quick steering of the lane change during the high speed vehicle running, the assist quantity in the opposite direction increases and the operation of steering wheel 1 becomes heavy. Consequently, sudden steering operation by the driver can be prevented and the unnecessary vehicle behavior can be prevented. Due to the fall of steering rigidity by the inverse assist, the vehicle behavior relative to the steering quantity, that is, the steer characteristic is set into the understeer characteristic, and therefore the run stability of the vehicle is improved.

With this arrangement according to the first embodiment of the present invention, the damping of the steering angle and the vehicle behavior relative to the steering torque input shown in FIGS. 12A, 12B, 13A and 13B are improved, and it becomes possible to prevent the rise of a gain regardless of the frequency.

[About Setting Operation of Time Constant]

When there is a step-like steering torque input, the gain to the lower part of an output is determined by the first-order-delay time constant $\tau den$. That is, in order to obtain the ideal characteristic, it becomes most important how the first-order-advance time constant $\tau num$ in the expression (8) is determined with the high priority to the first-order-delay time constant $\tau den$ and the gain K. Hereinafter, there is discussed the operation by the setting of the first-order-advance time constant $\tau num$.

In the first embodiment, the first-order-advance time constant $\tau num$ is set so as to increase as the steering torque increases as shown in FIG. 3. Therefore, during the steering-angle increasing (steering-wheel turning) operation or steering-wheel returning operation from the steering-wheel holding state under a cornering, the steering torque change quantity is increased and decreased according to the steering torque during the steering-wheel holding state. Accordingly, the vehicle steadiness during the steering-wheel holding state is obtained. Specifically, since the predetermined change of the steering torque is produced under the state that the steering torque is small, the neutrality of the steering-wheel operation is obtained during the straight road running. Further, when the steering torque becomes large, the first-order-advance time constant $\tau num$ is limited by a predetermined upper limit. Therefore, it becomes possible to prevent the operation of steering wheel 1 from becoming unnecessarily heavy. Instead of limiting the first-order-advance time constant $\tau num$ by the predetermined upper limit, the controlled variable may be limited by a predetermined limit value.

In the first embodiment, the first-order advance time constant $\tau num$ is set so as to increase as the vehicle speed increases as shown in FIG. 4. Therefore, during the low speed running, the steering torque change quantity decreases, and it becomes easy to obtain a light steering operation. On the other hand, since the steering torque change quantity increases during the high speed running, the gain of the vehicle behavior relative to the steering torque decreases and the running stability of the vehicle increases.

In the first embodiment, the first-order-advance time constant τNum is set so as to increase as the steering speed increases as shown in FIG. 5. Therefore, the steering torque change quantity increases as the steering speed increases. That is, the running stability of the vehicle increases as a quickness of the steering operation increases. Further, although it generally becomes difficult to detect the accurate counter electromotive force for estimating the steering speed with a predetermined high accuracy for the reason of signal noises, the first embodiment of the present invention is arranged to set the first-order-advance time constant τnum at a predetermined inverse assist when the steering speed is small. Accordingly, it becomes possible to obtain the neutral feeling during a slight steering operation while avoiding the fluctuation of the vehicle. Further, when the steering speed is very high, the first-order-advance time constant τnum is limited by the predetermined upper limit. Therefore, it becomes possible to prevent the operation of steering wheel 1 from becoming unnecessarily heavy. Instead of limiting the first-order advance τnum by the predetermined limit, the controlled variable may be limited by a predetermined limit value.

Next, there is discussed advantages of the first embodiment. The vehicular steering control apparatus of the first embodiment ensures the following advantages.

(1) In the vehicular steering control apparatus which comprises motor 5 provided in the steering system having steering wheel 1 to input the steering torque from the driver and controller 13 of controlling motor 5, controller 13 increases the phase delay of the motor torque relative to the steering torque as the frequency of the inputted steering torque becomes increases so as to execute a control for obtaining a frequency characteristic of putting the phase delay in the neighborhood of 180 angles or a frequency characteristic of maintaining the phase delay in the neighborhood of 180 angles. It therefore becomes possible to realize a suitable steering characteristic for the driver during the high speed running, by largely increasing the damping of the vehicle behavior during the steering torque input.

(2) In the vehicular steering control apparatus which comprises motor 5 provided in the steering system having steering wheel 1 to input the steering torque from the driver and controller 13 of controlling motor 5, controller 13 increases the phase delay of the motor torque relative to the steering torque and increases the gain K as the frequency of the inputted steering torque increases so as to execute a control for obtaining a frequency characteristic of putting the phase delay in the neighborhood of 180 angles or a frequency characteristic of maintaining the phase delay in the neighborhood of 180 angles. It therefore becomes possible to realize a suitable steering characteristic for the driver during the high speed running, by largely increasing the damping of the vehicle behavior during the steering torque input.

(3) Since controller 13 is arranged to realize the frequency characteristic using phase compensator 16 which compensates the phase delay and the phase advance determined by the vehicle and the steering system, it becomes possible to suitably realize the above-discussed merits according to an applied vehicle and an employed unit.

(4) The phase compensation means is a phase compensator constructed by first-order advance and first-order delay, and is represented by the following transfer function so as to simplify the control characteristic.

$(K \cdot \tau num \cdot S)/(1+\tau den \cdot S)$ wherein S is a Laplace operator, K is a gain (=0, >0, <0), τnum is a first-order advance time constant (≧0), a is a constant (>0) and τden is a first-order delay time constant (≧0). This facilitates the installation thereof in controller 13 and prevents the control from becoming unstable by divergence.

(5) Since phase compensator 16 is set so that the first-order-advance time constant τnum increases as the steering torque increases, it becomes possible to obtain the stable feeling of the steering holding state during the steering-wheel turning state or returning state from the steering-wheel holding state for the cornering. Specifically, even when the steering torque is small, the steering torque change set at the predetermined value is generated. This heightens the running stability of the vehicle as the steering speed becomes high, that is, as steering wheel 1 is quickly steered.

(6) Since phase compensator 16 is set so that the first-order-advance time constant τden increases as the vehicle speed increases, it become possible to heighten the running stability of the vehicle during the high speed running while facilitating the handling during the low speed running.

(6) Since phase compensator 16 is set so that the first-order-advance time constant τden increases as the steering speed increases, it become possible to heighten the running stability of the vehicle as the steering operation is quickly executed.

(8) Since phase compensator 16 is set so that the first-order-delay time constant τden is changed according to the changes of the steering torque, the vehicle speed and the steering speed, by setting the first-order-delay time constant τden at a value which increases as each value of the steering torque, the vehicle speed and the steering speed increases, it becomes possible to execute the motor assist control using the characteristic of optimally delaying the output according to the vehicle running condition determined by the steering torque, the vehicle speed and the steering speed.

Second Embodiment

The second embodiment is specifically arranged so that the correction steering is easily executed without unnecessarily increasing the steering torque, when steering wheel 1 is largely steered or very quickly steered for the reason that the vehicle avoids emergent conditions or executes a correction steering during the generation of the unstable vehicle behavior.

Figure 16:
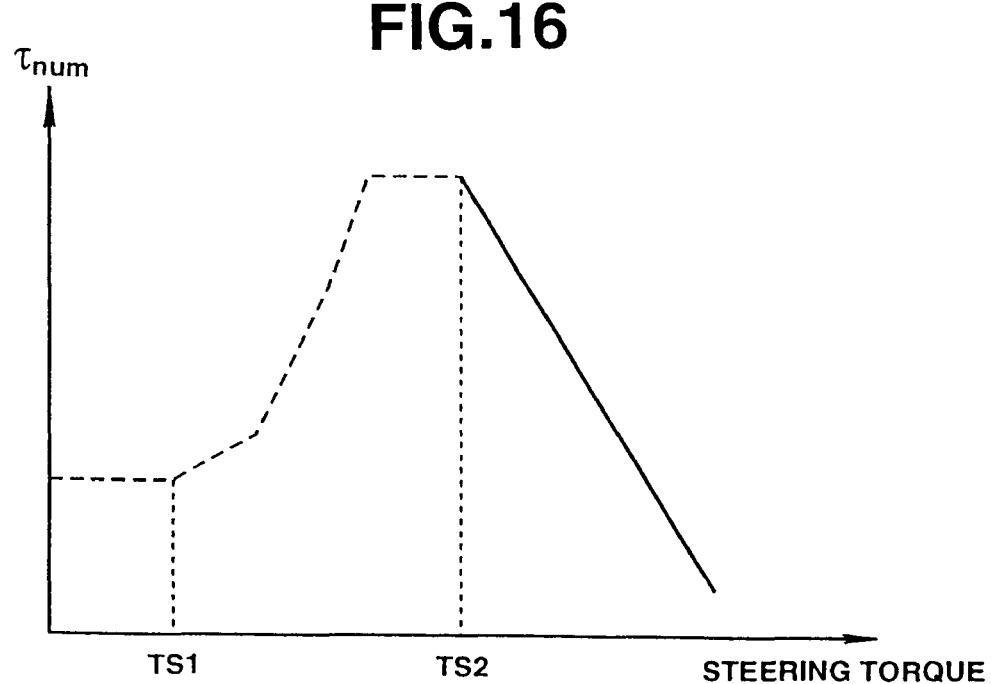
FIG. 16 is a graph showing a characteristic of the first-order advance time constant relative to the steering torque in a phase compensator of a second embodiment.

In the vehicular steering control apparatus of the second embodiment, phase compensator 16 sets the first-order-advance time constant τnum relative to the steering torque so that the first-order-advance time constant τnum maintains a constant value when the steering torque is in the straight-running steering range smaller than a first set value TS1, increases according to the increase of the steering torque when the steering torque is in a range between the first set value TS1 and a second set value TS2, and decreases according to the increase of the steering torque when the steering torque is greater than the second set value TS2, as shown in FIG. 16.

Figure 17:
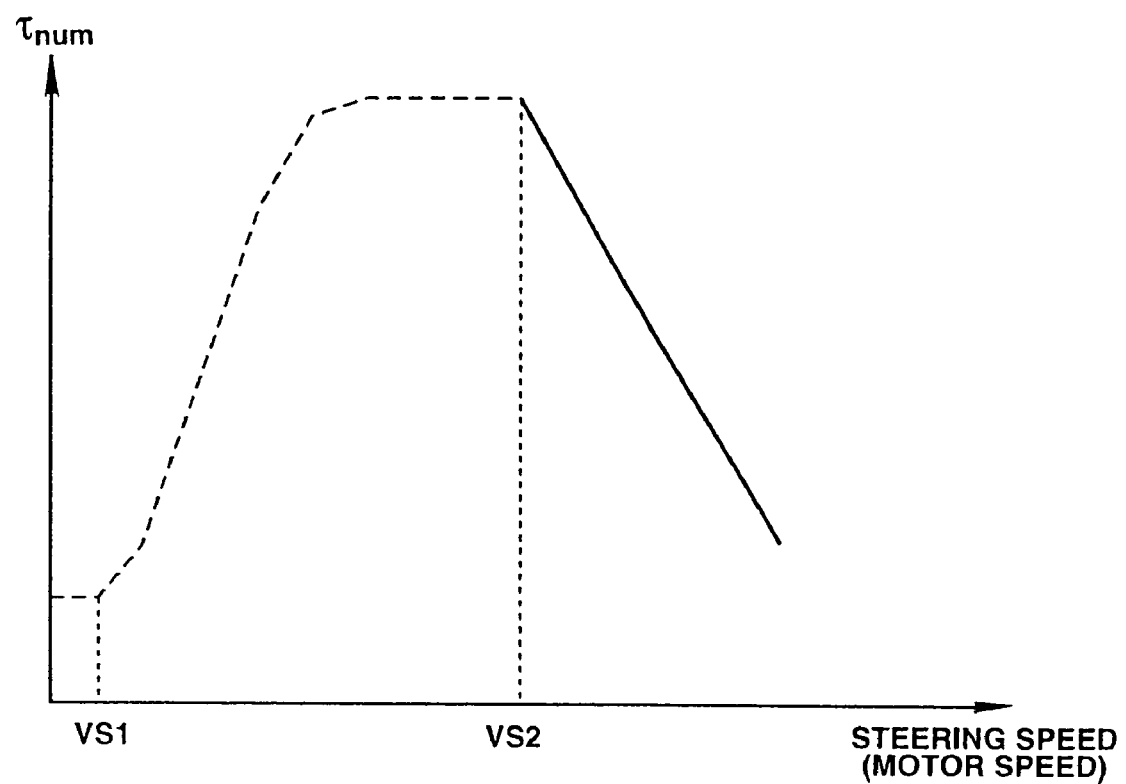
FIG. 17 is a graph showing a characteristic of the first-order advance time constant relative to the steering speed in the phase compensator of the second embodiment.

Further, phase compensator 16 sets the first-order-advance time constant τnum relative to the steering speed so that the first-order-advance time constant τnum maintains a constant value when the steering speed is in a straight-running steering range smaller than a first set value VS1, increases according to the increase of the steering speed when the steering speed in a range between the first set value VS1 and a second set value VS2, and decreases according to the increase of the steering speed when the steering speed is higher than the second set value VS2, as shown in FIG. 17. Since the other construction of the second embodiment is the same as that of the first embodiment, illustration and explanation thereof are omitted herein.

Subsequently there is discussed the manner of operation of the vehicular steering control apparatus of the second embodiment. Since the second embodiment is arranged such that when the steering torque is smaller than or equal to a predetermined steering torque within a normal torque range of a normal driving (steering torque≦second set value TS2), the steering torque change quantity is increased and decreased according to the steering torque taken at the steering wheel holding state under the condition that steering wheel 1 is turned up or returned from the steering-wheel holding state during the cornering. This arrangement obtains the stable feeling under the steering-wheel holding state during cornering. Specifically, since the steering torque change is produced by a predetermined quantity under a small steering torque state, it becomes possible to obtain the neutral state of steering wheel 1 during the vehicle straight running state. Additionally, in the range where the steering torque is greater than the second set value TS2, the inverse assist quantity is decreased. Therefore, even when steering wheel 1 is largely steered for executing the correction steering operation in the emergency condition or the unstable vehicle behavior generating condition, the steering torque is not unnecessarily increased, and therefore it becomes possible to easily execute the correction steering.

Within a predetermined steering speed determined at the steering speed used for the usual operation (steering speed≦second preset value VS2), the steering torque change quantity increases as the steering speed increases. That is, the running stability of the vehicle increases as the steering wheel 1 is quickly steered. Further, although it generally becomes difficult to detect the accurate counter electromotive force for estimating the steering speed with a predetermined high accuracy for the reason of signal noises, the second embodiment of the present invention is arranged to set the first-order-advance time constant τnum at a predetermined inverse assist when the steering speed is small (steering speed≦first set value TS1). Accordingly, it becomes possible to obtain the neutral feeling during a slight steering operation while avoiding the fluctuation of the vehicle. Further, when the steering speed is higher than the second set value TS2, the inverse assist quantity is decreased. Therefore, even when steering wheel 1 is largely steered for executing the correction steering operation in the emergency condition or the unstable vehicle behavior generating condition, the steering torque is not unnecessarily increased, and therefore it becomes possible to easily execute the correction steering operation. Since the other operations of the second embodiment is the same as those of the first embodiment, the explanation thereof is omitted herein.

Subsequently there is discussed the merits of the second embodiment. The vehicular steering control apparatus of the second embodiment obtains the following effects in addition to the effects (1), (2), (3), (4) of the first embodiment.

(9) Phase compensator 16 sets the first-order-advance time constant τnum relative to the steering torque so that the first-order-advance time constant τnum maintains the constant value when the steering torque is in the straight-running steering range smaller than a first set value TS1, increases according to the increase of the steering torque when the steering torque is in a range between the first set value TS1 and a second set value TS2, and decreases according to the increase of the steering torque when the steering torque is greater than the second set value TS2. Accordingly, when the steering torque is smaller than or equal to the first set value TS1, the neutral feeling of steering wheel 1 is obtained during the straight running state. When the steering torque is in a range from the first set value TS1 to the second set value TS2, the stable feeling during the steering wheel holding state in cornering. When the steering torque is greater than the second set value TS2, that is, when steering wheel 1 is largely steered for executing the correction steering operation in the emergency condition or the unstable vehicle behavior generating condition, the steering torque is not unnecessarily increased, and therefore it becomes possible to easily execute the correction steering operation.

(10) Phase compensator 16 sets the first-order advance time constant τnum relative to the steering speed so that the first-order advance time constant τnum has the constant value when the steering speed is in the straight-running steering range smaller than the first set value VS1, increases according to the increase of the steering speed when the steering speed is in the range between the first set value VS1 and the second set value VS2, and decreases according to the increase of the steering speed when the steering speed is greater than the second set value VS2. Accordingly, when the steering speed is smaller than or equal to the first set value VS1, the neutral feeling of steering wheel 1 is obtained during the slight steering state while preventing the fluctuation. When the steering speed is in a range from the first set value VS1 to the second set value VS2, the running stability of the vehicle is heightened as the steering speed increases. When the steering speed is greater than the second set value VS2, that is, when steering wheel 1 is largely steered for executing the correction steering operation in the emergency condition or the unstable vehicle behavior generating condition, the steering torque is not unnecessarily increased, and therefore it becomes possible to easily execute the correction steering operation.

Third Embodiment

The third embodiment according to the present invention is specifically arranged such that phase compensator 16 of controller 13 has two blocks for executing the control.

Figure 18:
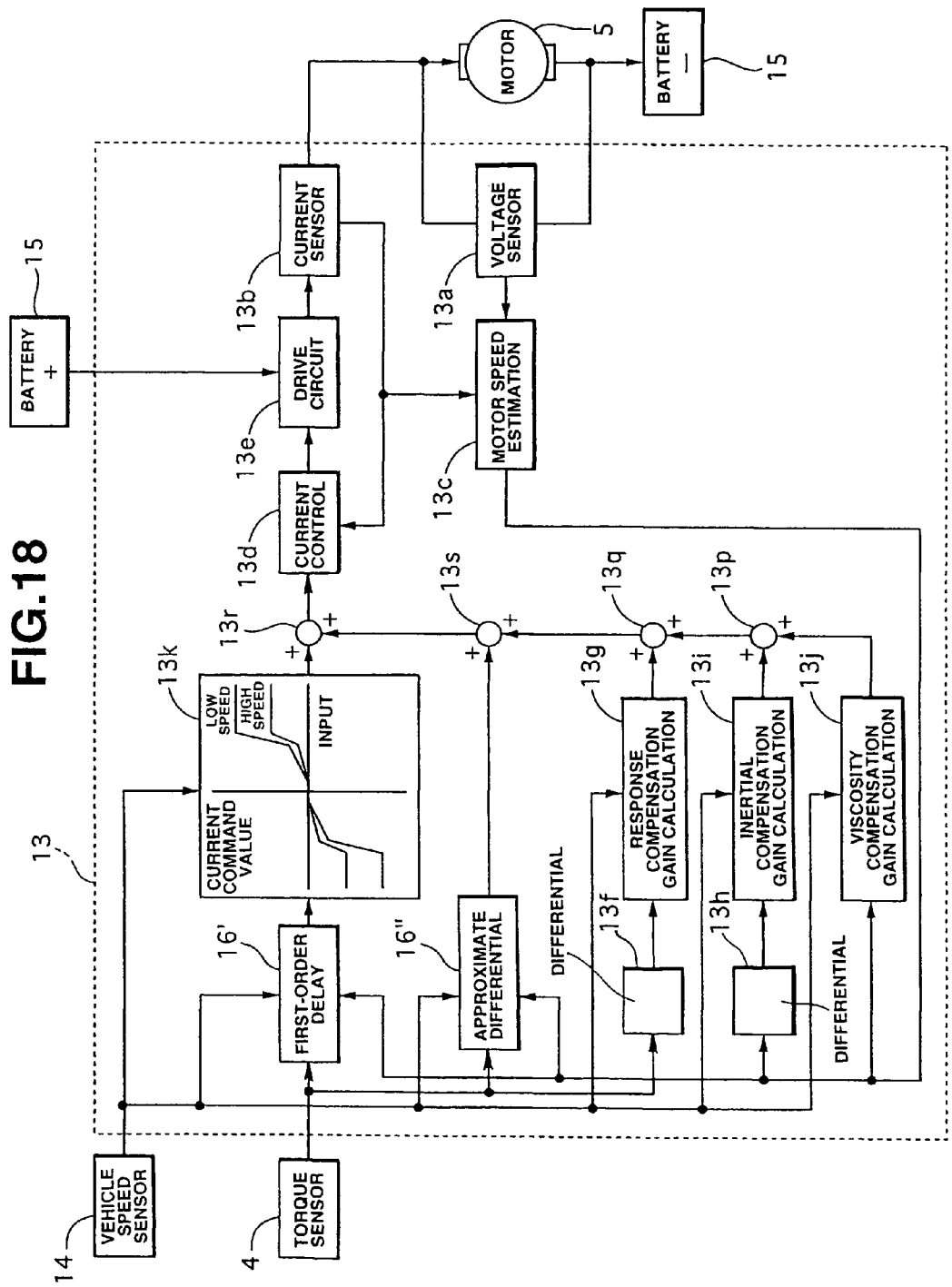
FIG. 18 is a control block diagram of the vehicular steering control apparatus of a third embodiment.

More specifically, as shown in FIG. 18, the expression $(K-\tau num \cdot S)/(1+\tau den \cdot S)$ of phase compensator 16 is factored into $K/(1+\tau den \cdot S)+(-\tau num \cdot S)/(1+\tau den \cdot S)$ and the factored expression is executed by the following two blocks 16' and 16". A first-order delay compensation block 16' represented by $K/(1+\tau den \cdot S)$ executes a first-order-delay compensation control. An approximation differential compensation block 16" represented by $(-\tau num \cdot S)/(1+\tau den \cdot S)$ executes an approximation differential compensation control. In FIG. 18, an adder 13s adds a command current value obtained at approximation differential compensation block 16" to the sum of the compensation gains obtained respectively at blocks 13g, 13i and 13j. Since the other construction of the third embodiment is the same as that of the first embodiment or the second embodiment, the same components are denoted by the same references and the explanation thereof is omitted herein.

As to the operation of the third embodiment, although phase compensator 16 of the first embodiment executes the operation using the one block expressed by the function $K/(1+\tau den \cdot S)+(-\tau num \cdot S)/(1+\tau den \cdot S)$, the operation corresponding to the first embodiment is executed by the first-order delay compensation block 16 represented by $K/(1+\tau den \cdot S)$ of executing a first-order delay compensation control and the approximation differential compensation block 16" represented by $K/(1+\tau\text{den}\cdot S)+(-\tau\text{num}\cdot S/(1+\tau\text{den}\cdot S))$ of executing the approximation differential compensation. Since the other function of the third embodiment is the same as that of the first embodiment or second embodiment, the explanation thereof is omitted herein.

Next, there is discussed effects of the third embodiment. The vehicular steering control apparatus of the third embodiment obtains the following effect in addition to the effects of the first embodiment or second embodiment.

(11) Phase compensator 16 of the third embodiment factors the expression $(K-\tau\text{num}\cdot S)/(1+\tau\text{den}\cdot S)$ into $K/(1+\tau\text{den}\cdot S)+(-\tau\text{num}\cdot S)(1+\tau\text{den}\cdot S)$, and the first-order delay compensation 16' represented by $K/(1+\tau\text{den}\cdot S)$ for executing the first-order delay compensation control and the approximation differential compensation block 16" represented by $(-\tau\text{num}\cdot S)/(1+\tau\text{den}\cdot S)$ for executing the approximation differential compensation control. This arrangement simplifies the control characteristic as compared with those of the first and second embodiments and further facilitates the installation of the compensator function in controller 13.

Fourth Embodiment

A fourth embodiment according to the present invention is specifically arranged to provide the steering state judgment part which judges a steering state ((steering-wheel turn)/(steering-wheel return)/slalom), and to change the controlled variable of phase compensator 16 according to the steering state.

Figure 19:
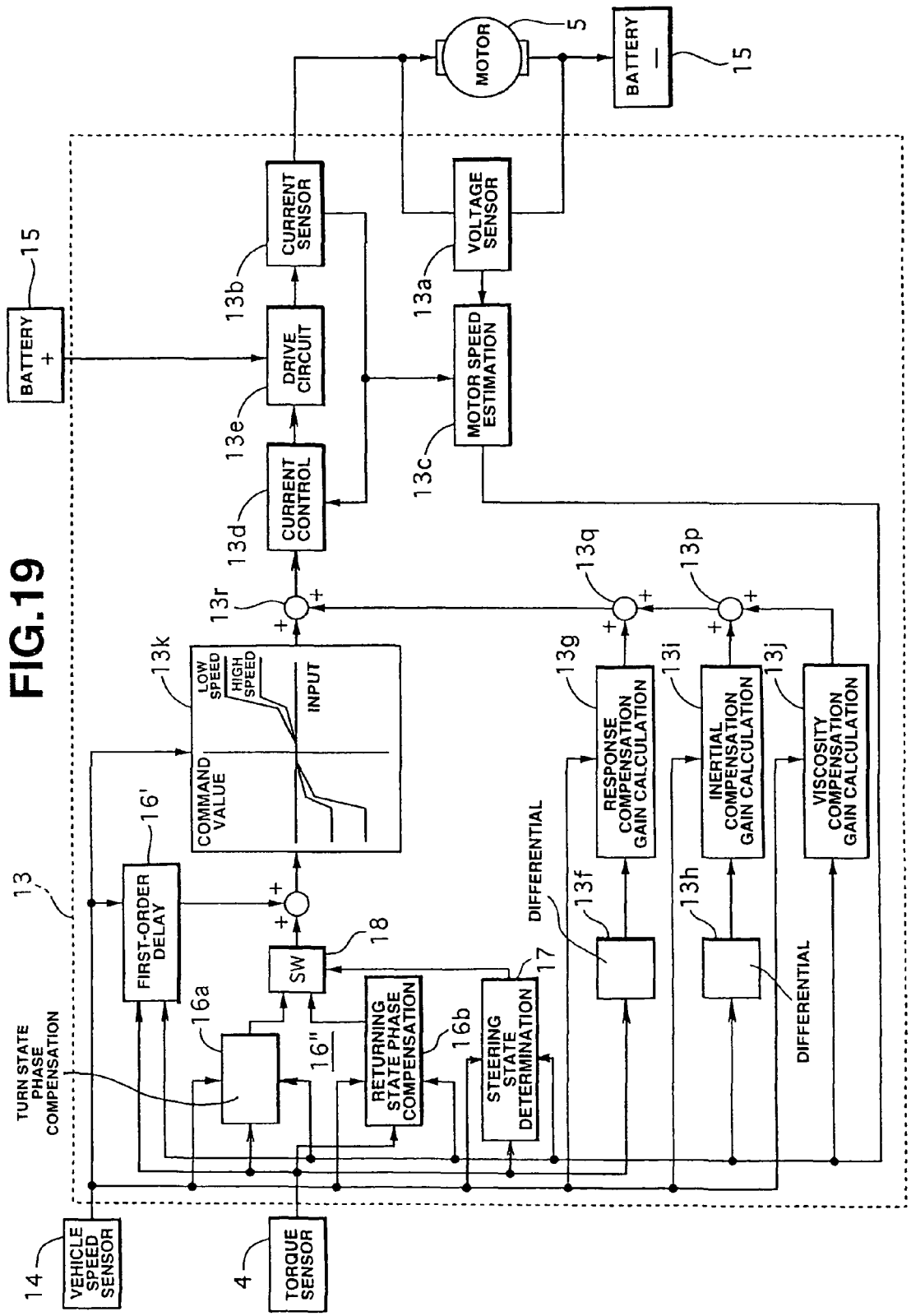
FIG. 19 is a control block diagram of the vehicular steering control apparatus of a fourth embodiment.

There is discussed a control system of the fourth embodiment with reference to a block diagram showing a control of the vehicular steering control apparatus according to the fourth embodiment of the present invention in FIG. 19. In the fourth embodiment, controller 13 receives the steering torque and the steering speed, and comprises a steering state determining section 17 (steering-wheel turning/returning determining means) for determining a steering state (turn/return/slalom), steering-wheel-turn phase compensator 16a having a characteristic corresponding to the steering-wheel turning process, a steering-wheel-return phase compensator 16b having a characteristic corresponding to the steering-wheel returning process including a slalom, a switching section 18 for switching between steering-wheel-turn phase compensator 16a and steering-wheel-return phase compensator 16b according to the output of steering state determining section 17. Since the other construction of the fourth embodiment is the same as that of the first embodiment, the corresponding parts and constructions are denoted by the same reference numerals and the explanation thereof is omitted herein.

Next, there is discussed the operation of the fourth embodiment.

[Steering State Determining Operation]

Figure 20A:
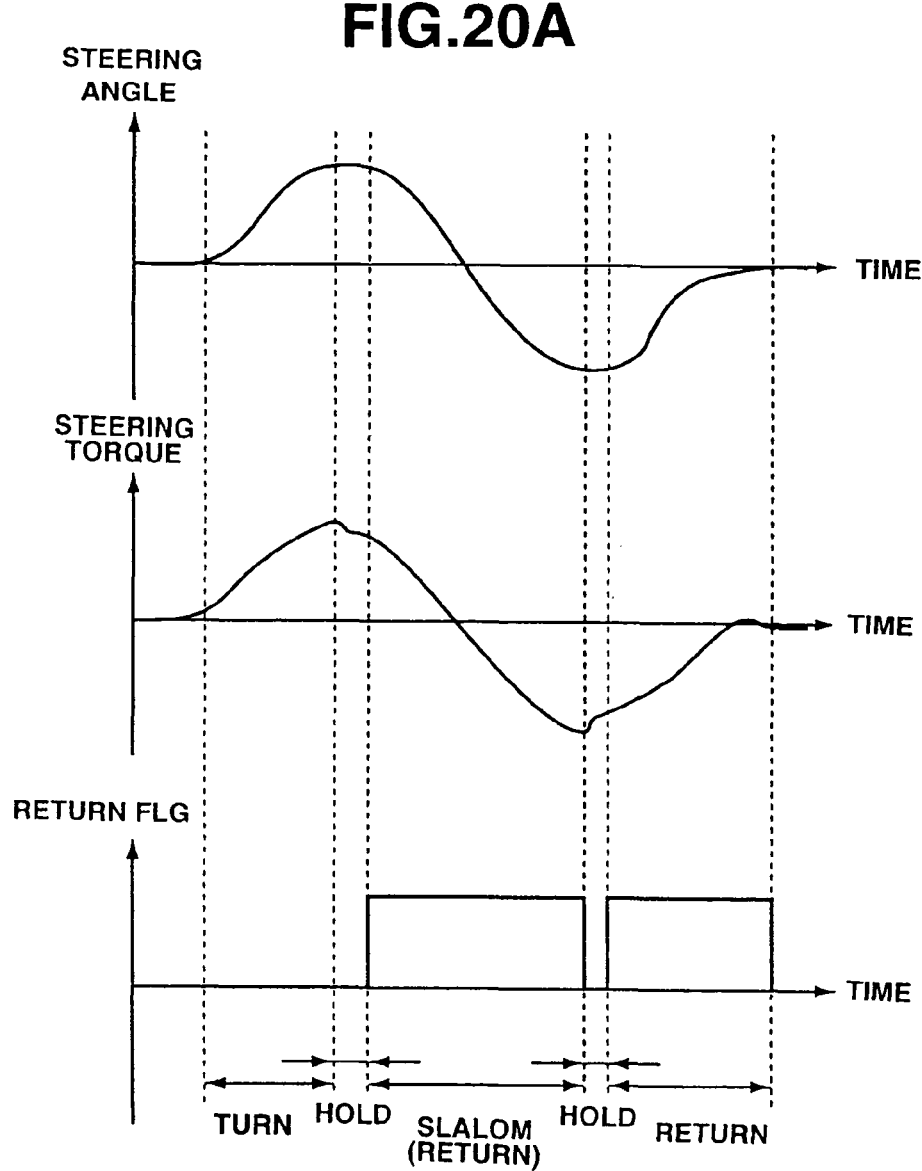
FIG. 20A is time charts of the steering angle, the steering torque and the return flag in the vehicular steering control apparatus of the fourth embodiment in case that a lane change was executed.
Figure 20B:
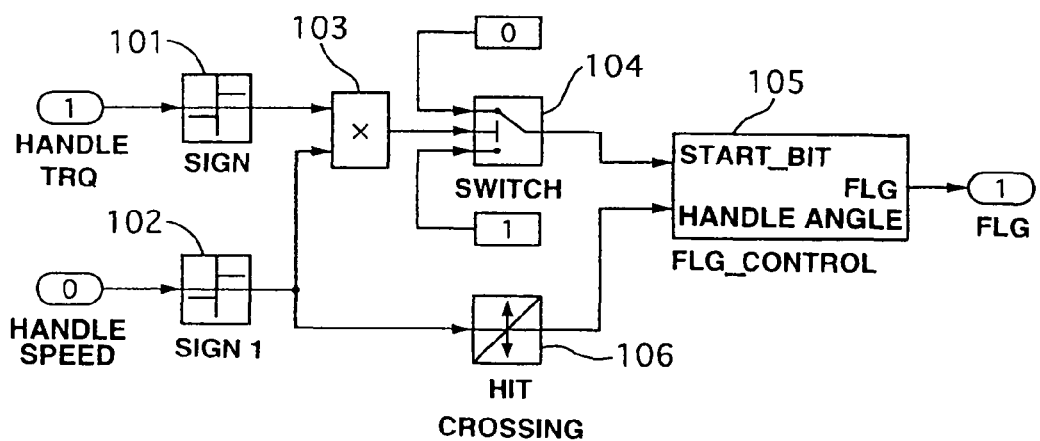
FIG. 20B is a block diagram showing a steering state determining control in the vehicular steering control apparatus of the fourth embodiment.

There is discussed the operation of the steering state determining section 17 with reference to FIGS. 20A and 20B.

FIG. 20A shows a steering pattern at the time of executing a lane change. When the polarity of the steering torque differs from the polarity of the steering speed, a return flag FLG is set to 1 (FLG=1). When the steering speed becomes a predetermined value including zero, the return flag FLG is set at zero (FLG=0). By this setting of the return flag FLG, the determination as to the steering-wheel returning operation or a slalom is executed.

FIG. 20B shows a control block of determining the steering state. A block 101 determines the polarity of the steering torque (HANDLE TRQ). When the polarity of the steering torque is positive, block 101 outputs 1. When the polarity of the steering torque is negative, block 101 outputs −1. A block 102 determines the polarity of the steering speed (HANDLE SPEED). When the polarity of the steering speed is positive, block 102 outputs 1. When the polarity of the steering speed is negative, block 102 outputs −1. A block 103 obtains a product of the output of blocks 101 and the output of block 102. A block 104 determines that the polarities are the same when the product calculated at block 103 is positive, and then outputs 0. At a block 105, when the product calculated at block 103 is changed from 0 to 1, the return flag FLG is changed from 0 to 1. Block 105 determines whether the steering speed becomes a predetermined value including 0, and the return flag FLG is changed from 1 to 0 when it is determined that the steering speed becomes the predetermined value. Steering state determining section 17 determines whether the steering state is the steering-wheel turning state or one of the steering-wheel returning state and the slalom state, by executing the processing executed by blocks 101 through 105 in FIG. 20B.

[Phase Compensation Characteristic According to Steering State]

Figure 21:
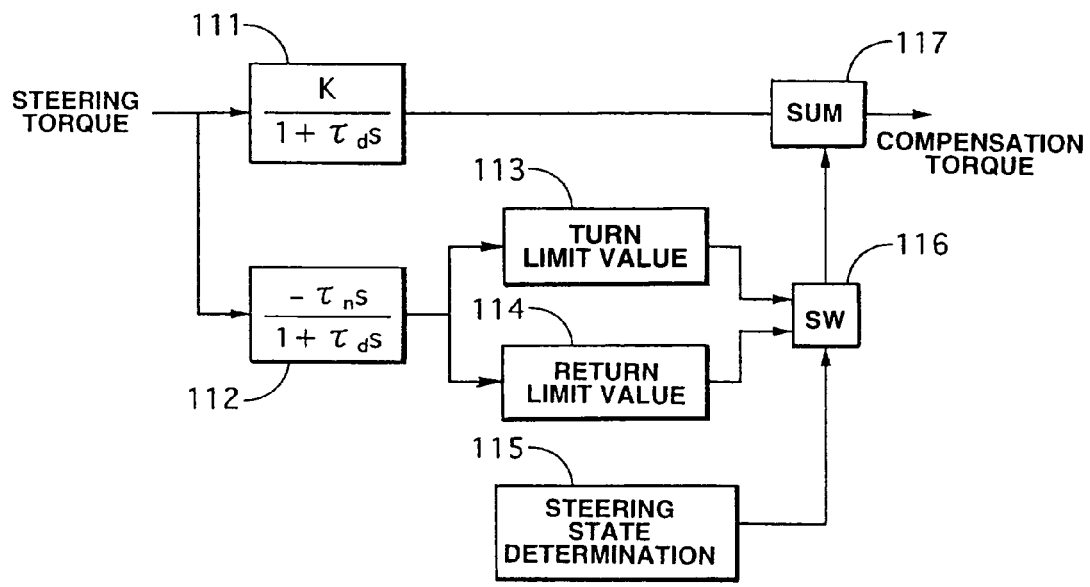
FIG. 21 is a block diagram showing a phase compensation characteristic according to the steering state in the vehicular steering control apparatus of the fourth embodiment.

There is discussed the phase compensation characteristic according to the steering state with reference to FIG. 21. The explanation is made as to a case that controller 13 executes the phase compensation by separating $K/(1+\tau\text{den}\cdot S)+(-\tau\text{num}\cdot S)/(1+\tau\text{den}\cdot S)$ into two blocks.

Block 111 executes the first-order delay processing by multiplying the steering torque by a predetermined gain of $K/(1+\tau\text{den}\cdot S)$. Block 112 executes the approximation differential processing of the steering torque using the predetermined gain and the time constant based on $(-\tau\text{num}\cdot S)/(1+\tau\text{den}\cdot S)$. Block 113 limits the output of block 112 by a first limit value when the steering-wheel turning operation is executed. Block 114 limits the output of block 112 by a second limit value when the steering-wheel returning operation is executed. Block 115 determines the steering state (turn/return/slalom) by steering state determining section 17 explained using FIG. 20B. Block 116 outputs the output of block 113 when it is determined that the steering state is the steering-wheel turning state from the output of the steering state determining section 17. Block 116 outputs the output of block 114 when it is determined that the steering state is the steering-wheel returning state from the output of the steering state determining section 17. Block 117 obtains a torque phase compensation value by adding the output of block 111 and the output of block 116. In the above explanation, the first limit value is greater than the second limit value.

[About Torque Phase Compensation]

Figure 22:
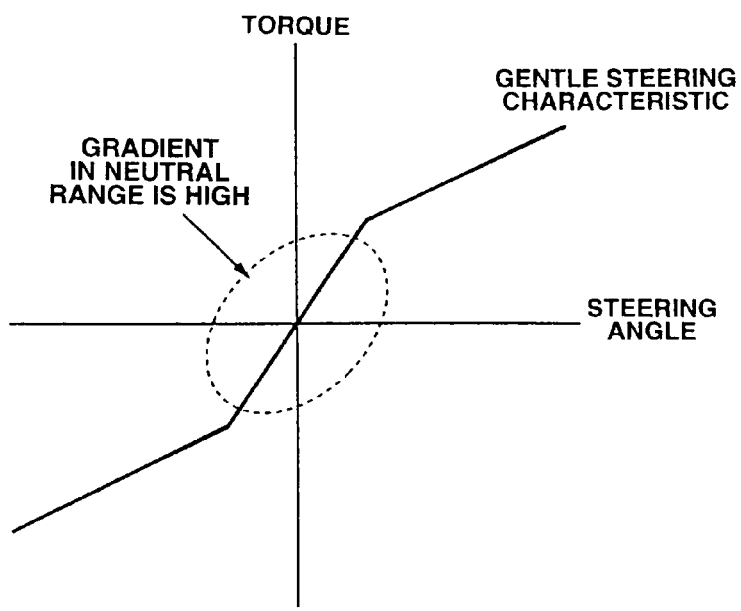
FIG. 22 is a graph showing a general relationship between the steering angle and the torque.
Figure 23:
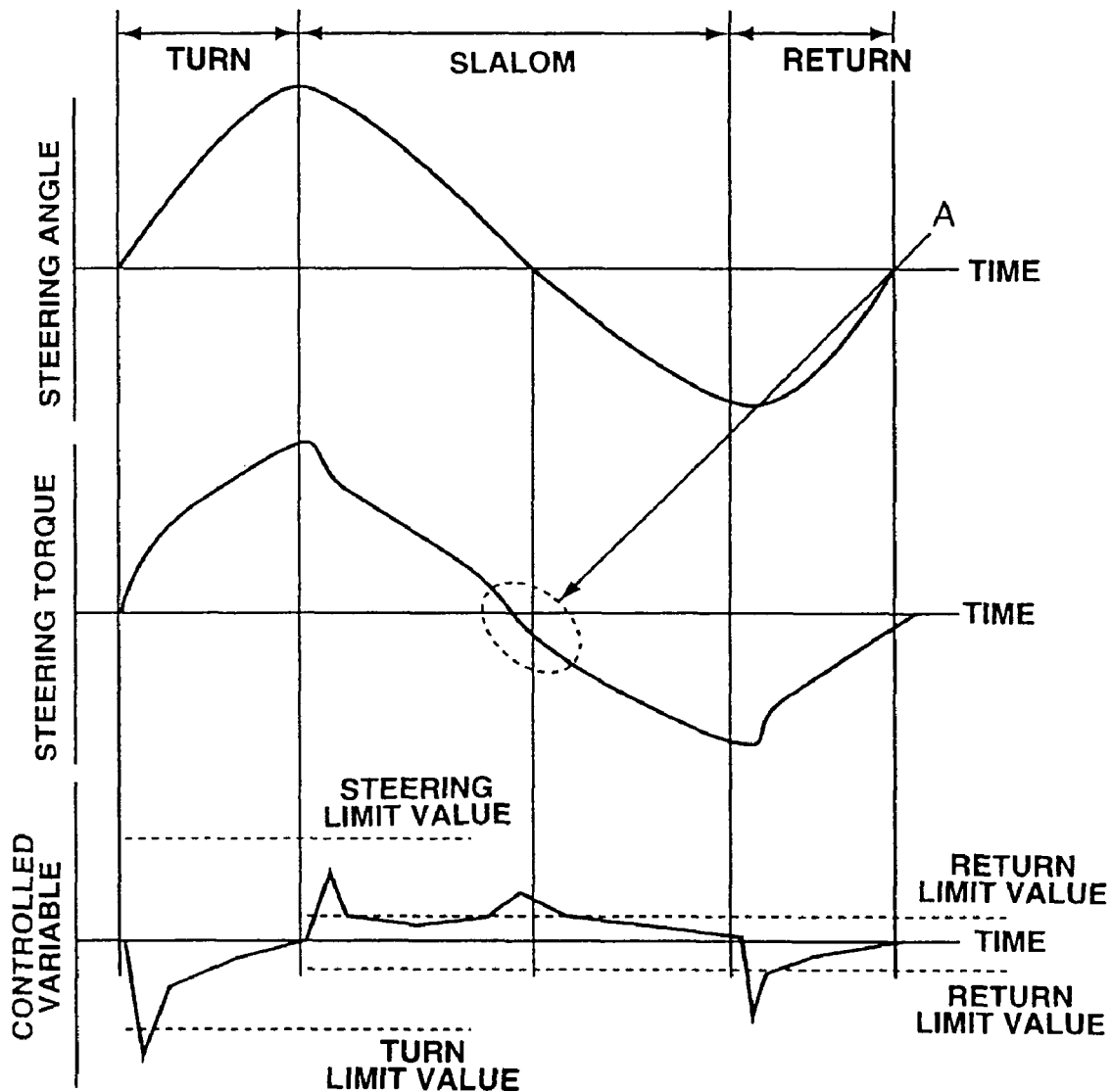
FIG. 23 is time charts of the steering angle, the steering torque and the controlled variable in the vehicular steering control apparatus of the fourth embodiment in case that a lane change was executed.
Figure 24:
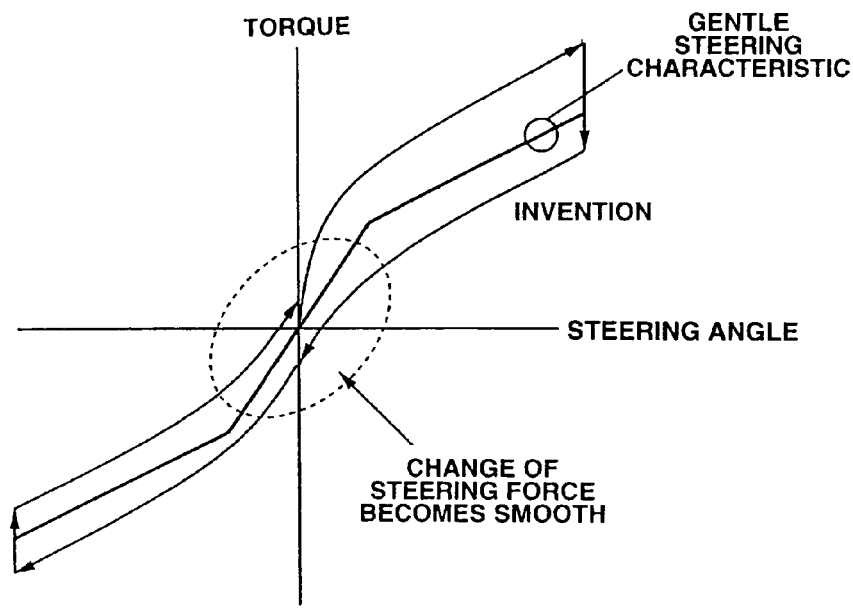
FIG. 24 is a graph showing an effect of the fourth embodiment in the form of a relationship between the steering torque and the torque.

There is discussed the operation of the torque phase compensation with reference to FIGS. 22, 23 and 24. Generally, the steering characteristic is arranged such that the gradient of the steering torque in a small-steering-quantity range is greater than that in a large-steering-quantity range, in order to easily obtain the steady feeling in the neutral range, to transmit a small change of the vehicle behavior to a driver as a change of the steering reaction force, and to enable the light steering operation while suppressing the increase of the steering torque in a large steering quantity state.

If the lane change is executed using the steering angle characteristic shown in FIG. 23, the above-discussed steering characteristic is performed. Therefore, the change of the steering torque becomes large when the steering angle during the slalom is in the neighborhood of zero or when the steering torque is in the neighborhood of zero, as shown by an area A of the steering torque characteristic in FIG. 23. However, during the slalom, a driver steers steering wheel 1 without feeling the vehicle behavior from the reaction force, and rather steers steering wheel 1 like as a feed-forward control. Therefore, the driver has a good steer feeling when the change of the steering torque relative to the steering angle is small during the slalom. If the steering torque change during the neutral state becomes large, the driver has an unsmooth steering feeling during the slalom, and the smooth operation is prevented thereby.

Therefore, as shown by a controlled variable characteristic in FIG. 23, by limiting the maximum values of the steering-wheel turning process and the steering-wheel returning process and by setting the limit value of the steering-wheel returning process (including slalom) at a value smaller than the limit value of the steering-wheel turning process, the steering torque change is decreased when the steering angle during the slalom process is in the neighborhood of zero or when the steering torque during the slalom is in the neighborhood of zero as shown in FIG. 23. This arrangement improves the steer feeling. Since the other operations are the same as those of the third embodiment, the explanation thereof is omitted herein.

Next, there is discussed effects of the fourth embodiment. The vehicular steering control apparatus according to the fourth embodiment obtains the following effect in addition to the effect of the third embodiment.

(12) Since there are provided the steering state determining section 17 for determining the steering-wheel turning operation or the steering-wheel returning operation and the phase compensator 16 of limiting the controlled variable by the first limit value during the steering-wheel turning process and of limiting the control variable by the second limit value during the steering-wheel returning process, it becomes possible to effectively activate the damping during the steering-wheel turning process positively manipulated by the driver and to smoothly execute the steering-wheel returning operation.

Fifth Embodiment

A fifth embodiment according to the present invention is specifically arranged to comprise a steering state determining section for determining the steering state (turning/returning/slalom) and to change the gain of the phase compensator according to the steering state. Since a control block diagram of the fifth embodiment is the same as that of the firth embodiment, the illustration and explanation thereof are omitted herein.

Next, there is discussed the operation of the fifth embodiment according to the present invention. The operation of the steering state determination is the same as that of the fourth embodiment shown in FIGS. 20A and 20B.

[Phase Compensation Characteristic According to Steering State]

Figure 25:
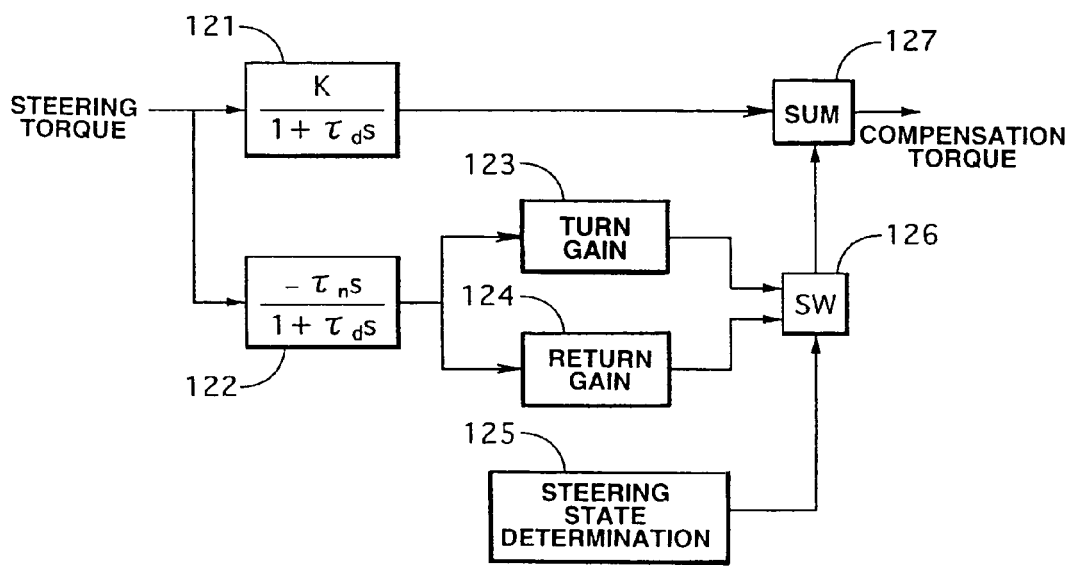
FIG. 25 is a block diagram showing a phase compensation characteristic according to the steering state in the vehicular steering control apparatus of the fourth embodiment.

There is discussed the phase compensation characteristic according to the steering state with reference to FIG. 25. The explanation is made as to a case that controller 13 executes the phase compensation by separating $K/(1+\tau_{den} \cdot S)+(-\tau_{num} \cdot S)/(1+\tau_{den} \cdot S)$ into two blocks represented by $K/(1+\tau_{den} \cdot S)$ and $(-\tau_{num} \cdot S)/(1+\tau_{den} \cdot S)$.

Block 121 executes the first-order delay processing by multiplying the steering torque by a predetermined gain of $K/(1+\tau_{den} \cdot S)$. Block 122 executes the approximation differential processing of the steering torque using the predetermined gain and the time constant based on $(-\tau_{num} \cdot S)/(1+\tau_{den} \cdot S)$. Block 123 multiplies the output of block 122 by a first gain (steer gain) when the steering-wheel turning operation is executed. Block 124 multiplies the output of block 112 by a second gain (return gain) when the steering-wheel returning operation is executed. Block 125 determines the steering state (turn/return/slalom) in the steering state determining section 17 using FIG. 20B. Block 126 outputs the output of block 123 when it is determined that the steering state is the steering-wheel turning state from the output of the steering state determining section 17. Block 126 outputs the output of block 114 when it is determined that the steering state is the steering-wheel returning state from the output of the steering state determining section 17. Block 127 obtains a torque phase compensation value by adding the outputs of blocks 121 and 126. In the above explanation, the first gain is greater than the second gain.

[About Torque Phase Compensation]

Figure 26:
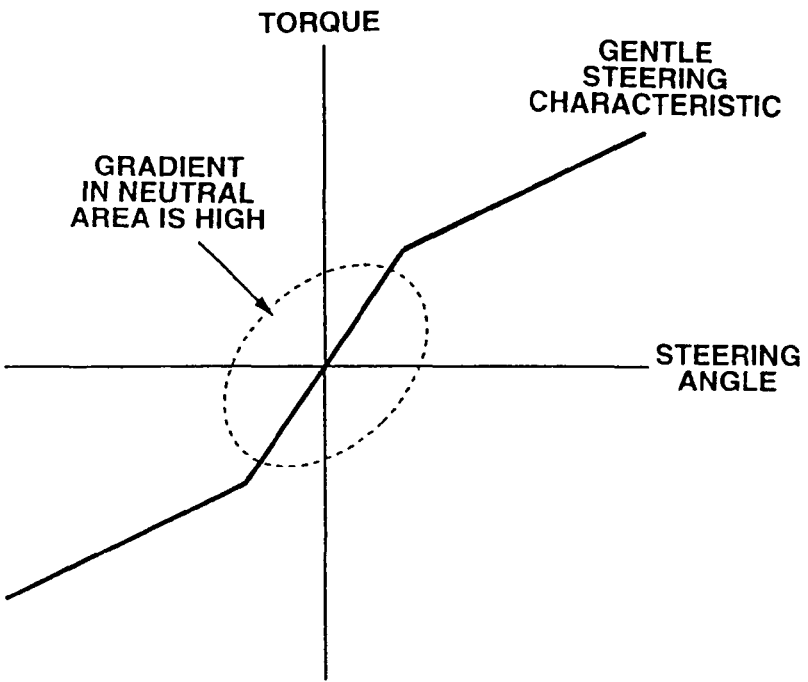
FIG. 26 is a graph showing a general characteristic between the steering angle and the torque.
Figure 28:
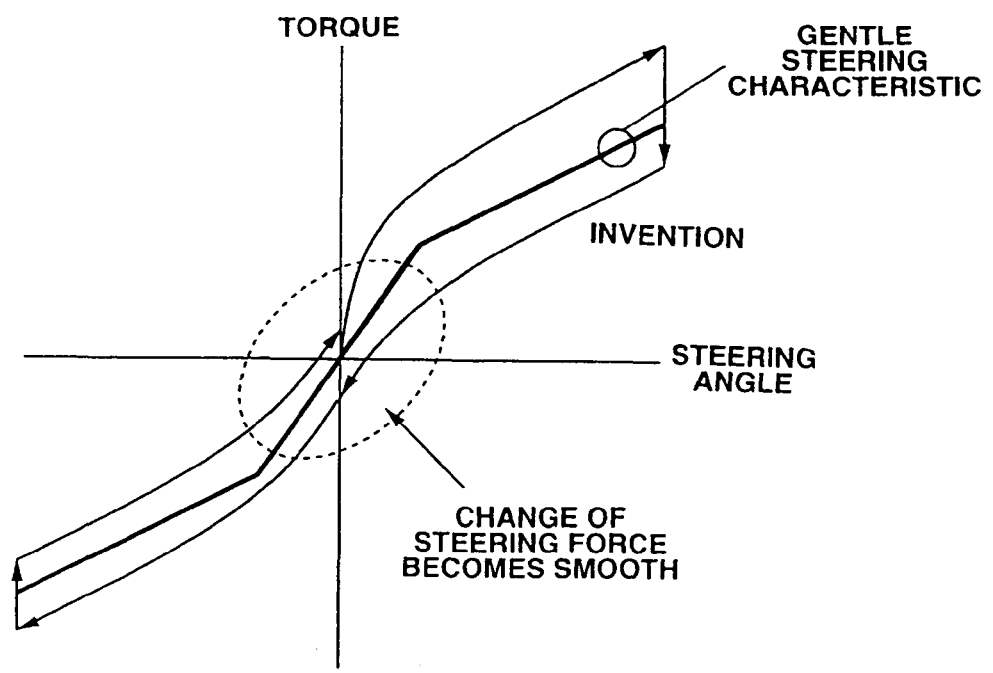
FIG. 28 is a graph showing an effect of the fifth embodiment in the form of a relationship between the steering torque and the torque.
Figure 27:
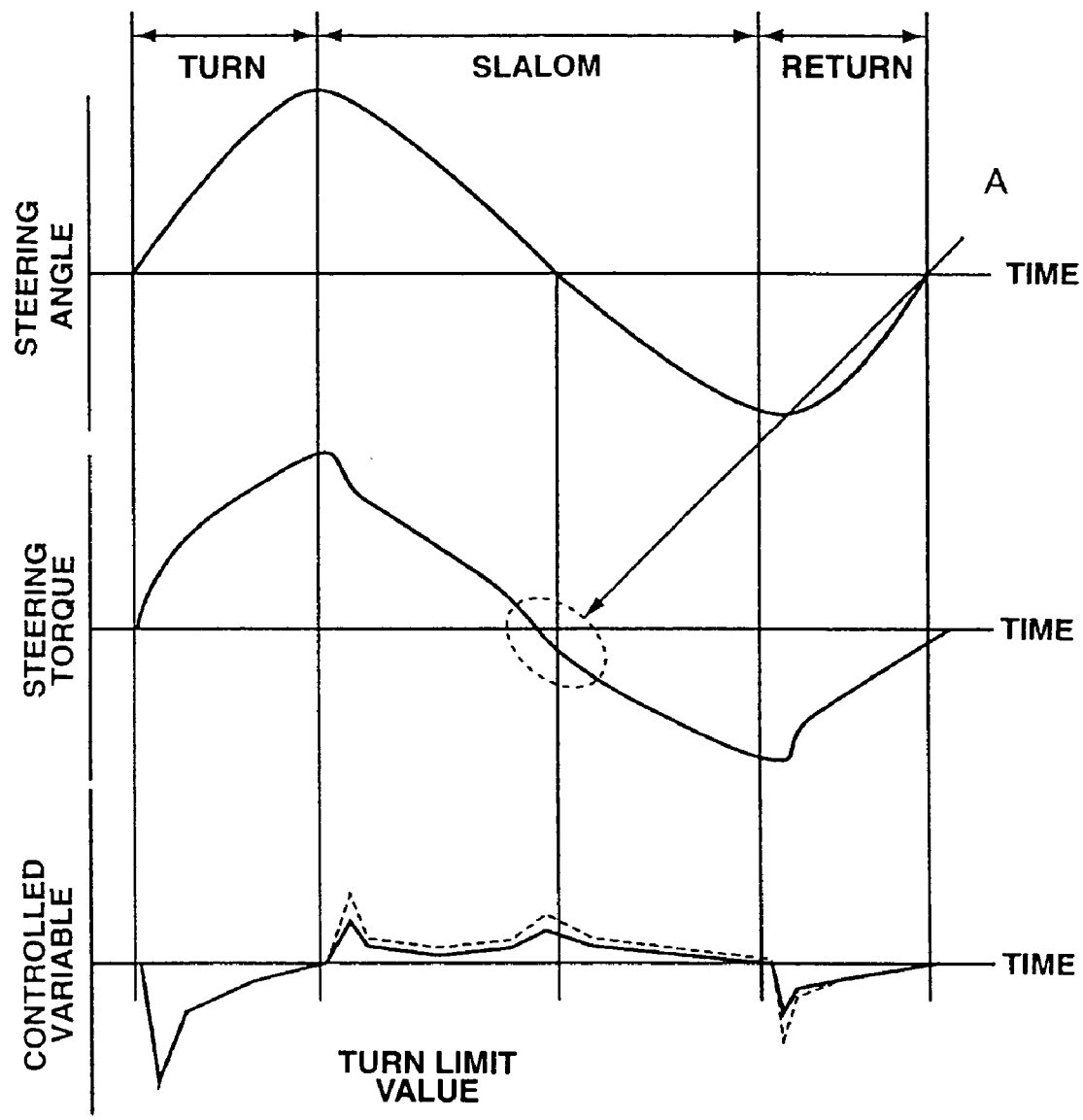
FIG. 27 is time charts of the steering angle, the steering torque and the controlled variable in the vehicular steering control apparatus of the fifth embodiment in case that a lane change was executed.

There is discussed the torque phase compensation with reference to is explained using FIGS. 26 through 28. Generally, the steering characteristic is arranged such that the gradient of the steering torque in a small-steering-quantity range is greater than that in a large-steering-quantity range, in order to easily obtain the stable feeling in the neutral range, to transmit a small change of the vehicle behavior to a driver as a change of the steering reaction force, and to enable the light steering operation while suppressing the increase of the steering torque in a large steering quantity state.

If the lane change is executed using the steering angle characteristic shown in FIG. 27, the above-discussed steering characteristic is performed. Therefore, the change of the steering torque becomes large when the steering angle during the slalom is in the neighborhood of zero or when the steering torque is in the neighborhood of zero, as shown by an area A of the steering torque characteristic in FIG. 27. However, during the slalom, a driver steers steering wheel 1 without sensing the vehicle behavior from the reaction force, and rather steers steering wheel 1 like as a feed-forward control. Therefore, the driver has a good steering feeling when the change of the steering torque relative to the steering angle is small during the slalom. If the steering torque change during the neutral state becomes large, the driver has an unsmooth steering feeling during the slalom, and the smooth operation is prevented thereby.

Therefore, as shown by a controlled variable characteristic in FIG. 27, by setting the different gains relative to the controlled variable of the steering-wheel turning process and to the controlled variable of the steering-wheel returning process and by setting the gain of the steering-wheel returning process (including slalom) at a value smaller than the gain of the steering-wheel turning process, the steering torque change is decreased when the steering angle during the slalom process is in the neighborhood of zero or when the steering torque during the slalom is in the neighborhood of zero as shown in FIG. 27. This arrangement improves the steering feeling. Since the other operations are the same as those of the third embodiment, the explanation thereof is omitted herein.

Next, there is discussed effects of the fifth embodiment. The vehicular steering control apparatus according to the fifth embodiment obtains the following effect in addition to the effect of the third embodiment.

(13) Since there is provided the steering state determining section 17 for determining the steering-wheel turning operation or (and) the steering-wheel returning operation and phase compensator 16 of multiplying the controlled variable by the first gain during the steering-wheel turning process and of multiplying the control variable by the second gain during the steering-wheel returning process, it becomes possible to effectively activate the damping during the steering-wheel turning process positively manipulated by the driver and to smoothly execute the steering-wheel returning operation.

Sixth Embodiment

A sixth embodiment according to the present invention is specifically arranged to comprise a steering-wheel holding state determining section for determining a steering-wheel holding state and to change the characteristic of the phase compensator according to the steering-wheel holding state and the steering state.

Figure 29:
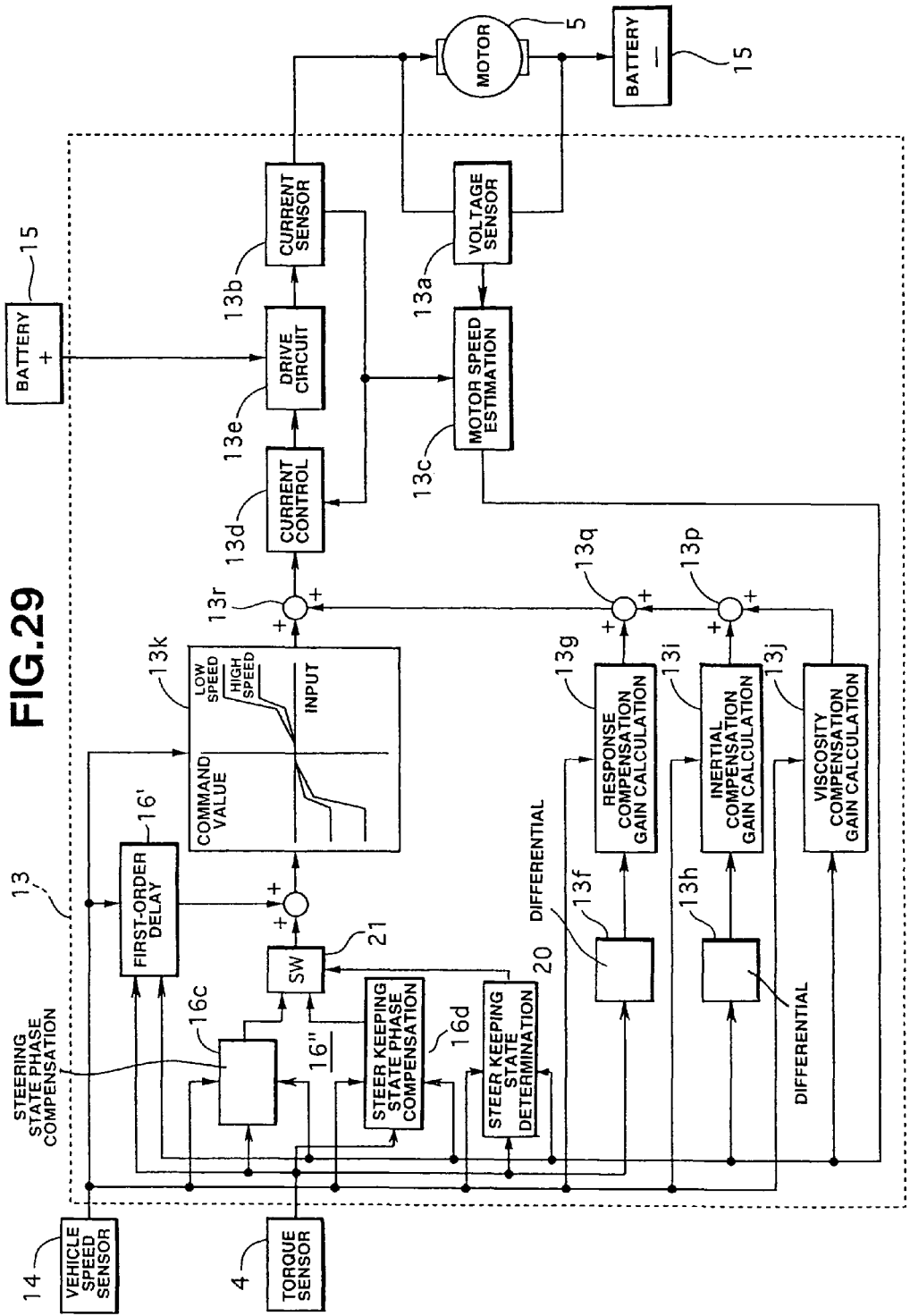
FIG. 29 is a control block diagram of the vehicular steering control apparatus of a sixth embodiment.

More specifically, there is discussed a control system based on a control block diagram of the vehicular steering control apparatus of the sixth embodiment shown in FIG. 29. In the sixth embodiment, controller 13 receives the steering torque and the steering speed, and comprises a steering-wheel holding state determining section (steer-holding determining means) 20 for determining a steering-wheel holding state, a steering-wheel turning state phase compensator 16c having a characteristic corresponding to the steering, a steering-wheel holding state phase compensator 16d having a characteristic corresponding to the holding, and a switching section 21 for selecting one of turning state phase compensator 16c and holding state phase compensator 16d according to the output of steering-wheel holding state determining section 20. Since the other construction of the sixth embodiment is the same as that of the first embodiment, the corresponding parts and constructions are denoted by the same reference numerals and the explanation thereof is omitted herein.

Next, there is discussed the operation of the fourth embodiment.

[Holding State Determining Operation]

Figure 30A:
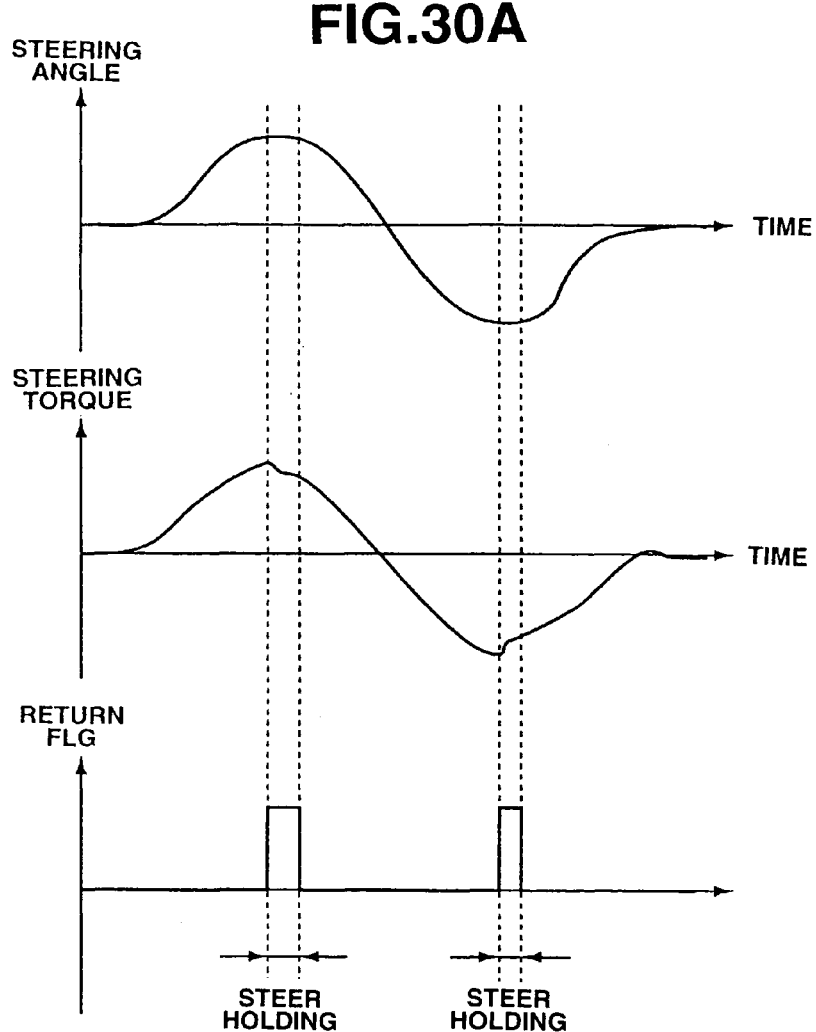
FIG. 30A is time charts of the steering angle, the steering torque and the return flag in the vehicular steering control apparatus of the sixth embodiment in case that a lane change was executed.
Figure 30B:
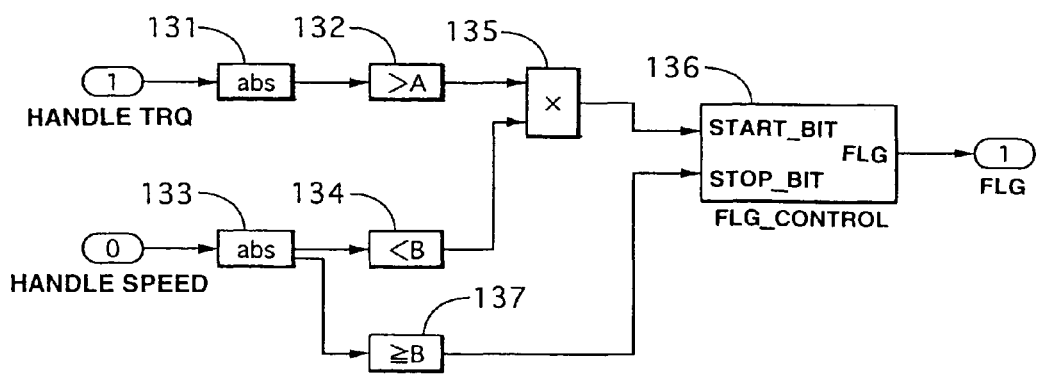
FIG. 30B is a block diagram showing a steering state determining control in the vehicular steering control apparatus of the sixth embodiment.

There is discussed the operation of the steering-wheel holding state determining section 20 with reference to FIGS. 30A and 30B. FIG. 30A shows a steering pattern at the time of performing a lane change. When the inputted steering torque is greater than or equal to a predetermined torque value and the inputted steering speed is smaller than or equal to a predetermined speed value, it is determined that the vehicle is in a steering-wheel holding state. FIG. 30B shows a control block diagram of determining the holding state and steering state. Block 131 calculates an absolute value of the steering torque. Block 132 outputs 1 when the absolute value of the steering torque is greater than a predetermined value A, and outputs 0 when the absolute value is not greater than the predetermined value A. Block 133 calculates an absolute value of the predetermined value B, and outputs 0 when the absolute value is not smaller than the predetermined value B. Block 135 obtains a logical multiplication of the outpour of block 132 and the output of block 134. Block 135 outputs 1 when both outputs of blocks 132 and 134 are 1, and outputs 0 when neither output of block 132 nor output of block 134 is 0. Block 136 determines that the steering-wheel returning operation is terminated only when the output of block 137 is changed from 0 to 1.

[Phase Compensation Characteristic According to Steering-Wheel Holding State and Steering State]

Figure 31:
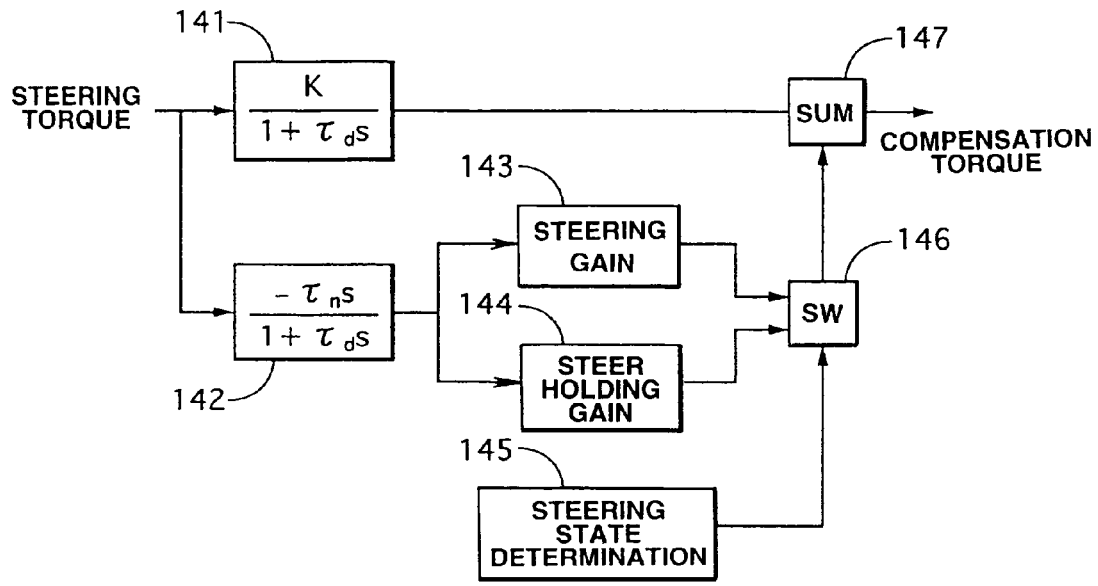
FIG. 31 is a block diagram showing a phase compensation characteristic according to the steering-wheel holding and steering states in the vehicular steering control apparatus of the sixth embodiment.

There is discussed the phase compensation characteristic according to the steering-wheel holding state and steering-wheel turning/returning state with reference to FIG. 31. The explanation is made as to a case that controller 13 executes the phase compensation by separating $K/(1+\tau_{den} \cdot S)+(-\tau_{num} \cdot S)/(1+\tau_{den} \cdot S)$ into two blocks. Block 141 executes the first-order delay processing by multiplying the steering torque by a predetermined gain of $K/(1+\tau_{den} \cdot S)$. Block 142 executes the approximation differential processing of the steering torque using the predetermined gain and the time constant based on $(-\tau_{num} \cdot S)/(1+\tau_{den} \cdot S)$. Block 143 multiplies the output of block 142 by a first gain when the steering-wheel turning operation is executed. Block 144 multiplies the output of block 142 by a second gain when the vehicle is put in the steering-wheel holding state. Block 145 determines the steering-wheel holding state in steering state determining section 20 of FIG. 30B when the inputted steering torque is greater than a predetermined torque value and the steering speed is smaller than a predetermined speed value. Block 146 outputs the output of block 143 when it is determined that the steering state is the steering-wheel turning state from the output of the steering state determining section 20. Block 146 outputs the output of block 144 when it is determined that the steering state is the steering-wheel holding state from the output of the steering state determining section 20. Block 147 obtains a torque phase compensation value by adding the outputs of blocks 141 and 146. In the above explanation, the first gain is smaller than the second gain.

[About Torque Phase Compensation]

Figure 33:
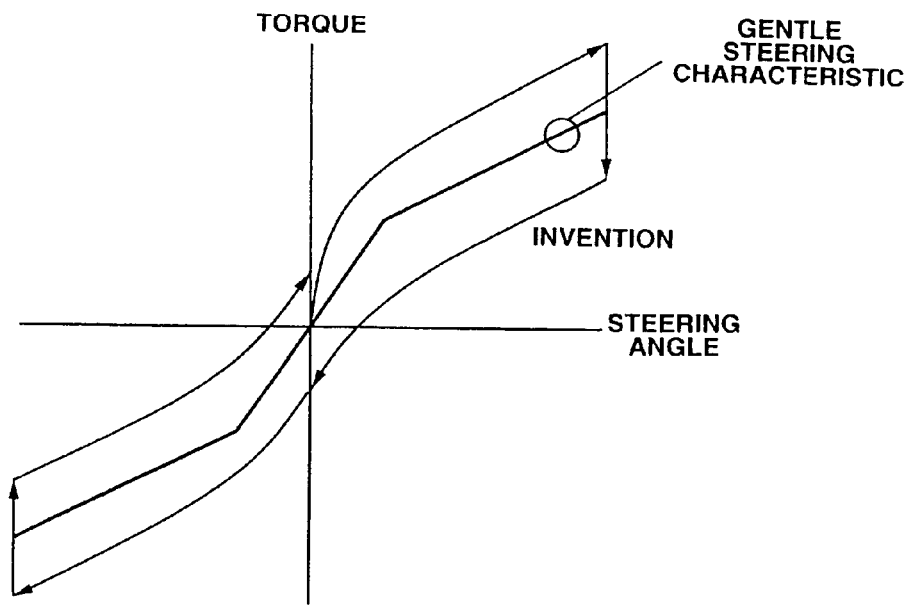
FIG. 33 is a graph showing an effect of the sixth embodiment in the form of a relationship between the steering torque and the torque.
Figure 32:
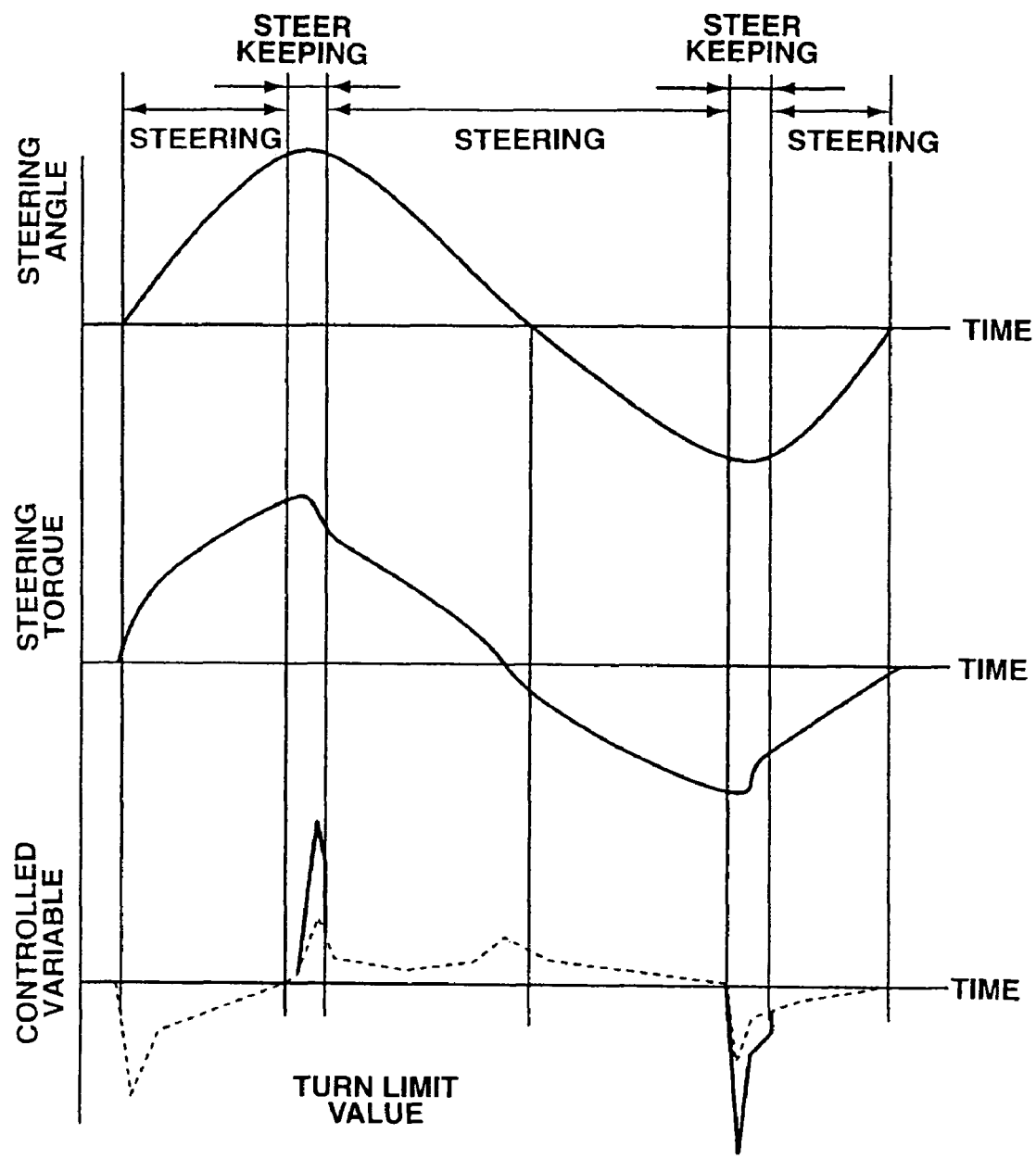
FIG. 32 is time charts of the steering angle, the steering torque and the controlled variable in the vehicular steering control apparatus of the sixth embodiment in case that a lane change was executed.

There is discussed the operation of the torque phase compensation with reference to FIGS. 32 and 33. Generally, when the steering state changes from a steering-wheel turning/returning state to the steering-wheel holding state, there is a difference between a steering force and a steer holding force, and a driver can easily control the vehicle when the holding force is smaller than the steering force. By employing the control of the sixth embodiment, the control variable characteristic shown in FIG. 32 is ensured so that the phase compensation quantity increases when the steering state is put in the steering-wheel holding state. Accordingly, as shown in FIG. 33, a difference between the steering torque and the holding torque becomes large in Lissajous figure.

Next, there is discussed effects of the sixth embodiment according to the present invention. The vehicular steering control apparatus according to the sixth embodiment ensures the following effects in addition to the effect of the third embodiment.

(14) Since there is provided with steering-wheel holding state determining section 20 for determining the steering-wheel holding state and phase compensator 16 of increasing the gain of the control immediately after the steering-wheel holding state, the steering torque change during the steering after the steering-wheel holding state is increased in addition to the damping during the steering state, and it becomes possible to ensure an easy and suitable steering characteristic.

Seventh Embodiment

A seventh embodiment according to the present invention is specifically arranged to comprise a steering-wheel holding state determining section for determining whether the steering state is a steering-wheel holding state or turning state from the steering input and the vehicle behavior and to decrease the phase compensation quantity during the steering state after the holding state so as to be smaller than the phase compensation quantity during the steering state.

More specifically, there is discussed a control system based on a control block diagram of the vehicular steering control apparatus of the seventh embodiment shown in FIG. 34. In the seventh embodiment, steering-wheel holding state determining section (steer-holding determining means) 22 receives the steering torque and the motor speed and determines a steering-wheel holding state. The motor speed is also inputted to phase compensator 16. Since the other construction of the seventh embodiment is the same as that of the first embodiment shown in FIG. 2, the corresponding parts and constructions are denoted by the same reference numerals and the explanation thereof is omitted herein.

Next, there is discussed the operation of the seventh embodiment.

[Phase Compensation Quantity Changing Operation According to Steering State]

Figure 35:
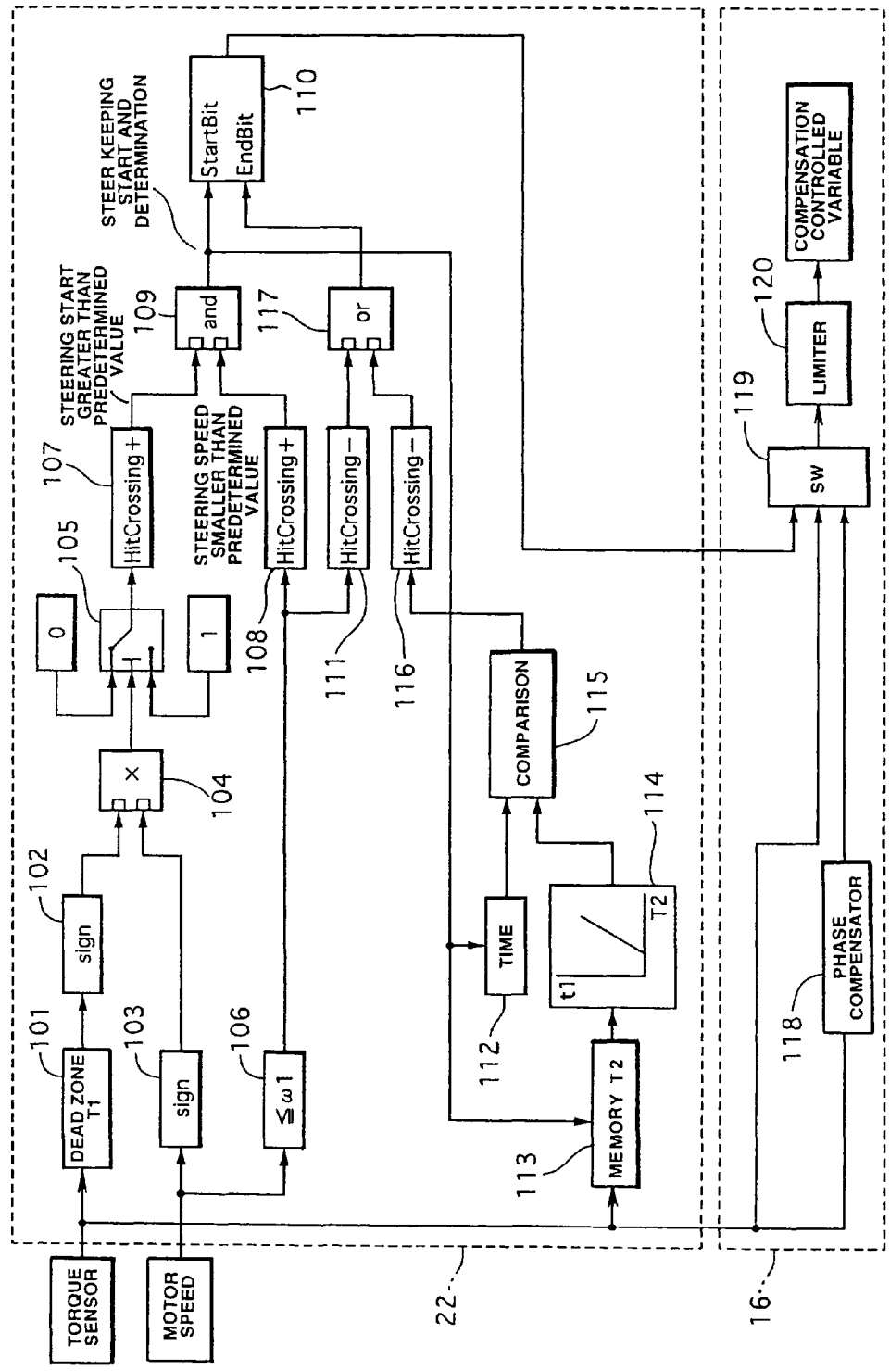
FIG. 35 is a control block diagram showing a phase compensation according to the steering state in the vehicular steering control apparatus of the seventh embodiment.

There is discussed the operation of steering-wheel holding state determining section 22 and phase compensator 16 according to the output of steering-wheel holding state determining section, with reference to FIG. 35.

Block 101 sets a dead zone of the steering torque. This dead zone does not correspond to that of torque sensor 4 but corresponds to a steering torque from which it is determined that the steering operation is executed according to the intention of the driver. Block 102 determines the polarity of the steering torque passed through the dead zone. When the polarity is positive, for example, when a right hand side steer is executed, block 102 outputs 1. When the polarity is negative, for example, when left hand side steer is executed, block 102 outputs 0. Block 103 determines the polarity of the motor speed. When the polarity of the motor speed is positive (for example, right revolution), block 103 outputs 1. When the polarity of the motor speed is negative (for example, left revolution), block 103 outputs 0. Block 104 obtains the product of the output of block 102 and the output of block 103.

Block 105 outputs 1 when the polarity of the steering torque is different from the polarity of the motor speed, and outputs 0 when the polarity of the steering torque is equal to the polarity of the speed motor. That is, block 105 determines whether the present operation is a steering-wheel turning process (for example, the steering torque is positive and the revolution direction of the motor is positive) or steering-wheel returning process (for example, the steering torque is positive and the revolution direction is negative). Block 106 outputs 1 when the absolute value of the motor speed is lower than or equal to a predetermined value $\omega 1$, and outputs 1 when the absolute value is not lower than or equal to the predetermined value $\omega 1$. The predetermined value $\omega 1$ is a motor revolution speed from which it is determined that steering wheel 1 is turned according to the driver's manipulation.

Block 107 sets a bit to 1 at the moment that the output of block 105 changes from 0 to 1. Under the other condition as to the output of block 105, block 107 outputs 0. Block 108 sets a bit to 1 at the moment that the output of block 106 changes form 0 to 1. Under the other condition as the output of block 106, block 108 outputs 0.

Block 109 outputs 1 when both bit outputs of block 107 and block 108 are 1, and outputs 0 when the outputs of blocks 107 and 108 are put in the other condition. That is, block 109 detects the moment that the manipulation quantity of steering wheel 1 becomes zero during a period from the steering-wheel returning process to the other process. Block 110 sets a steering-wheel holding control flag FLG at 1 at the moment that the bit of block 109 becomes 1. Block 110 set the steering-wheel holding control flag FLG at 0 at the moment that a bit of block 117 becomes 1.

Block 111 outputs 1 when the absolute value of the motor speed is greater than the predetermined value $\omega 1$, that is, when the steering operation is started. In other conditions, block 111 outputs 0. Block 112 is a timer which is reset to 0 at the moment that the steering-wheel holding control flag of block 111 turns to 1. that is, block 112 outputs a time period elapsed from the moment that the steering-wheel holding is started.

Block 113 stores a steering torque detected at the moment that the holding control flag of block 110 turns to 1 as T2. Block 114 calculates control maximum continuing time t1 changed according to T2. The moment that the holding control flag turns to 1 is, for example, a moment that the steering-wheel holding operation starts to run straight after the lane change. The fluctuation of the vehicle behavior during the holding state is in proportion to the vehicle behavior generated at the moment and becomes a vibration generating force. During the holding state, the fluctuation of the vehicle behavior continuously generates and is also in proportion to an attenuation time. Since the steering torque is determined from the vehicle behavior as represented by the expression (3), the fluctuation of the vehicle behavior and the attenuation time during the holding state are determined according the steering torque generated at the moment that the steering-wheel holding state starts.

Block 115 compares the timer output of block 112 with the attenuation time outputted from block 114, that is, the control continuing maximum time. When the control time (the timer output) reaches the control continuing maximum time, block 115 outputs 1. In other condition, block 115 outputs 0. Block 116 outputs 1 at the moment that the output of block 115 turns from 1 to 0, that is, when the control time reaches the control continuing time. In other condition, block 116 outputs 0.

Block 117 outputs 1 when at least one of the outputs of blocks 111 and 116. In other condition, block 117 outputs 0. That is, when the steering operation is executed or the elapsed time reaches the control continuing time, block 117 outputs 1. Block 110 generates the holding control flag according to the start bit of block 109 and the end bit of block 117. When the hold control flag is 1, the correction control is executed.

Block 118 executes the phase compensation of the steering torque regardless of the steering state (holding state or turning state), in phase compensator 16. Block 119 corresponding to a selecting switch receives the phase-compensated steering torque and the non-compensated steering torque and outputs one of them according to the holding control flag FLG. When the steering-wheel 1 is turned, block 119 outputs the phase-compensated steering torque. When steering wheel 1 is held, block 119 outputs the non-compensated steering torque. Block 120 limits the maximum value of the corrected steering torque so that the driver can recognize a large input through tires such as a strong side wind and a large cant of a running road. By setting the upper limit of the controller variable, even when various sensors for producing the control variable are put in malfunction state, it becomes possible to suppress the steering torque change caused by the sensor malfunction.

Therefore, when steering wheel 1 is held near the neutral position immediately after a lane change, the input inputted from tires caused by the steering torque change, that is, the vehicle behavior is naturally transmitted by the vehicular steering control apparatus of the seventh embodiment. This enables a natural load feeling to be transmitted to the driver.

[Steering Torque Fluctuation Suppressing]

Figure 36A:
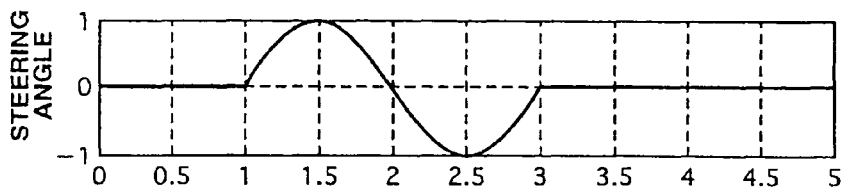
FIGS. 36A, 36B and 36C are time charts of the steering angle, the yaw rate and the steering torque in the vehicular steering control apparatus of the seventh embodiment in case that a lane change was executed.
Figure 36B:
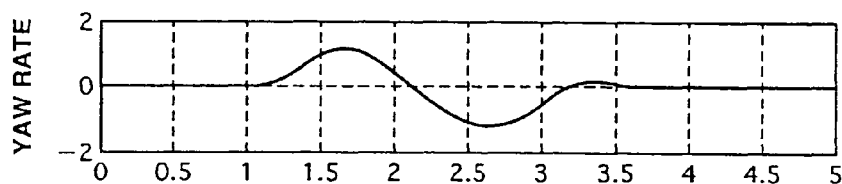
Figure 36C:
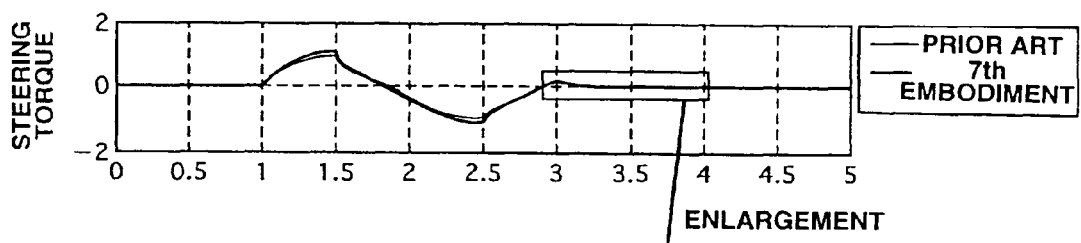
Figure 36D:
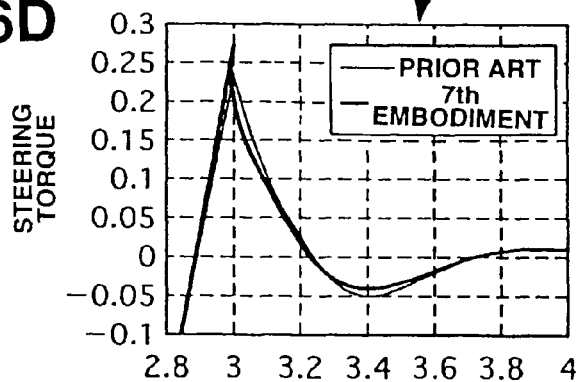
FIG. 36D is a time chart showing a part of FIG. 36c.

There is discussed the steering torque fluctuation suppressing operation of the seventh embodiment using FIGS. 36A through 36D. FIGS. 36A through 36D show time-series changes of the steering angle, the steering torque, and the yaw rate corresponding to the vehicle behavior in case that a lane change is executed. As shown in FIG. 36A, the steering-wheel manipulation for the lane change is started at 1 second and terminated at 3 seconds. Since the vehicle runs straight at the moment that 3 seconds elapsed, the steering-wheel angle is kept at 0. During this period, the yaw rate is generated with some delay relative to the input of the steering-wheel angle, as shown in FIG. 36B. When the steering-wheel angle is maintained at 0 after 3 seconds elapsed, a yaw rate determined by the vehicle characteristic is continuously generated. FIG. 36C shows the steering torque. In FIG. 36C, a thin line shows the steering torque of the conventional apparatus, and a heavy line shows the steering torque of the seventh embodiment. The difference between the steering torque of the conventional apparatus and the steering torque of the seventh embodiment during the steering-wheel operating state corresponding to a range from 1 second to 3 seconds represents the effect of improving the damping. During the steering-wheel holding state after 3 second elapsed, by executing the control of the seventh embodiment, it becomes possible to decrease the steering torque fluctuation when the steering-wheel angle is maintained at 0, as shown in FIG. 36D.

Next, there is discussed effect of the seventh embodiment. The vehicular steering control apparatus according to the seventh embodiment obtains the following effects in addition to the effect of the first embodiment.

(15) Since there is provided the steering-wheel holding state determining section 22 for determining the steering-wheel holding state and phase compensator 16 of decreasing the phase compensation quantity during the holding state to be smaller than that during the steering state, it becomes possible to suppress the steering torque fluctuation caused by the vehicle characteristic, for example, in case that steering wheel 1 is held immediately after a lane change. This achieves the steering feeling of decreasing staggering of the vehicle.

(16) Since phase compensator 16 makes zero the phase compensation quantity during the holding state, it becomes possible to suppress the steering torque fluctuation during the holding state to minimum.

Eighth Embodiment

An eighth embodiment according to the present invention is specifically arranged to decrease the phase compensation quantity according to the elapsed time when the steering state changes from the turning state to the holding state. Since the other construction of the eighth embodiment is the same as that of the seventh embodiment shown in FIG. 34, illustration and explanation thereof are omitted herein.

Next, there is discussed the operation of the eighth embodiment.

[Phase Compensation Quantity Changing Operation According to Steering State]

Figure 37:
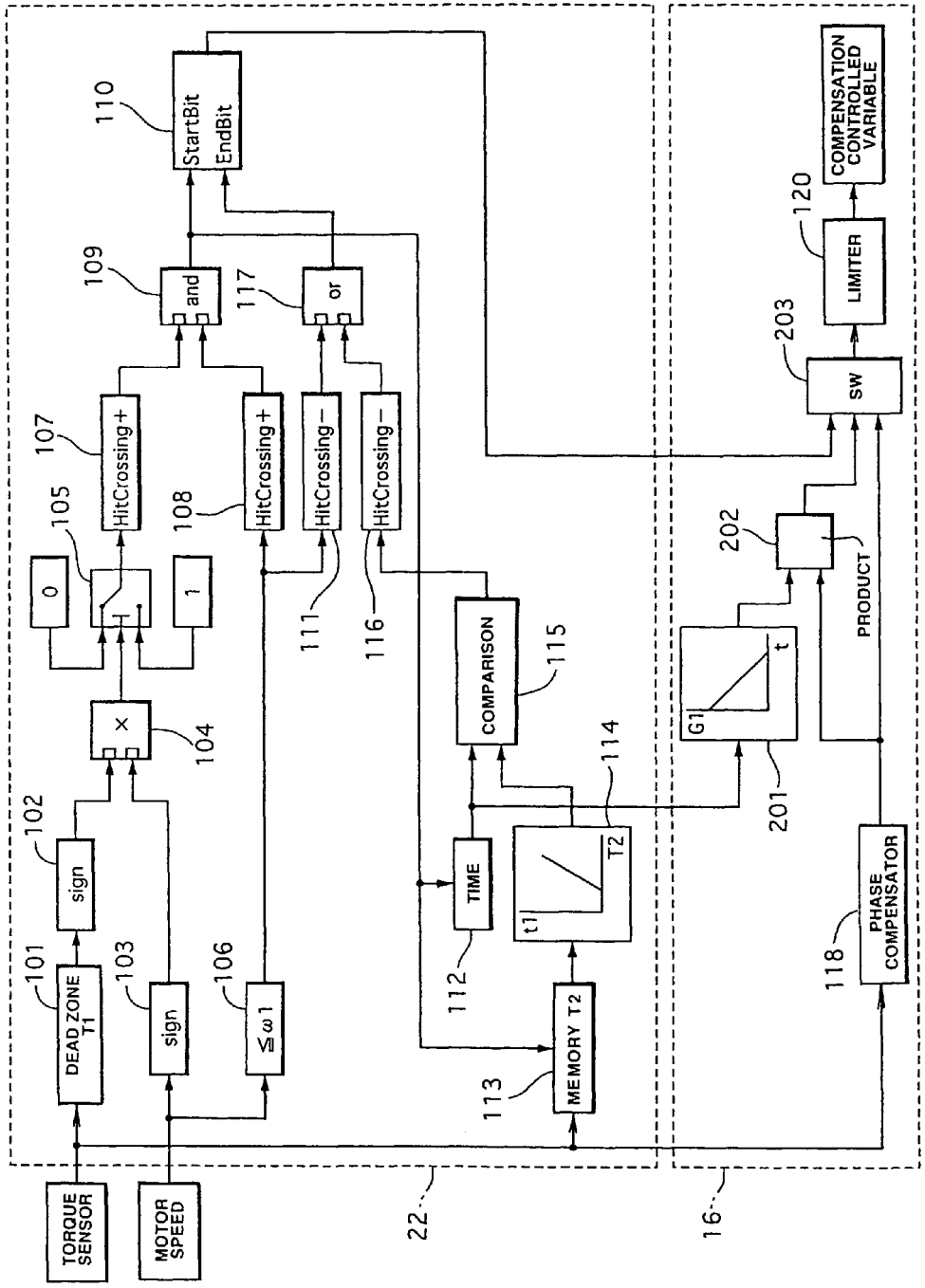
FIG. 37 is a control block diagram showing a phase compensation quantity changing control according to the steering state in the vehicular steering control apparatus of an eighth embodiment.

There is discussed the operation of steering-wheel holding state determining section 22 and phase compensator 16 according to the output of steering-wheel holding state determining section, with reference to FIG. 37. Blocks identical to blocks shown in FIG. 35 are denoted by same reference numerals, and the explanation thereof is omitted herein.

Block 201 is a map for determining a gain G1 which decreases as the continuation time period started from the start of the holding state increases. Block 201 receives the timer-output of block 112 and outputs the gain G1. By setting the maximum value of gain G1 to 1 in the neighborhood of 0, the control variable during the steering state and the control variable during the holding state are matched with each other, and therefore the discontinuity therebetween is suppressed. By decreasing gain G1 according to the elapse of time t, the control variable is gradually change when the steering state is changed form the steering state (turning state) to the holding state. This suppresses the discontinuity due to the switching of the control variable. The minimum value of gain G1 is 0, and by setting the time t when gain G1 reaches the minimum value at a time smaller than a time t1 outputted from block 114, when steering wheel 1 is held near the neutral position immediately after a lane change, the input from tires caused by the steering torque change, that is, the vehicle behavior is naturally transmitted by the vehicular steering control apparatus of the seventh embodiment. This enables a natural load feeling to be transmitted to the driver.

Block 202 obtains a product of the output of block 118 and the output of block 201 and outputs the corrected steering torque which is compensated in phase during the steering-wheel holding state. Block 203 receives the compensated steering torque outputted from block 118, the corrected steering torque outputted from block 202 and the steering-wheel holding control flag. When the steering-wheel holding control flag is 0, that is, when steering wheel 1 is steered, block 203 outputs the phase-compensated steering torque of block 118. When the steering-wheel holding control flag is 1, that is, when steering wheel 1 is held, block 203 outputs the corrected steering torque outputted from block 202.

Therefore, with the vehicular steering control apparatus according to the eighth embodiment of the present invention, when the steering state changes from the steering-wheel steering state to the steering-wheel holding state, the radical change of the controlled variable is prevented and the natural steering feeling is obtained.

[Steering Torque Fluctuation Suppressing Operation]

Figure 38A:
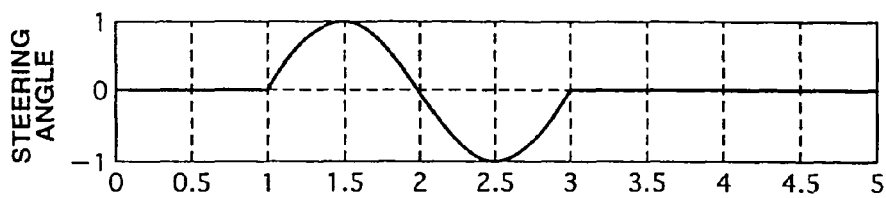
FIGS. 38A, 38B and 38C are time charts of the steering angle, the yaw rate and the steering torque in the vehicular steering control apparatus of the eighth embodiment in case that a lane change was executed.
Figure 38B:
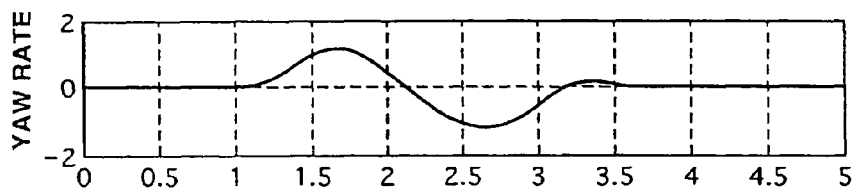
Figure 38C:
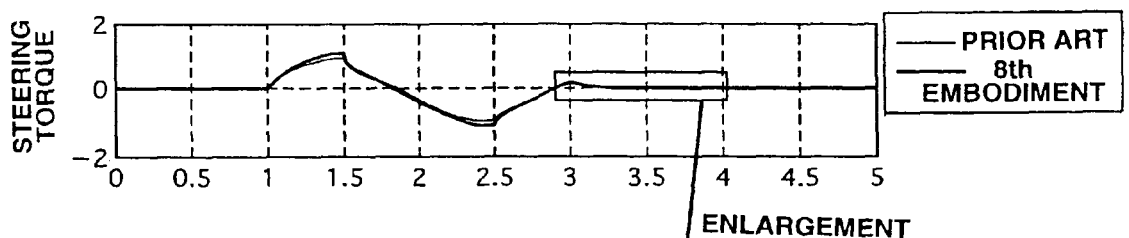
Figure 38D:
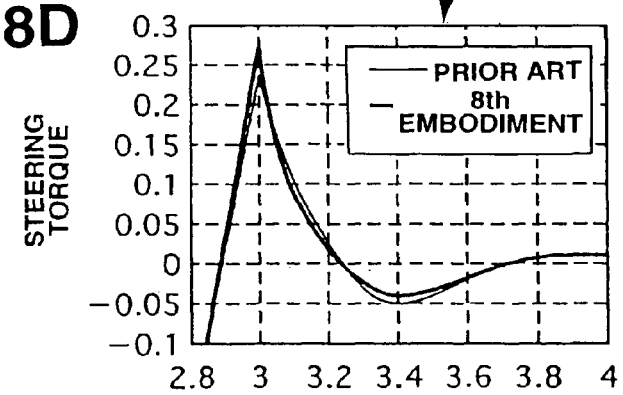
FIG. 38D is a time chart showing a part of FIG. 38c.

There is discussed the steering torque fluctuation suppressing operation of the seventh embodiment using FIGS. 38A through 38D. FIGS. 38A through 38D show time-series changes of the steering angle, the steering torque, and the yaw rate corresponding to the vehicle behavior in case that a lane change is executed. As shown in FIG. 38A, the steering-wheel manipulation for the lane change is started at 1 second and terminated at 3 seconds. Since the vehicle runs straight at the moment that 3 seconds elapsed, the steering-wheel angle is kept at 0. During this period, the yaw rate is generated with some delay relative to the input of the steering-wheel angle, as shown in FIG. 38B. When the steering-wheel angle is maintained at 0 after 3 seconds elapsed, a yaw rate determined by the vehicle characteristic is continuously generated. FIG. 38C shows the steering torque. In FIG. 38C, a thin line shows the steering torque of the conventional apparatus, and a heavy line shows the steering torque of the seventh embodiment. The difference between the steering torque of the conventional apparatus and the steering torque of the eighth embodiment during the steering-wheel operating state corresponding to a range from 1 second to 3 seconds represents the effect of improving the damping. During the holding state after 3 second elapsed, by executing the control of the seventh embodiment, it becomes possible to decrease the steering torque fluctuation when the steering-wheel angle is maintained at 0, as shown in FIG. 38D. Further, as compared with the arrangement of the seventh embodiment, the eighth embodiment is arranged to further decrease the steering torque fluctuation immediately after 3 seconds and to further smoothly change the steering torque. As a result, the eighth embodiment obtains the further smooth steering feeling.

Next, there is discussed effects of the eighth embodiment. The vehicular steering control apparatus according to the eighth embodiment obtains the following effects in addition to the effect of the seventh embodiment.

(17) Since phase compensator 16 decreases the phase compensation quantity as an elapsed time from the moment that steering state changed from the steering-wheel steering state to the holding state increases, it becomes possible to suppress the discontinuity to the steering torque due to the switching of the control, and to suppress the strange feeling applied to the driver.

(18) Since phase compensator 16 converges the phase compensation quantity to zero, it becomes possible to suppress the steering torque fluctuation during the holding state to minimum.

Ninth Embodiment

A ninth embodiment according to the present invention is specifically arranged to comprise a hand-release determining section for determining that driver's hands are released from steering wheel 1, and to increase the phase compensation quantity during the hand-released state as compared with the phase compensation quantity during the non-released state.

More specifically, there is discussed a control system based on a control block diagram of the vehicular steering control apparatus of the ninth embodiment shown in FIG. 39. The vehicular steering control apparatus of the ninth embodiment receives the steering torque and the motor speed and comprises a hand-release determining section (hand release determining means) 23 for determining that driver's hands are released from steering wheel 1. Since the other construction of the seventh embodiment is the same as that of the seventh embodiment, the corresponding parts and constructions are denoted by the same reference numerals and the explanation thereof is omitted herein.

Next, there is discussed an operation of the ninth embodiment of the present invention is explained.

[About Hand-Release Determination Method]

First, there is discussed a concept of the hand-release determination. The steering torque and the motor angular speed are measured, and it is determined that driver's hands are released from steering wheel 1 when the second-order differential coefficients of the steering torque and the motor angular speed have the following predetermined relationship. By this arrangement, it becomes possible to accurately determine the hand release state.

A model of the steering system is constructed using a steering-wheel inertia (Jh), an inertia (Jm) of a system which is in a road surface side relative to the torque sensor, such as the motor, the reduction gear and the rack, and a rigidity (ks) of the torque sensor of connecting steering wheel 1 and the system under the torque sensor. In the following expressions (9) through (11), Th is a steering torque which is a manipulated variable by the driver, θh is the steering angle which is also a manipulated variable by the driver, θm is a motor angle obtained by converting the angle of the motor into steering-wheel angle, and Ts is a steering torque detected by the torque sensor.

$$\alpha > Jh \cdot \text{dot}(\text{dot}(Ts))/ks + ks \cdot \text{dot}((\text{dot}(\theta m)))Ts \quad (9)$$

wherein α is a predetermined value.

A motion equation around steering wheel 1 in the model of the steering system is expressed by the following expression (10).

$$Th = Jh \cdot \text{dot}(\text{dot}(\theta h)) + ks \cdot (\theta h - \theta m) \quad (10)$$

In the expression (10), when the driver's hands are released from steering wheel 1, Th is 0. Therefore, the motion equation around steering wheel 1 under the ideal condition is represented by the following expression (11).

$$0 = Jh \cdot \text{dot}(\text{dot}(\theta h)) + ks \cdot (\theta h - \theta m) \quad (11)$$

Since $ks \cdot (\theta h - \theta m)$ corresponds to the steering torque Ts detected by the torque sensor in the expression (11), the determination of the hand release state can be executed by calculating $\text{dot}(\text{dot}(\theta h))$ which is a second order differential coefficient of the steering angle θh.

$$Ts = ks \cdot (\theta h - \theta m) \quad (12)$$

By executing the second order differential as to both sides of the above expression (12) representing the detection value of the torque sensor, the following expression (13) is obtained.

$$\text{dot}(\text{dot}(Ts)) = ks \cdot (\text{dot}(\text{dot}(\theta h)) + \text{dot}(\text{dot}(\theta m))) \quad (13)$$

By deforming the expression (13), the following expression (14) is obtained.

$$\text{dot}(\text{dot}(\theta h)) = \text{dot}(\text{dot}(Ts))/ks + ks \cdot \text{dot}(\text{dot}(\theta m)) \quad (14)$$

Further, by substituting the expression (14) into the expression (11), the expression (9) is obtained.

As discussed above, in the electric power-steering apparatus, by using the detection value of the steering torque sensor and the angular speed of the motor, it becomes possible to execute an accurate hand-release determination. Herein, the angular acceleration of motor 5 may be obtained by directly measuring the angle of motor 5 and executing the second order differential as to the angle, by directly measuring the speed of motor 5 and executing the first order differential as to the speed, or by measuring the motor terminal voltage and the motor current utilizing the counter electromotive force of the motor, estimating the motor angular speed from the measured voltage and current and executing the first order differential as to the estimated motor angular speed.

[About Quantity Change Operation of Phase Compensation According to Hand-Release State]

Figure 40:
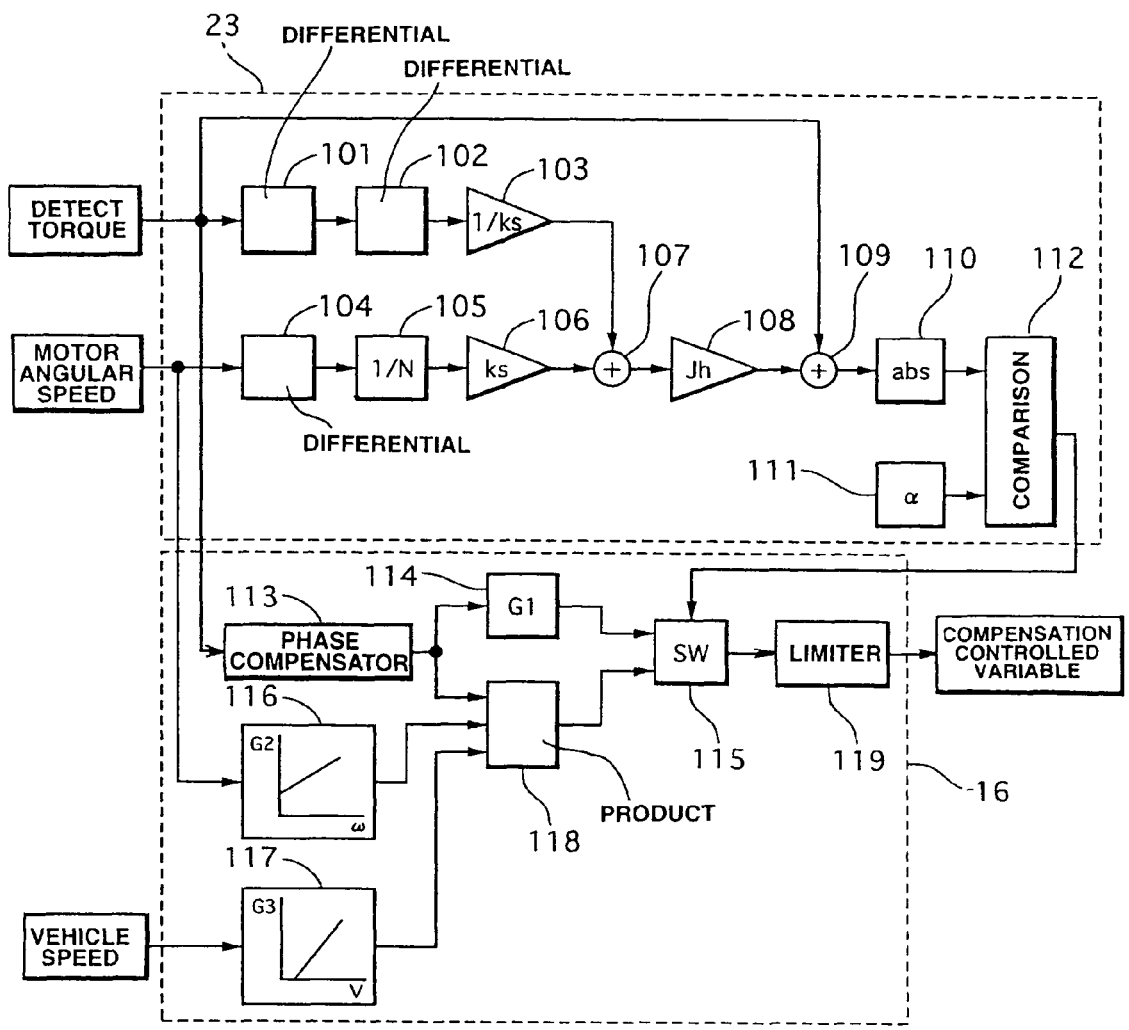
FIG. 40 is a control block diagram showing the phase compensation quantity changing control executed according to the steering state in the vehicular steering control apparatus of the ninth embodiment.
Figure 41:
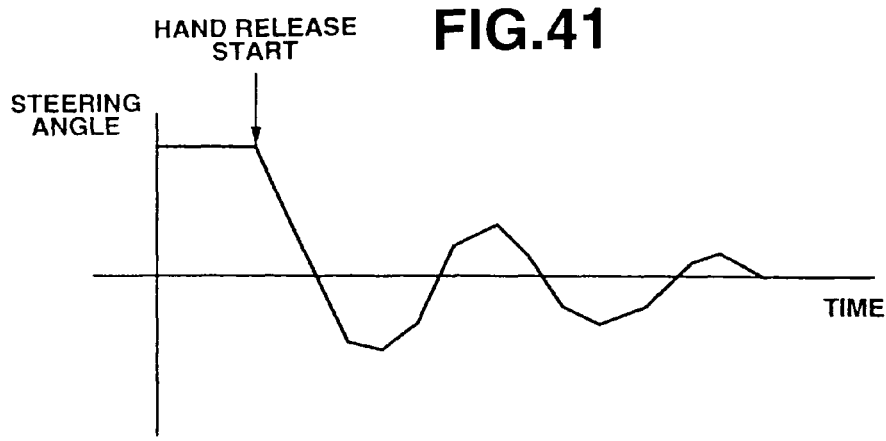
FIG. 41 is a time chart showing a convergence characteristic of a electric power steering apparatus.

There is discussed the operation of hand-release determining section 23 and phase compensator 16 of executing the compensation according to the output of hand-release determining section 23, with reference to FIG. 40.

Block 101 executes a first-order differential of the torque sensor signal inputted to hand-release determining section 23. Block 102 obtains the second-order differential of the torque sensor signal by executing first-order differential of the output of block 101. Block 103 multiplies the second-order differential of the detect torque by an inverse of the torque sensor rigidity ks. Block 105 calculates the motor angular acceleration converted into the steering-wheel angle by multiplying the first-order differential of the motor angular speed by the reduction gear ratio. Block 106 multiplies the motor angular acceleration by the torque sensor rigidity. Block 107 sums the outputs of blocks 103 and 106. Block 108 multiplies the output of block 107 by the steering-wheel rigidity. Block 109 adds the torque sensor signal to the output of block 108 to obtain the right side of the expression (9). Block 110 obtains an absolute value of the right side of the expression (9), that is, the estimated driver's torque.

Block 111 sets the predetermined value a for determining the driver torque as the hand-release state. Block 112 compares the estimated driver torque and the predetermined value α for the hand release determination. Block 112 outputs 0 as a content of the hand-release flag when the estimated driver torque is greater than the predetermined value α. Block 112 outputs 1 as the content of the hand-release flag when the estimated driver torque is not greater than the predetermined value α. When the estimated driver torque is 0, it is clearly determined that the driver's hands are completely released from steering wheel 1. However, when the driver slightly touches steering wheel 1 and the returning of steering wheel 1 is naturally executed after the driver inputted the predetermined steering angle to steering wheel 1, the steering torque is slightly generated. In order to improve the steering stability by executing the control of the present invention under such a slightly touching state, it is preferable that the left side of the expression (9) functioning as a determination value is set at a predetermined value different from 0. Further, by setting the determination value at the predetermined value greater than 0, it becomes possible to prevent the erroneous determination caused by a noise included in the signals of various sensors.

Block 113 executes the phase compensation of the steering torque regardless of the hand-release state, using phase compensator 16. Block 114 is the gain G1 of phase compensator 16 under the non-hand-release state. Although the gain G1 is not shown as a map, it may be changed according to the vehicle speed, the steering torque and the steering speed. Block 115 is a selector switch of outputting the phase-compensated steering torque determined by the outputs of blocks 113 and 114 during the non-hand-release state and of outputting the steering torque discussed later during the hand-release state. Block 116 is a map for determining a gain G2 according to the inputted motor angular speed. The gain G2 increases as the motor angular speed increases. The gain G2 is one of the factors for determining the gain during the hand-release state. The controlled variable of the phase compensation increases when the motor angular speed is large.

Block 117 is a map for determining a gain G3 according to the inputted vehicle speed. When the vehicle speed is in a low speed range, the gain G3 is 0. The gain G3 increases as the vehicle speed further increases. The vehicle stability in the low speed range is basically high, and therefore it is not necessary to improve the converging performance of the vehicle. Since the converging performance of the vehicle degrades as the vehicle speed increases, by increasing the controlled variable as the vehicle speed increases, the converging performance of the vehicle is also improved.

Block 118 obtains a product of the phase compensated steering torque, gain G2 according to the motor angular speed and gain G3 according to the vehicle speed to execute the hand-release state phase compensation. Block 119 limits the maximum value of the corrected steering torque, so that a large input from tires, such as a large side wind and a large road surface cant is transmitted to the driver as the steering torque change. By setting the upper limit of the controlled variable, even when various sensors for producing the controlled variable are put in malfunction state, it is possible to suppress the steering torque change caused by such malfunction.

[Converging Performance During Hand-Release State]

Generally, an electric power-steering apparatus has characteristics that due to the inertia of a motor and frictions of the motor and a reduction gears, a time period from the moment, that driver's hands are released from steering wheel 1 after a predetermined steering angle is inputted during the vehicle running state, becomes relatively long, or overshoots to right or left side are repeated several times. That is, in such an electric power-steering apparatus, the stability during the hand-release state or the convergence is not preferable. Although Japanese Published Patent Application No. 8-332964 discloses a feature of determining the hand-release state when the steering speed is high during the steering-wheel returning state and of executing a damping in proportion to the steering speed.

However, such a conventional feature has a characteristic that the hand-release state determination is made when a steering wheel is quickly turned by a driver. By this improper determination, a damping is added and a steering torque undesirably increases to increase a necessary steering force. Therefore, it becomes difficult to get a natural steering feeling by such a conventional apparatus.

[Improving Operation of Converging Performance During Hand-Release State]

In contrast to the above problem, the vehicular steering control apparatus according to the ninth embodiment of the present invention is specifically arranged to change the controlled variable during the hand-release state according the conditions affecting the vehicle behavior, such as the steering speed and the vehicle speed. Therefore, the converging performance during the hand-release state is improved by this arrangement.

Figure 42A:
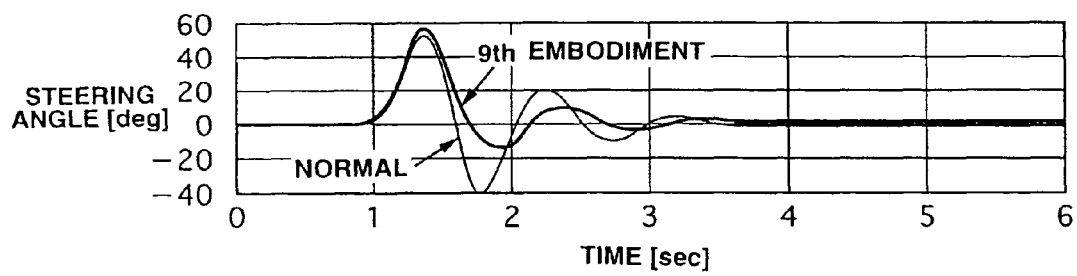
FIGS. 42A, 42B and 42C are time charts of the steering angle, the steering torque and the yaw rate, which show a damping improvement during a steering-wheel release state in the vehicular steering control apparatus of the ninth embodiment.
Figure 42B:
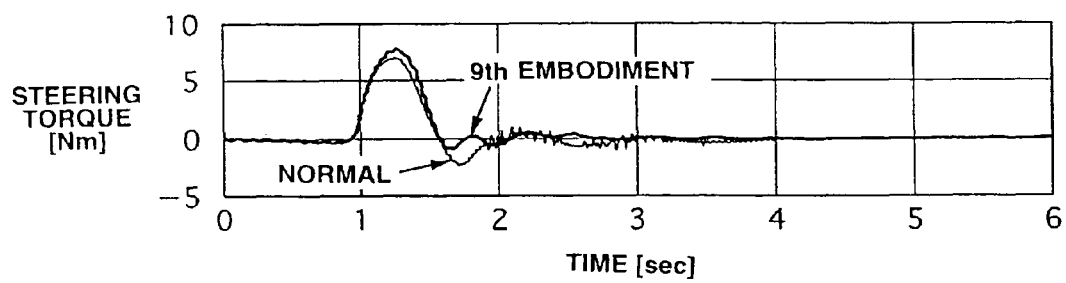
Figure 42C:
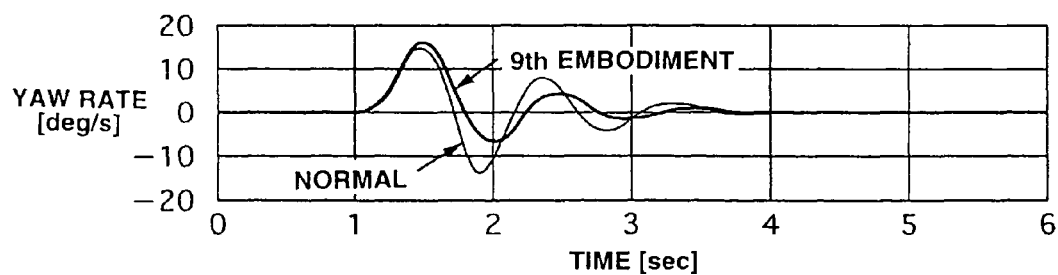

There is discussed an improving operation of a converging performance during the hand-release state, with reference to experimental data shown in FIGS. 42A, 42B and 42C. FIG. 42A shows a time-series change of the steering angle in case that driver's hands are released from steering wheel 1 after a predetermined steering angle is inputted through steering wheel 1. FIG. 42B shows a time-series change of the steering torque in the case as same as that in FIG. 42A. FIG. 42C shows a time-series change of the vehicle behavior in the case as same as that in FIG. 42A. In FIGS. 42A through 42C, a thin line shows each time-series change of a conventional electric power-steering apparatus, and a heavy line shows each time-series change of the vehicular steering control apparatus of the ninth embodiment.

FIGS. 42A through 42C clearly show that the control of the ninth embodiment performs a higher converging performance after the hand release, as compared with the control of the conventional apparatus. Since the phase compensation quantity is increased during the hand release state, the convergence in the ninth embodiment is quickened. Further, since the vehicle behavior becomes large for the reason the motor angular speed during the hand release state is high. Accordingly, the controlled variable is increased as the motor angular speed increases, and a quick convergence of the vehicle is realized thereby.

Next, there is discussed effects of the ninth embodiment. The vehicular steering control apparatus of the ninth embodiment gets the following effects in addition to the effects of the first embodiment.

(19) Since there is provided hand-release determining section 23 for determining the hand-release state and phase compensator 16 of increase the phase compensation quantity during the hand-release state to be greater than that during the non-hand-release state, it becomes possible to improve the converging performance during the hand-release state. This achieves the stability during the high speed running.

(20) Since phase compensator 16 increases the phase compensation quantity during the hand-release state as one of the driving speed of the actuator and the vehicle behavior increases, it becomes possible to further quicken the converging performance.

(21) Since phase compensator 16 increases the phase compensation quantity during the hand-release state as the vehicle speed increases, it becomes possible to further quicken the converging performance during the high speed running.

Tenth Embodiment

A tenth embodiment according to the present invention is specifically arranged to decrease the phase compensation quantity as an estimated driver torque during the hand-release state increases. Since the construction of the tenth embodiment is the same as that of the ninth embodiment shown by the control block diagram in FIG. 39, illustration and explanation there are omitted herein.

There is discussed the operation of the tenth embodiment according to the present invention.

[Changing Operation of Phase Compensation Quantity According to Hand-Release State]

Figure 43:
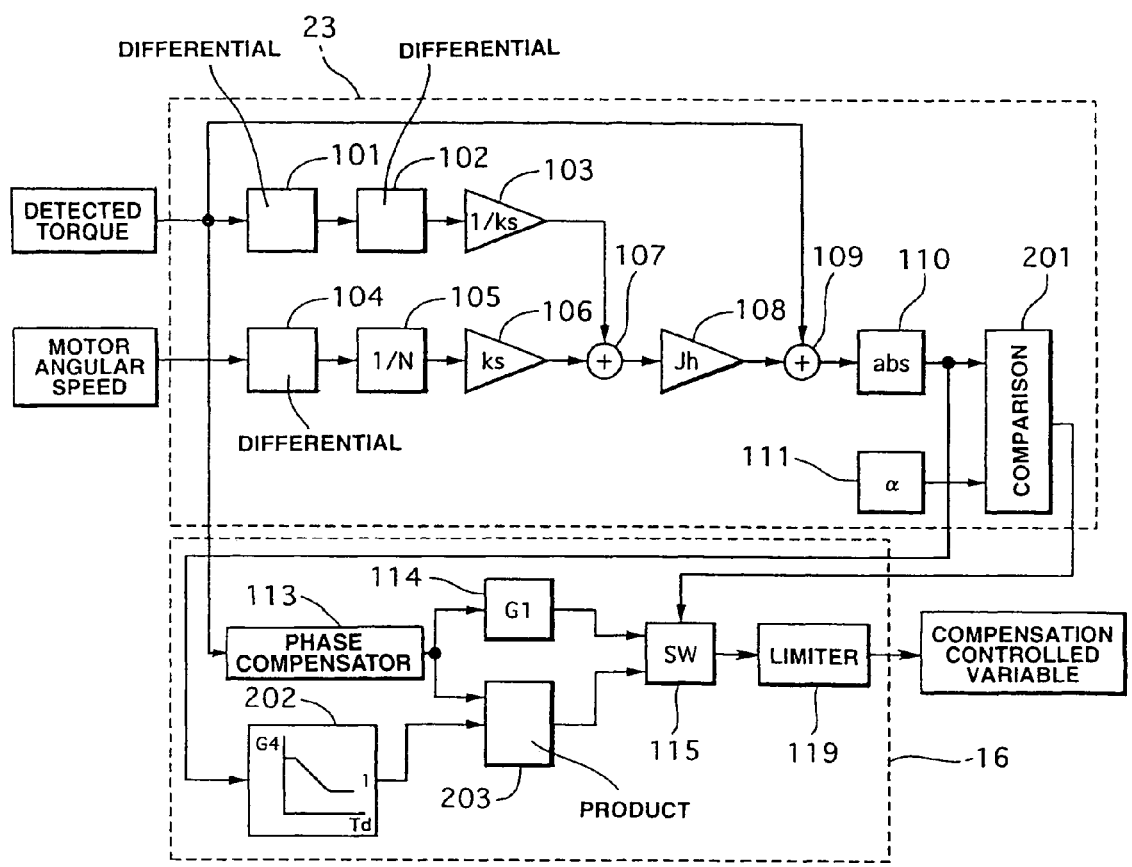
FIG. 43 is a control block diagram showing the phase compensation quantity changing control executed according to the steering state in the vehicular steering control apparatus of a tenth embodiment.

There is discussed the operation of a hand-release determining section 23 and phase compensator 16 responsive to the output of the hand-release determining section 23 of the tenth embodiment, with reference to FIG. 43. Blocks as same as those shown in FIG. 40 are denoted by the same reference numerals, and the explanation thereof is omitted herein.

Block 201 compares the estimated driver torque (estimated steering torque), which is an output of block 110 (estimated steering torque calculating means) and a predetermined value for the hand-release determination. Block 201 outputs 1 as a content of the hand release flag when the estimated driver torque is greater than the predetermined value. Block 201 outputs 0 as the content of the hand release flag when the estimated driver torque is not greater than the predetermined value. When the estimated driver torque is 0, it is clearly determined that the driver's hand are completely released from steering wheel 1. However, when the driver slightly touches steering wheel 1 and the returning of steering wheel 1 is naturally executed after the driver inputted the predetermined steering angle to steering wheel 1, the steering torque is slightly generated. In order to improve the steering stability by executing the control of the present invention under such a slightly touching state, it is preferable that the left side of the expression (9) functioning as a determination value is set at a predetermined value α different from 0. Further, by setting the determination value at the predetermined value greater than 0, it becomes possible to prevent the erroneous determination due to a noise included in the signals of various sensors.

Block 202 is a map for determining a gain G4 according to the estimated driver torque. The map is arranged such that the gain G4 has a constant value in a driver torque small range where the estimate driver torque is smaller than a predetermined value γ which is determined by an estimation accuracy due to errors of various sensors. With this arrangement, when the driver's hands are completely released from steering wheel 1, that is, when the estimated driver torque is 0, the converging performances of the vehicle and steering wheel 1 are improved by setting the controlled variable during the hand-release state at the maximum value. The gain G4 decreases as the estimated driver torque increases in a range greater than the predetermined value γ. Then, the gain G4 becomes the same as gain G1 employed during the non-hand-release state when the estimated torque reaches the neighborhood of a torque β generated when steering wheel 1 is steered according to the driver's intention.

That is, by decreasing the controlled variable of the hand-release controlling means through the control of decreasing the gain as the estimated driver torque increases, it becomes possible to generally equalize the steering-wheel returning speeds during the hand-release state and during a state that driver's hands lightly touches steering wheel 1. By setting the steering-wheel returning speed at a generally constant value regardless of the slight touching state or completely release state, it becomes possible to suppress the strange feeling applied to the driver. When the estimated driver torque is large, steering wheel 1 is steered by the driver. Therefore, during this steering state, the gain is set at the same value as that during the non-hand-release state. This suppresses a discontinuous steering feeling due to the switching of the control.

Block 203 executes a hand-release-state phase compensation by multiplying the phase-compensated steering torque by the gain G4 changed according to the estimated driver torque. Therefore, it becomes possible to prevent the radical change of the controlled variable in case that the steering state changes from the hand-release state to the steering operating state, and to ensure a further natural steering feeling.

Next, there is discussed the an effect of the tenth embodiment. The vehicular steering control apparatus of the tenth embodiment gets the following merits in addition to the merits of the ninth embodiment.

(22) Since there is provided the estimated steering torque calculating means (block 110) for calculating the estimated driver torque during the hand-release state and phase compensator 16 of decreasing the phase compensation quantity during the hand-release state as the estimated driver torque during the hand-release state, it becomes possible to generally equalize the steering-wheel returning speed during the hand-release state and that during the slightly touching state. This suppresses the strange feeling from being applied to the driver.

(23) Since phase compensator 16 converges the phase compensation quantity during the hand-release state to the phase compensation quantity during the hand-release state as the estimated steering torque during the hand-release state increases, it is possible to prevent the radical change of the controlled variable when the steering state changes from the hand-release state to the steering operating state. This achieves a further natural steering feeling.

Eleventh Embodiment

An eleventh embodiment according to the present invention is specifically arranged to comprise a road friction coefficient detecting section for estimating a road friction coefficient μ from the steering input, the vehicle behavior and the like and to increase the phase delay quantity as the estimated road friction coefficient μ is small.

Figure 44:
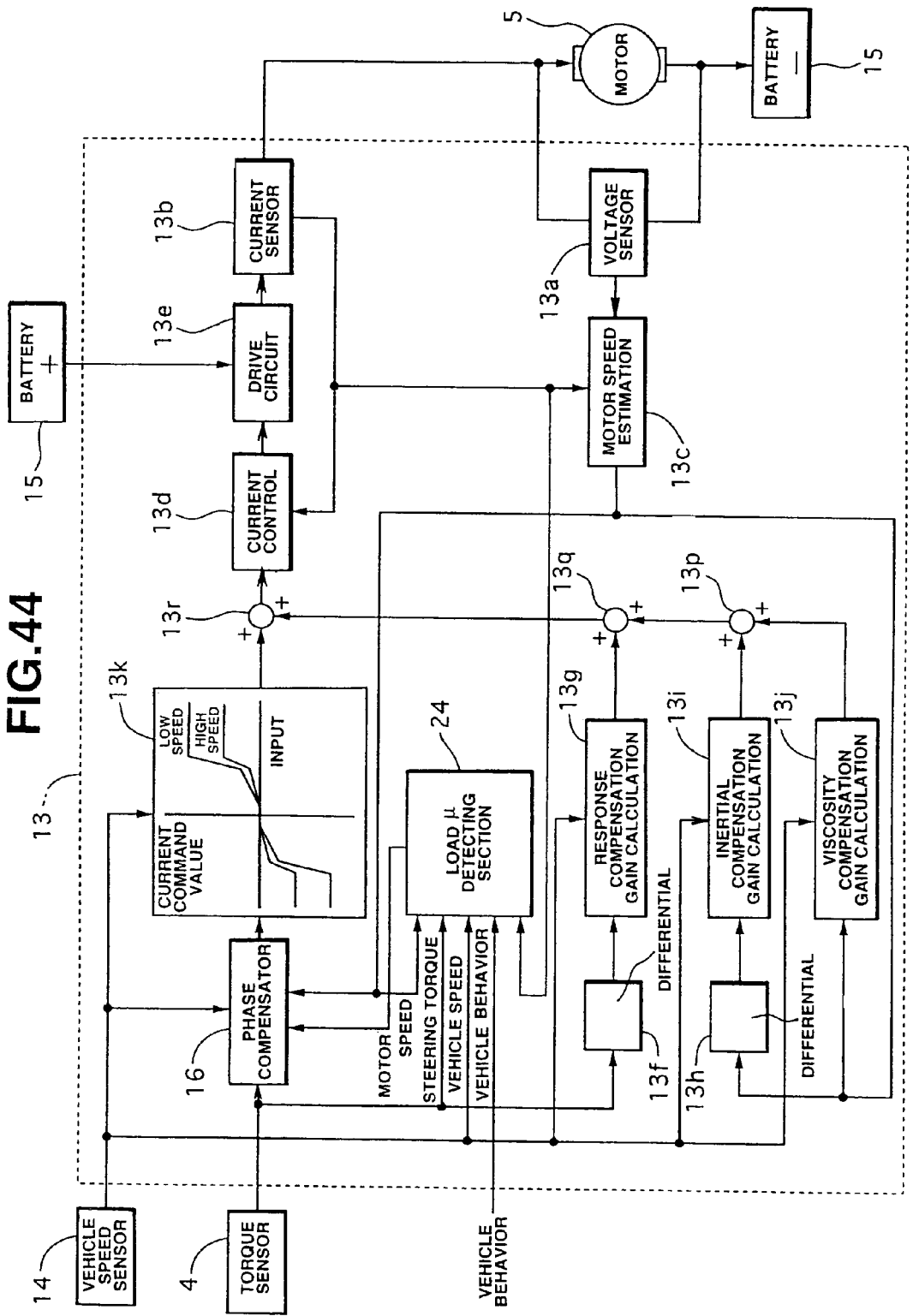
FIG. 44 is a control block diagram of the vehicular steering control apparatus of an eleventh embodiment.

More specifically, referring to the steering system of the vehicular steering control apparatus of the eleventh embodiment on the basis of a control block diagram shown in FIG. 44, controller 13 comprises a road friction coefficient detecting section (road μ estimating means) 24 for estimating a road friction coefficient μ from the steering torque, the motor speed, the motor current and the vehicle behavior. Since the other construction is the same as that of the seventh embodiment, the corresponding elements are denoted by the same reference numerals and the explanation thereof is omitted herein.

Next, an operation is explained.

[Increasing Operation of Phase Delay Quantity According to Road Friction Coefficient]

Figure 45:
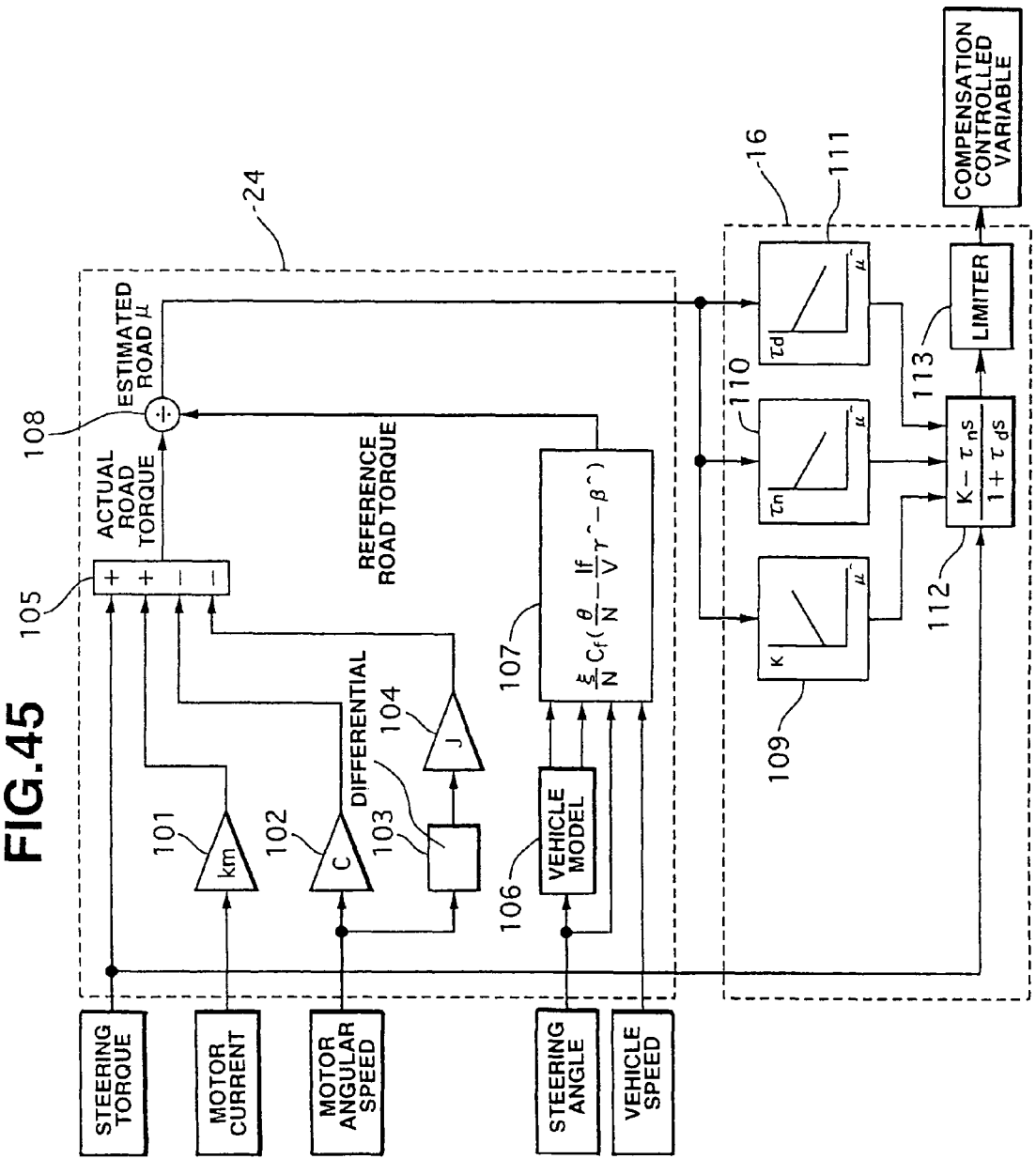
FIG. 45 is a control block diagram showing the phase compensation quantity changing control executed according to a road friction coefficient μ in the vehicular steering control apparatus of the eleventh embodiment.

There is discussed the operation of road μ estimating section 24 and phase compensator 16 according to the output of road μ estimating section 24, with reference to FIG. 45.

Block 101 calculates a motor torque outputted from the motor by multiplying the motor current by a torque constant km. In case that the reduction gear is used to transfer the motor torque to the steering-wheel shaft, the motor torque converted into that of the steering-wheel torque by multiplying the motor torque by the reduction ratio of the reduction gear. Block 102 calculates a viscosity resistance torque of the steering system by multiplying the motor angular speed by the viscosity C of the steering system. Block 103 calculates a motor angular acceleration by differentiating the motor angular speed. Block 104 calculates an inertia torque of the steering system by multiplying the motor angular acceleration by the inertia of the steering system.

Block 105 calculates a road-input torque (road torque) from the detected steering torque, the motor torque, the viscosity resistance torque and the inertia torque. There is discussed a simple model expressed by a steering system viscosity and a steering system inertia, which are dominant factors of determining the characteristic of the steering system. The torque valance in the steering model is repressed by the following expression (15).

$$Th+Tm=Tsat+I\theta''+C\theta' \quad (15)$$

wherein Th is the steering torque produced by a driver, Tm is the motor torque, Tsat is the road torque, I is the steering system inertia, C is the steering system viscosity, and θ is the steering angle.

The steering system may be expressed by a further high order model, or by measuring an actual steering angle and an actual steering speed and using them instead of the motor angular speed to calculate the actual road torque.

Block 106 calculates standard vehicle behaviors γ and β in case that the road friction coefficient is 1, using the expressions (1) and (2) from the steering angle. Block 107 calculates a standard road torque by executing the calculation on the presumption that inputs are standard vehicle behaviors γ and β, the steering angle and the vehicle speed, and the others are constants. The expression of the calculation is represented by the following expression (16).

$$\xi \cdot C_f/N \cdot (\theta/N - lf \cdot \hat{\gamma}/V - \hat{\beta}) \quad (16)$$

wherein a value with superscript ^ represents an estimated value.

Block 108 calculates the estimated road friction coefficient by dividing the actual road torque by a standard road torque since a ratio between the actual road torque and the standard road torque corresponds to the road friction coefficient μ. Although the explanation has been made such that the road friction coefficient is estimated form the steering torque, the other estimating method of the road friction coefficient may be employed.

Block 109 is a map for changing a coefficient K of the phase compensation according to the estimated road friction coefficient. The coefficient K decreases as the estimated road friction coefficient decreases. FIG. 46 shows a frequency characteristic of the phase compensation means in case that the coefficient K of the phase compensation is changed. As shown in FIG. 46, by decreasing K as the estimated road friction coefficient decreases, a phase delay of the phase compensating means increases when it is determined that the road friction coefficient decreased. Accordingly, the phase compensation is adapted to the change of the vehicle behavior (in the form of the lowering of the resonance frequency) due to the lowering of the road friction coefficient, and a steering characteristic suitable for a driver is obtained.

Block 110 is a map for changing a coefficient τnum of the phase compensation according to the estimated road friction coefficient. The coefficient τnum increases as the estimated road friction coefficient decreases. FIG. 47 shows a frequency characteristic of the phase compensation means in case that the coefficient τnum of the phase compensation is changed. As shown in FIG. 47, by increasing τnum as the estimated road friction coefficient decreases, a phase delay of the phase compensating means increases and the gain also increases when it is determined that the road friction coefficient decreased. Accordingly, the phase compensation is adapted to the change of the vehicle behavior (in the form of the degradation of damping and the lowering of the resonance frequency) due to the lowering of the road friction coefficient, and a steering characteristic suitable for a driver is obtained.

Figure 48:
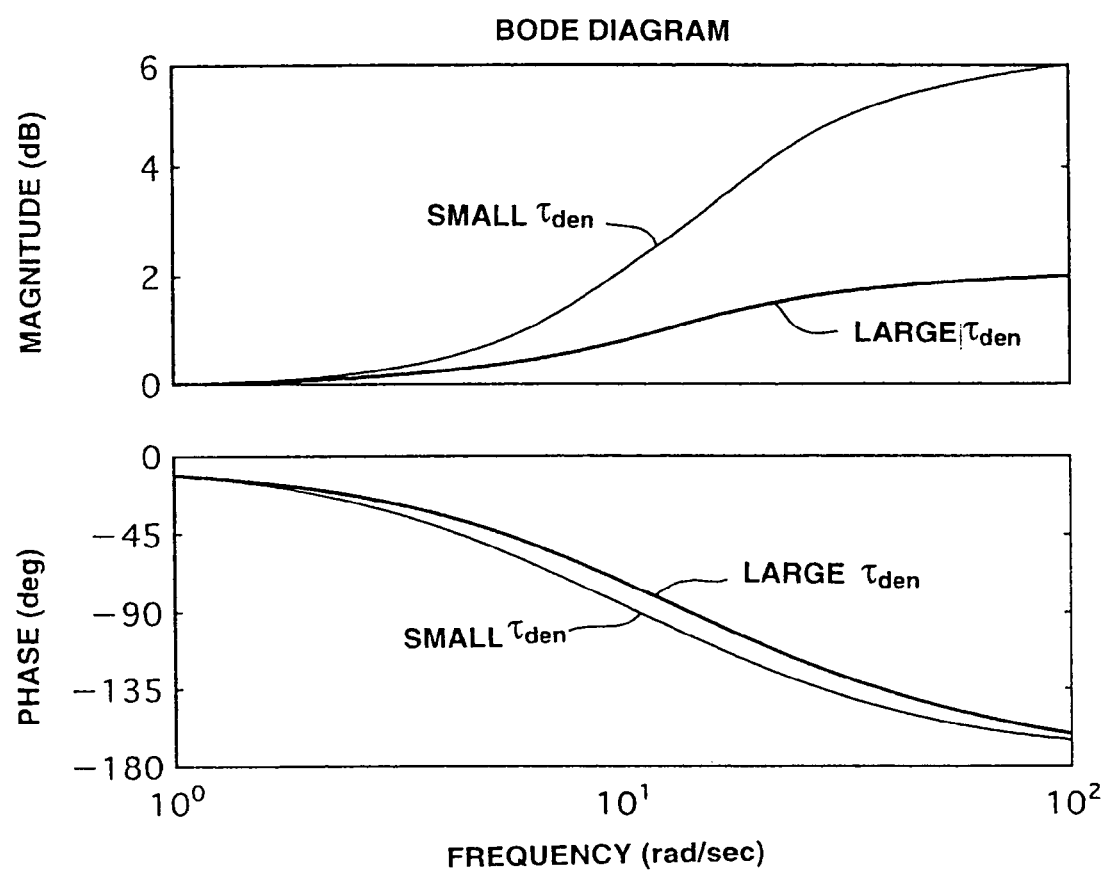
FIG. 48 is a graph showing a frequency characteristic in case that a coefficient τden is changed in the phase compensation means of the eleventh embodiment.

Block 111 is a map for changing a coefficient τden of the phase compensation according to the estimated road friction coefficient. The coefficient τden increases as the estimated road friction coefficient decreases. FIG. 48 shows a frequency characteristic of the phase compensation means in case that the coefficient τden of the phase compensation is changed. As shown in FIG. 48, by increasing τden as the estimated road friction coefficient decreases, a phase delay of the phase compensating means increases when it is determined that the road friction coefficient decreased. Accordingly, the phase compensation is adapted to the change of the vehicle behavior (in the form of the lowering of the resonance frequency) due to the lowering of the road friction coefficient, and a steering characteristic suitable for a driver is obtained.

Block 112 is a phase compensator which executes a phase control of the steering torque using the constants K, τnum and τden determined at blocks 109, 110 and 111. Block 113 limits the maximum value of the corrected steering torque, so that a large input from tires, such as a large side wind and a large road surface cant are transmitted to the driver as the steering torque change. By setting the upper limit of the controlled variable, even when various sensors for producing the controlled variable is put in malfunction state, it is possible to suppress the steering torque change caused by such malfunction.

Therefore, the vehicular steering control apparatus according to the eleventh embodiment is capable of certainly ensure the damping of the vehicle behavior when the steering torque is inputted, even if the road friction coefficient μ changes. This arrangement achieves a steering characteristic suitable for a driver.

[Dumping Improving Operation of Vehicle Behavior Relative to Steering Torque on Low Friction Road]

Since the vehicle motion characteristic generally changes according to the change of a road friction coefficient μ, it is difficult to obtain the steering characteristic suitable for a driver according to the change of the road friction coefficient μ without changing the steering characteristic according to the changed vehicle characteristic. When a reaction force from the road decreases as the road friction coefficient μ decreases, the assist quantity does not change according to the change of the road friction coefficient μ. Therefore, the driver feels the steering torque decreases. When the steering torque is small, the driver feels the inertia strong even if the inertia quantity is not changed. Accordingly, the conventional steering control apparatus produces an unnatural steering feeling on a low friction coefficient road.

Further, since the input from the road decreases as the road friction coefficient μ decreases, the steering torque change relative to the steering input also decreases. Particularly, since the small input near the neutral position does not change the steering torque, there is caused a problem that the driver cannot clearly recognize the neutral position.

Even when the vehicle runs on a low friction rod at a high speed, the driver mainly drives the vehicle by inputting the steering torque. Therefore, the frequency characteristic of the vehicle behavior relative to the steering torque input performs a good damping under this vehicle running state and the driver feels this characteristic preferable. Accordingly, the vehicular steering control apparatus of the eleventh embodiment is arranged to change the control characteristic according to the change of the vehicle characteristic caused by the change of the road friction coefficient μ, so that the damping in the frequency characteristic of the vehicle behavior relative to the steering torque input is improved on the low friction road. This arrangement provides a manageable control characteristic for a driver.

Figure 49:
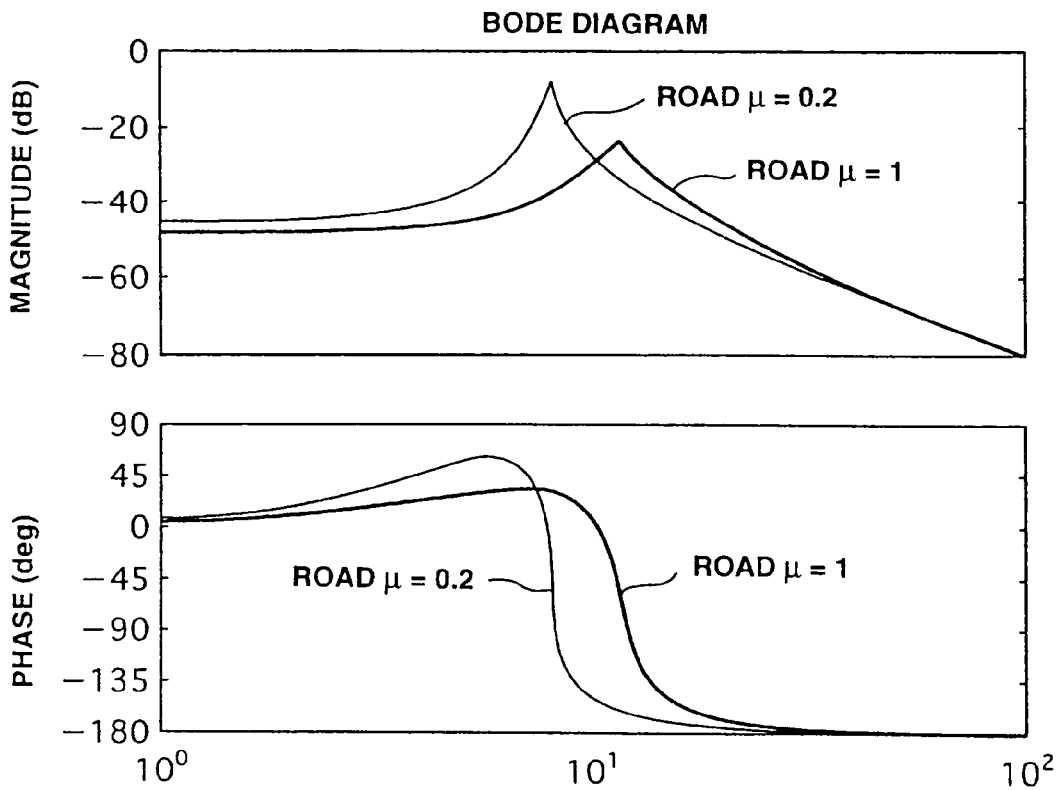
FIG. 49 is a graph showing a frequency characteristic of the phase compensation means of the eleventh embodiment in case that a coefficient τden is changed.

FIG. 49 shows a frequency characteristic of the steering angle relative to the steering torque in case that the road friction coefficient μ changes. Calculation was executed by taking account of a change of the road friction coefficient μ in front wheel cornering power Cf and rear wheel cornering power Cr, and the calculation results in case of μ=1 and in case of μ=0.2 are compared. FIG. 49 clearly shows that the damping degrades and the resonance frequency shifts in the low frequency side as the road friction coefficient μ decreases. Therefore, it is preferable that the damping is improved as the road friction coefficient μ decreases and that the control characteristic is changed according to the change of the resonance frequency.

Figure 50:
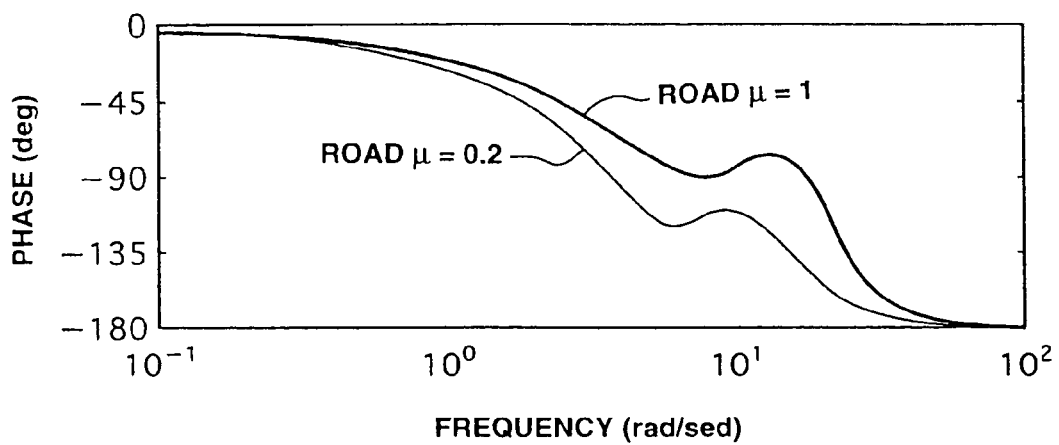
FIG. 50 is a graph showing a frequency characteristic in case of arranging a controller of the eleventh embodiment so that the frequency characteristic of the steering angle relative to the steering torque input maintains a second-order system even if a road friction coefficient μ changes.

If a control characteristic is calculated so that the frequency characteristic of the steering angle relative to the steering torque becomes the second order system even if the road friction coefficient μ changes, it is necessary to change the frequency characteristic of a controller as shown in FIG. 50. As is understood form FIG. 50, it is becomes possible to gain an easy steering characteristic suitable for the driver by increasing the delay of the control characteristic according the lowering of the road friction coefficient μ, even if the road friction coefficient μ changes.

As to the dumping which degrades when the road friction coefficient μ becomes smaller, it is possible to take countermeasures against the degradation by increasing the controlled variable according to the lowering of the road friction coefficient μ. Further, even if the steering torque decreases for the reason that the road friction coefficient μ becomes small, it is possible to obtain the characteristic of preferably performing the damping by increasing the controlled variable according to the lowering of the road friction coefficient μ even if the steering torque is small.

Next, there is discussed effects of the eleventh embodiment. The vehicular steering control apparatus of the eleventh embodiment obtains the following effects in addition to the effects of the first embodiment.

(24) Since there are provided a road friction coefficient detecting section 24 for estimating the road friction coefficient μ from the steering input, the vehicle behavior and phase compensator 16 of increasing the phase delay quantity as the estimated road friction coefficient decreases. Therefore, even when the road friction coefficient changes, it is possible to certainly ensure the damping of the vehicle behavior during the input of the steering torque, and therefore it becomes possible to gain an easy steering characteristic suitable for the driver even when the vehicle runs a low friction road.

(25) Phase compensator 16 of the eleventh embodiment is a phase compensator constructed by first-order advance and first-order delay and is represented by the following transfer function so as to simplifies the control characteristic.

$$(K - \tau num \cdot S)/(a + \tau den \cdot S)$$

wherein S is a Laplace operator, K is a gain ($\geq 0$), τnum is a first-order advance time constant ($\geq 0$), a is a constant ($>0$) and τden is a first-order delay time constant ($\geq 0$). This facilitates the installation thereof in controller 13 and prevents the unstable stability caused by the divergence (control).

(26) Since phase compensator 16 is arranged to decrease the gain K as the estimated road friction coefficient decreases, the phase compensation is adapted to the vehicle behavior change (lower of the resonance frequency) due to the lower of the road friction coefficient μ. Therefore, it is possible to obtain the easy steering characteristic suitable for the driver.

(27) Since phase compensator 16 is arranged to increase the first-order-advance time constant τnum as the estimated road friction coefficient decreases, the phase compensation adapted to the vehicle behavior change (degradation of the damping, lower of the resonance frequency) due to the lowering of the road friction coefficient μ. Therefore, it is possible to obtain the easy steering characteristic suitable for the driver.

(28) Since phase compensator 16 is arranged to increase the first-order-delay time constant τden as the estimated road friction coefficient decreases, the phase compensation adapted to the vehicle behavior change (lowering of the resonance frequency) due to the lowering of the road friction coefficient μ. Therefore, it is possible to obtain the easy steering characteristic suitable for the driver.

Twelfth Embodiment

Figure 51:
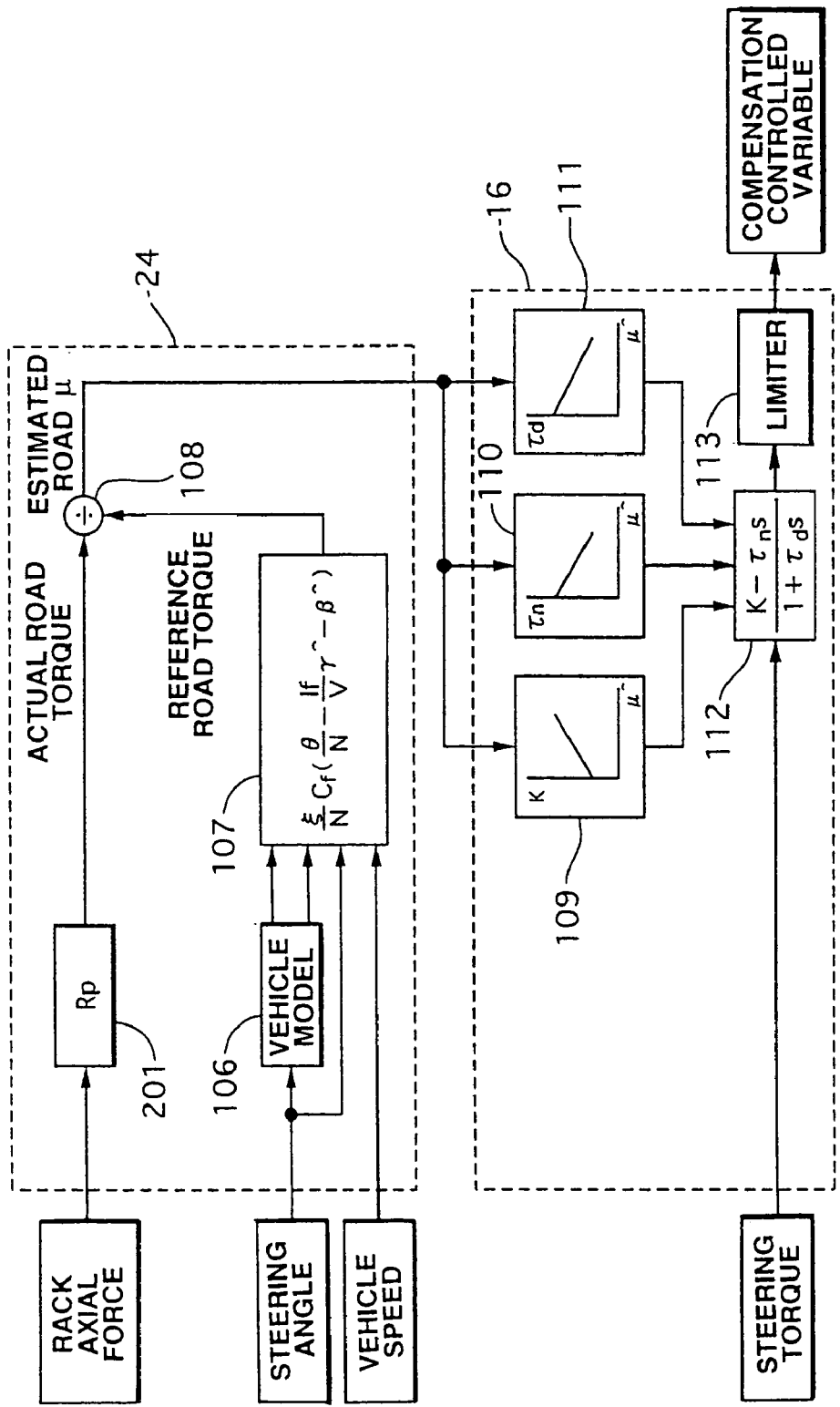
FIG. 51 is a control block diagram showing a phase compensation quantity changing control executed according to the road friction coefficient μ in the vehicular steering control apparatus of a twelfth embodiment.

FIG. 51 is a control block diagram showing an operation of road friction coefficient estimating section 24 and phase compensator 16 responsive to the output of road fiction coefficient estimating section 24 of a twelfth embodiment according to the present invention. The twelfth embodiment is basically the same as the eleventh embodiment except for comprising block 201 for measuring an actual road torque on the basis of the rack shaft force, instead of blocks 101 through 105 of the eleventh embodiment shown in FIG. 45. Since the operation and the effect of the twelfth embodiment are the same as those of the eleventh embodiment, the explanation thereof is omitted herein.

Thirteenth Embodiment

A thirteenth embodiment is specifically arranged to increase the phase delay as the vehicle speed increases. Since the construction of the thirteenth embodiment is the same as that shown by the control block diagram of the eleventh embodiment shown in FIG. 44, illustration and explanation thereof are omitted herein.

Next, there is discussed an operation of the thirteenth embodiment.

[Operation of Increasing the Phase Delay Quantity According to Road Friction Coefficient]

Figure 52:
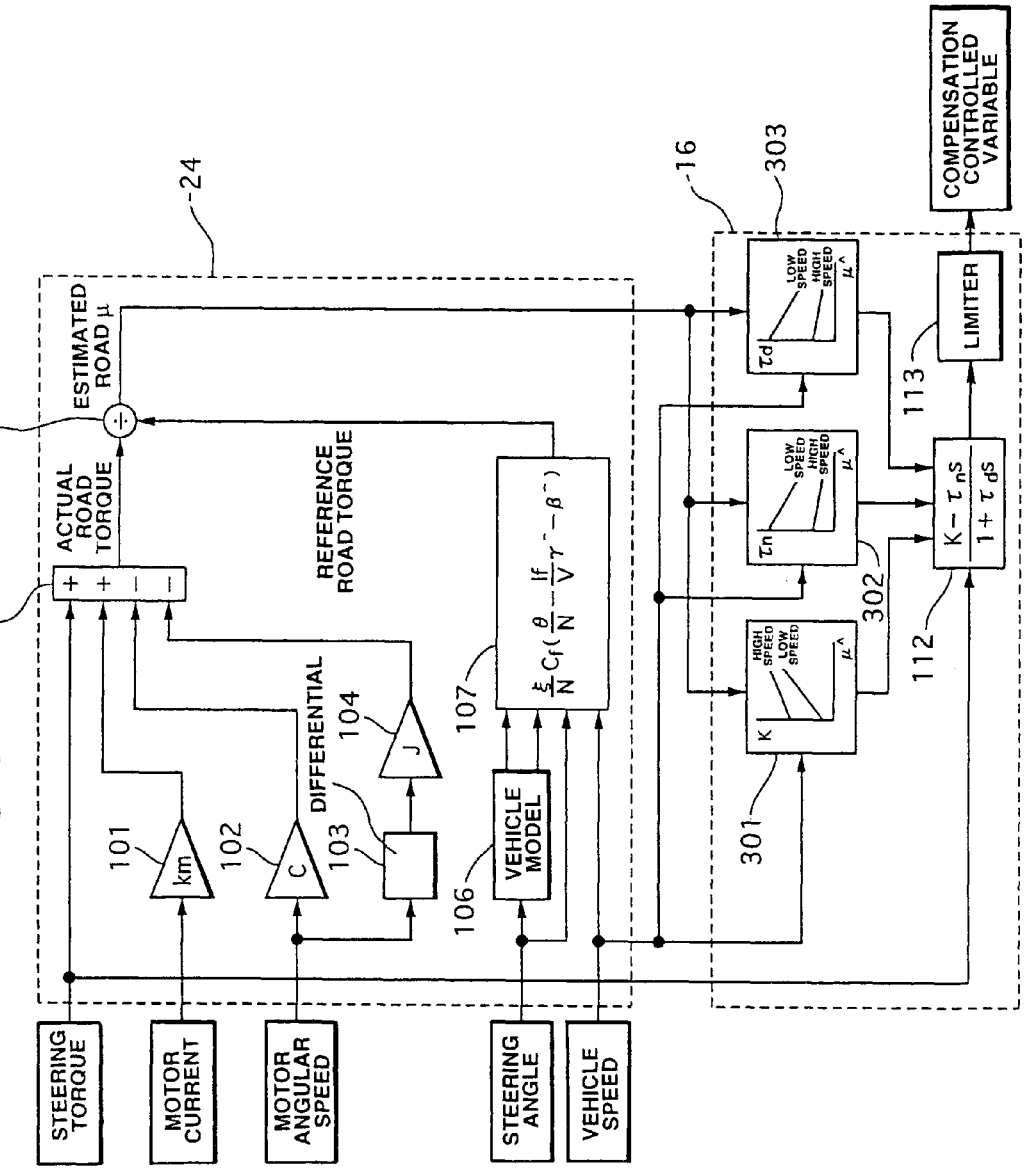
FIG. 52 is a control block diagram showing a phase compensation quantity changing control executed according to the road friction coefficient μ in the vehicular steering control apparatus of a thirteenth embodiment.

There is discussed the operation of road friction coefficient estimating section 24 and phase compensator 16 according to the output of road friction coefficient estimating section 24 of the thirteenth embodiment, with reference to FIG. 52. The same steps as those shown in FIG. 45 are denoted by the same reference numerals, and the explanation thereof is omitted herein.

Block 301 is a map for changing a coefficient K of the phase compensation according to the estimated road friction coefficient μ and the vehicle speed. The coefficient K decreases as the estimated road friction coefficient μ decreases, and increases as the vehicle speed increases. Further, an absolute value of a gain of K/P decreases as the vehicle speed increases. By decreasing the coefficient K as the road friction coefficient decreases, the phase delay of the phase compensating means increases when it is determined that the road friction coefficient decreases, and the phase compensation is adapted to the vehicle behavior change (lowering of resonance frequency) due to the lowering of the road friction coefficient μ. Accordingly, an easy steering characteristic suitable for a driver is obtained.

Since the controlled variable increases as the vehicle speed increases to a high speed at which a driver tends to feel that the vehicle behavior is unstable, the driver increases a safety feeling. Further, since the absolute value of the gain of K/μ decreases as the vehicle speed increases, the increase of the controlled variable starts from a lower speed as the road friction coefficient decreases. A driver feels anxiousness for the vehicle safety when a vehicle runs a low friction road rather than a dry road (not low friction road). Therefore, by employing the control of the thirteenth embodiment, it becomes possible to improve the safety feeling of the driver even when the vehicle runs such a road.

Block 302 is a map for changing a coefficient $\tau$num of the phase compensation according to the estimated road friction coefficient $\mu$ and the vehicle speed. The coefficient $\tau$num increases as the estimated road friction coefficient $\mu$ decreases, and decreases as the vehicle speed increases. Further, an absolute value of a gain of $\tau$num/$\mu$ decreases as the vehicle speed increases. By increasing the coefficient $\tau$num as the road friction coefficient decreases, the phase delay of the phase compensating means increases when it is determined that the road friction coefficient decreases, and the phase compensation is adapted to the vehicle behavior change (degradation of damping, lowering of resonance frequency) due to the lowering of the road friction coefficient $\mu$. Accordingly, an easy steering characteristic suitable for a driver is obtained.

Since the controlled variable increases as the vehicle speed increases to a high speed at which a driver tends to feel that the vehicle behavior is unstable, the driver increases a safety feeling. Further, since the absolute value of the gain of $\tau$num/$\mu$ decreases as the vehicle speed increases, the increase of the controlled variable starts from a lower speed as the road friction coefficient decreases. Since a driver feels anxiousness for the vehicle safety when a vehicle runs a low friction road rather than a dry road (not low friction road). Therefore, by employing the control of the thirteenth embodiment, it becomes possible to improve the safety feeling of the driver even when the vehicle runs such a road.

Block 303 is a map for changing a coefficient $\tau$den of the phase compensation according to the estimated road friction coefficient $\mu$ and the vehicle speed. The coefficient $\tau$den increases as the estimated road friction coefficient $\mu$ decreases, and decreases as the vehicle speed increases. Further, an absolute value of a gain of $\tau$den/$\mu$ decreases as the vehicle speed increases. By increasing the coefficient $\tau$num as the road friction coefficient decreases, the phase delay of the phase compensating means increases when it is determined that the road friction coefficient decreases, and the phase compensation is adapted to the vehicle behavior change (lowering of resonance frequency) due to the lowering of the road friction coefficient $\mu$. Accordingly, an easy steering characteristic suitable for a driver is obtained. Since the controlled variable increases as the vehicle speed increases to a high speed at which a driver tends to feel that the vehicle behavior is unstable, the driver increases a safety feeling. Further, since the absolute value of the gain of $\tau$den/$\mu$ decreases as the vehicle speed increases, the increase of the controlled variable starts from a lower speed as the road friction coefficient decreases. Since a driver feels anxiousness for the vehicle safety when a vehicle runs a low friction road rather than a dry road (not low friction road). Therefore, by employing the control of the thirteenth embodiment, it becomes possible to improve the safety feeling of the driver even when the vehicle runs such a road.

Namely, the vehicular steering control apparatus of the thirteenth embodiment can certainly ensure the optimal damping of the vehicle behavior during the input of the steering torque according to the road friction coefficient and the vehicle speed and can apply safety feeling to a driver by obtaining a preferable steering characteristic even if the vehicle runs a low friction road at a relative high speed at which a driver tends to have feeling of anxiety.

Next, there is discussed effects of the thirteenth embodiment. The vehicular steering control apparatus of the thirteenth embodiment obtains the following effects in addition to the effect of the eleventh embodiment.

(29) Since phase compensator 16 executes a phase compensation by increasing the phase delay as the vehicle speed increases, it becomes possible to obtain the easy steering characteristic suitable for a driver.

(30) Since phase compensator 16 is arranged to increase the controlled variable from a further lower vehicle speed as the road friction coefficient decreases by increasing the phase compensation quantity as the vehicle speed increases, it becomes possible to improve the safety feeling of the driver during the running of a low friction road.

Fourteenth Embodiment

A fourteenth embodiment according to the present invention is specifically arranged to set the torque command value of motor 5 on the basis of a negative first command wherein a gain of the actuator torque relative to the steering torque decreases as the frequency of the steering torque increases, and a second command value wherein a phase delay of the actuator torque relative to the steering torque approaches 180° as the frequency of the steering torque increases.

Figure 53:
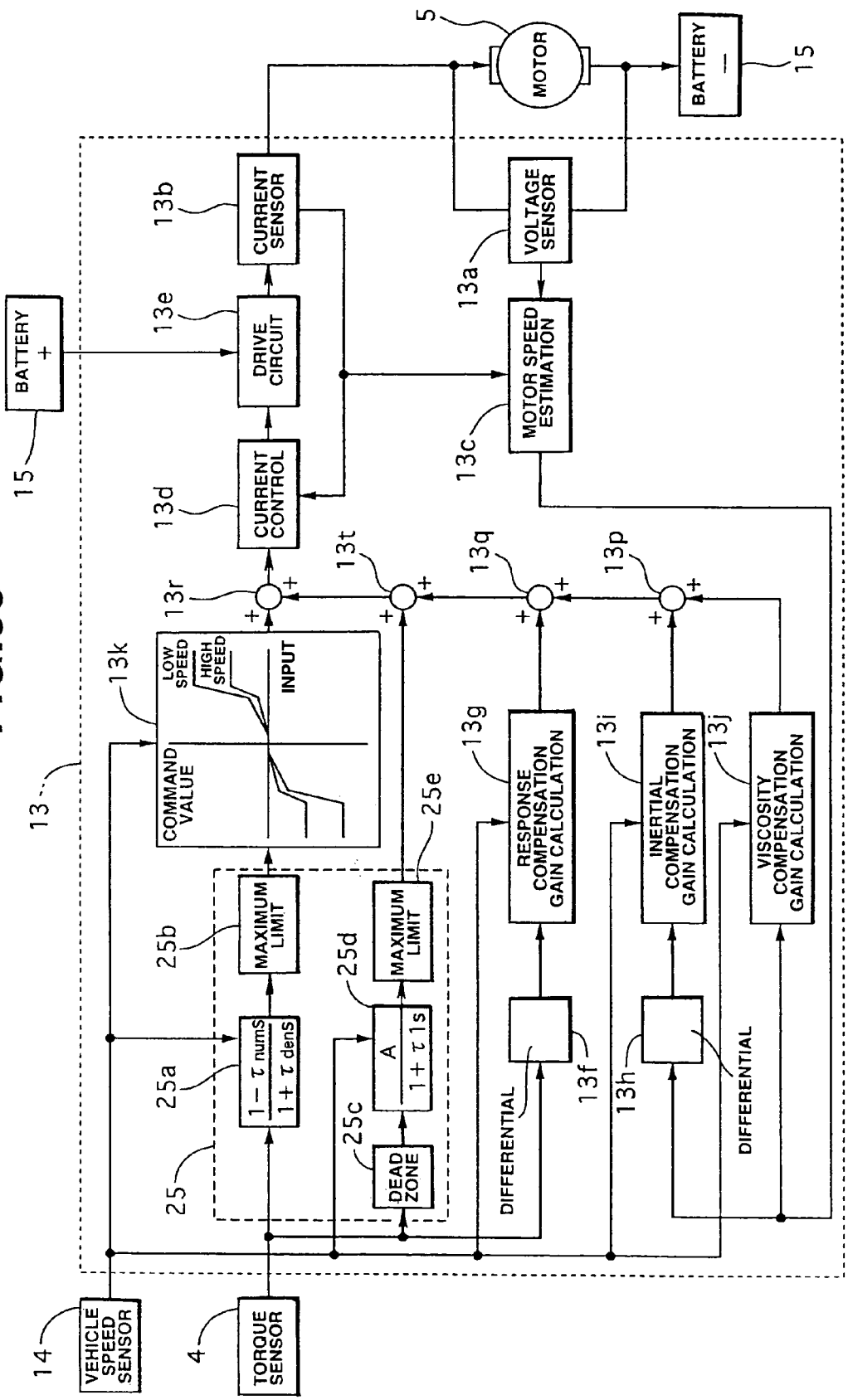
FIG. 53 is a control block diagram of the vehicular steering control apparatus of a fourteenth embodiment.

That is, referring to the control system on the basis of a control block of the vehicular steering control apparatus of the fourteenth embodiment shown in FIG. 53, The fourteenth embodiment comprises a control section 25 corresponding to steering controlling means which is constructed by a phase compensator 25a, a limiter 25b, a dead zone 25c, a phase compensator and a limiter 25e.

Phase compensator 25a has a characteristic represented by a first-order-advance/first-order-delay transfer function, and produces the second command value according to the steering torque and the vehicle speed. Limiter 24b limits the second command value.

Dead zone 25c removes noises of torque sensor 4 and outputs the processed signal to phase compensator 25d. Phase compensator 25d has a characteristic represented by a first-order-delay transfer function, and produces the first command value according to the steering torque and the vehicle speed. Limiter 24e limits the first command value.

That is, in the fourteenth embodiment, by processing the detected steering torque at control section 25, there are produced the first command value by which the motor torque relative to the steering torque decreases as the frequency of the steering torque increases, and the second command value by which the phase delay of the actuator torque relative to the steering torque approaches 180° as the frequency of the steering torque increases. Further, the torque command of motor 5 is obtained by adding the first and second command values. The characteristics of the respective phase compensators 25a and 25d are changeable according to the vehicle speed.

Adders 13p, 13q, 13t and 13r obtain the sum of the responsibility-compensation current command value, the inertia-compensation current command value, the viscosity-compensation current command value, the second command value, and a value obtained by processing the first command value at a current command value calculation block 13k, and outputs the obtained sum to current control block 13d as a current command value. Since the other construction is the same as that of the first embodiment, illustration and explanation thereof are omitted herein.

Next, there is discussed the operation of the fourteenth embodiment.

[Logic of Setting the First Command Value and the Second Command Value]

Figure 54A:
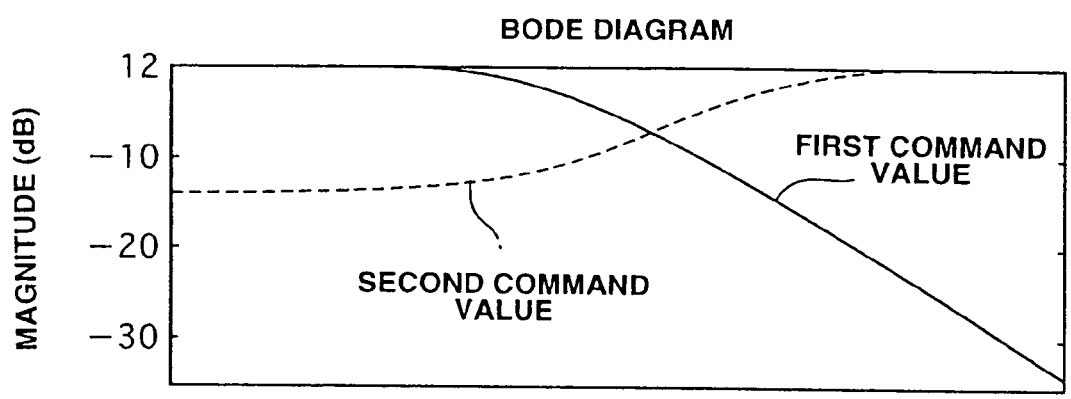
FIGS. 54A and 54B are graphs showing a frequency characteristic of a first command value and a second command value in the vehicular steering control apparatus of the fourteenth embodiment.
Figure 54B:
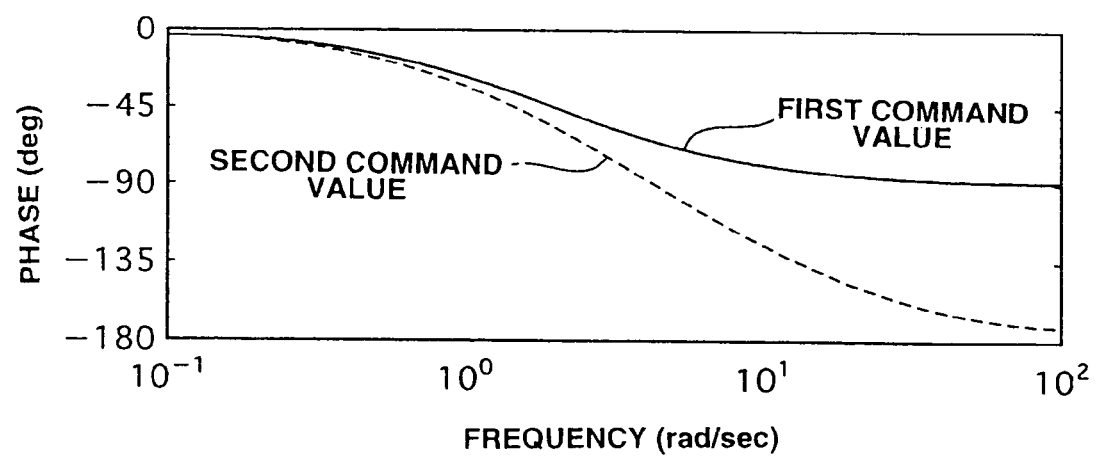

When phase compensator 25a of producing the second command value is constructed by first-order-advance/fist-order-delay as represented by the following expression (17), the frequency characteristic thereof is represented by a broken line in FIGS. 54A and 54B. The second command value obtained at compensator 25a has a characteristic of assisting in the opposite direction to the steering torque as the frequency becomes high. That is, the phase delay becomes large and then inversed.

$$C2(S)=(1-\tau num \cdot S)/(1+\tau den \cdot S) \tag{17}$$

The output of phase compensator 25a has a characteristic shown in FIG. 15 of the first embodiment when the torque input is a transient input such as a step-wise input. In FIG. 15, a gain to the lower side of the output is determined by the first-order-advance time constant τnum. In the fourteenth embodiment, the first-order-advance time constant τnum is a function of the vehicle speed. The delay of the output is determined by the first-order-delay time constant τden. Since a steady state gain of phase compensator 25a is set at 1, the steady state assist quantity relative to the steering torque is determined by an assist map of current command calculation block 13K, wherein the command value is determined from the processed steering torque and the vehicle speed.

As is understood from the time-series change of the outputs in FIG. 15, controller 13 executes the inverse assist in the direction of increasing the resistance force of steering wheel 1 immediately after the transient input is inputted as a target current value.

Since the assist is momentarily applied in the opposite direction relative to the driver's steering direction, the driver feels that the steering torque increased. Accordingly, by providing limiter 25b, unnecessary increase of the steering torque is prevented.

Subsequently, when phase compensator 25d of producing the first command value is constructed by the first-order-delay as shown by the following expression (18), the frequency characteristic thereof is shown by the continuous line in FIGS. 54A and 54B. The first command value obtained at compensator 25d has a characteristic of decreasing the assist force relative to the steering torque as the frequency becomes high. The direction of the assisting force is opposite to the direction of the steering torque.

$$C1(S)=-A/(1+\tau 1 s) \tag{18}$$

The output of compensator 25d is outputted directly with small phase delay and produces the assisting force in the direction of increasing the operation force of steering wheel 1, when the input to compensator 25d is slow. Since the output decreases and the phase delay increases as the frequency increases, the assist quantity almost becomes zero. The gain A thereof is a function of the vehicle speed in the fourteenth embodiment.

When steering wheel 1 is slowly steered (turned), the steering torque felt by the driver increases relative to the driver's steering direction. Accordingly, by providing limiter 25e, unnecessary increase of the steering torque is prevented.

In order to prevents the fluctuation of the assist force caused by vehicle vibration and electrical noise of the torque sensor, that is the fluctuation of the steering torque, there is provided dead zone 25c.

It is preferable that the time constant T1 of the first command value is greater than the time constant τden of the second command value. FIGS. 54A and 54B show frequency characteristics in case that τ1>den. When the frequency is low, a gain of the first command value is high, and a gain of the second command value is low. Accordingly, in case that steering wheel 1 is slowly and slightly steered, such as when the vehicle runs straight at high speed, motor 5 produces the assist force in the opposite direction relative to the steering operation. Accordingly, it becomes possible to quickly generate the steering torque relative to the small input and to cooperatively transmit the road information with small phase delay.

When the frequency is high, the gain of the first command value is low, and the gain of the second command value is high. The phase thereof is offset by almost 180°. Accordingly, the damping of the vehicle behavior is improved when the steering input is based on the second command value. It becomes possible to obtain an easy steering characteristic suitable for the drive in case that the driver aggressively steers steering wheel 1, such as a high-speed cornering and a high-speed lane change.

Figure 55:
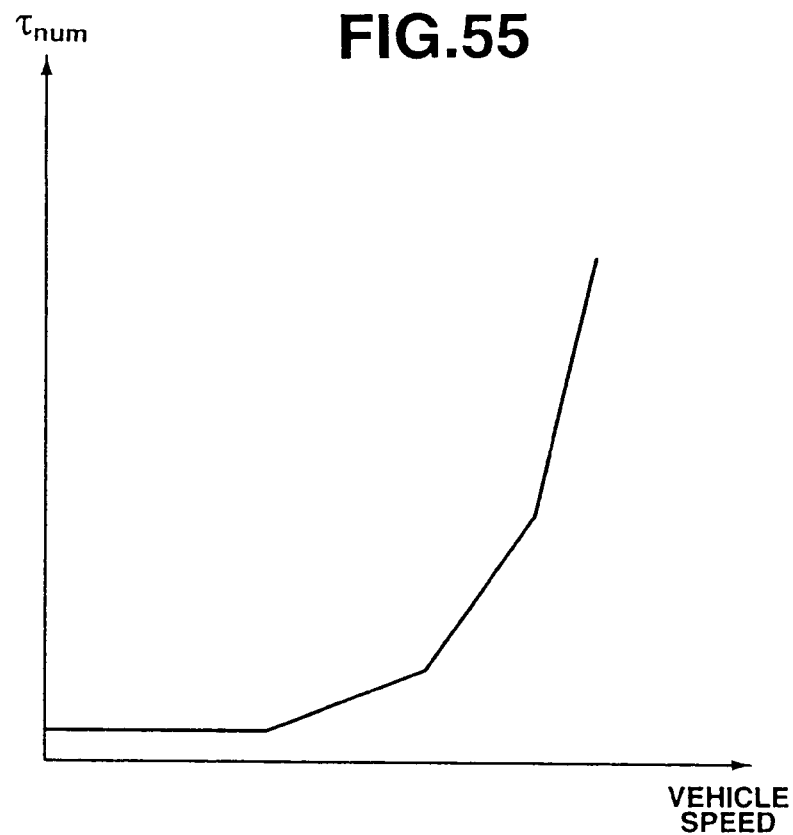
FIG. 55 is a graph showing a map of setting a gain τnum of the second command value of the fourteenth embodiment.
Figure 56:
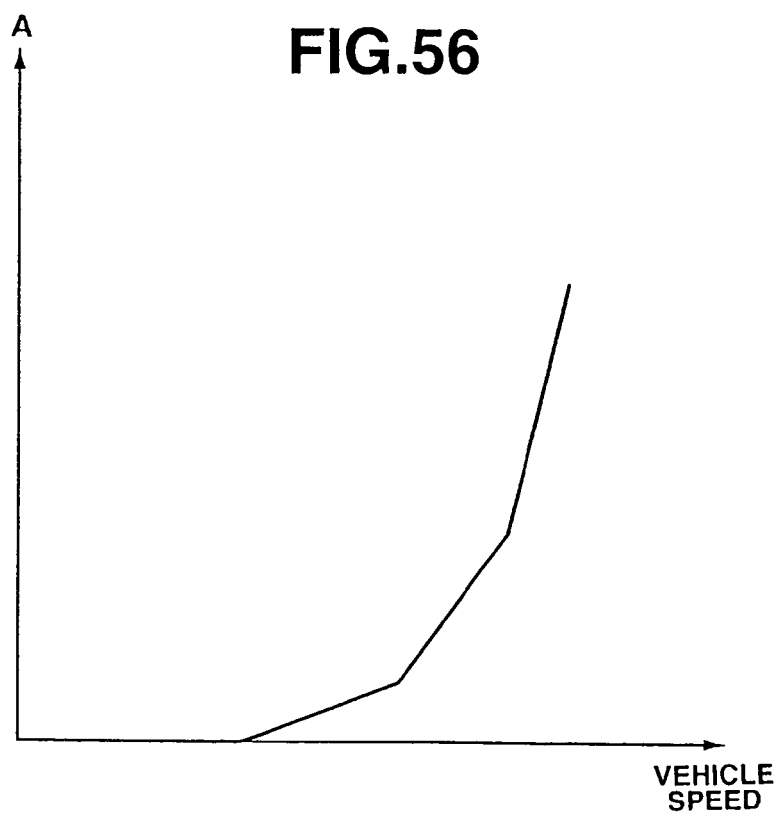
FIG. 56 is a graph showing a map of setting a gain K of the first command value of the fourteenth embodiment.

Further, as shown in FIGS. 55 and 56, since the gain τnum of the second command value and the gain A of the first command value increase as the vehicle speed increases, by setting the gains τnum and A as functions of the vehicle speed, respectively, it become possible to obtain the preferable performance when the vehicle runs at high speed where a driver requires a stable steering feeling and the damping of the vehicle.

Subsequently, there is discussed effects of the fourteenth embodiment according to the present invention. The vehicular steering control apparatus of the fourteenth embodiment obtains the following effects.

(31) Control section 25 sets the torque command value of motor 5 on the basis of the sum of the negative first command value by which the gain of the actuator torque relative to the steering torque as the steering torque increases, and the second command value by which the phase delay of the actuator torque relative to the steering torque approaches near 180°. Therefore, it becomes possible to obtain an easy steering characteristic suitable for the driver in case that the driver aggressively steers steering wheel 1 such as a case of the high speed cornering or a lane change, by improving the damping of the vehicle behavior during the input of the steering torque by the second command value. Further, in case that steering wheel 1 is slowly and slightly steered such that the gain of the second command value is decreased by the second command value, such as when the vehicle runs straight at high speed, motor 5 produces the assist force in the opposite direction relative to the steering operation. Accordingly, it becomes possible to quickly generate the steering torque relative to the small input and to cooperatively transmit the road information with small phase delay.

(32) Since control section 25 sets the delay time constant τ1 of the first command value at a value greater than the delay time constant τden of the second command value, when the vehicle runs straight at high speed, steering wheel 1 receives the assist from motor 5 in the opposite direction. Therefore, it becomes possible to quickly produce the steering torque relative to the small input and to cooperatively transmit the road information with small phase delay.

(33) Control section 25 comprises first-order-advance/first-order-delay phase compensator 25a for setting the second command value and has the characteristic represented by the following transfer function. Therefore, it becomes possible to solve the control unstable state due to the divergence while maintaining the easy control characteristic and facilitating the installation of control 13.

$$(K-\tau num \cdot S)/(a+\tau den \cdot S)$$

wherein S is a Laplace operator, K is a gain (≧0), τnum is a first-order advance time constant (≧0), a is a constant (>0) and τden is a first-order delay time constant (≧0).

(34) Since control section 25 increases at least one of the absolute values of gains of the first and second command values as the vehicle speed increases, it becomes possible to obtain the damping of the vehicle and the stable feeling at the neutral position when the vehicle runs at high speed.

(35) Since control section 25 comprises limiter 25b for the first command value and limiter 25e of the second command value, it becomes possible to prevent the steering torque from unnecessarily increase.

(36) Since control section has dead zone 25c for the first command value, it becomes possible to prevent the erroneous operation caused by noises of sensor and the like.

Fifteenth Embodiment

Figure 57:
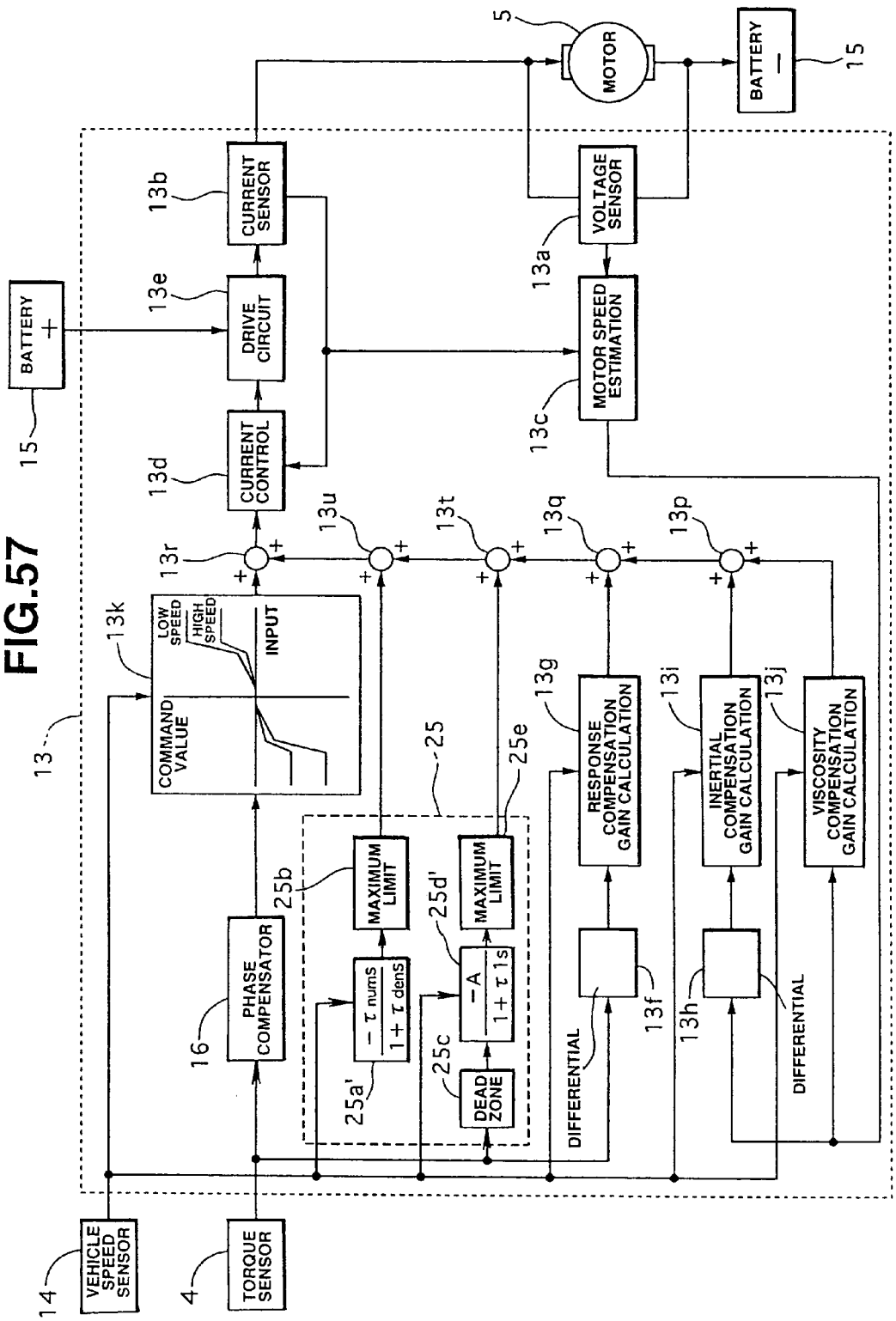
FIG. 57 is a control block diagram of the vehicular steering control apparatus of a fifteenth embodiment.

A fifteenth embodiment according to the present invention employs the other phase compensation method different from that of the fourteenth embodiment. More specifically, the vehicular steering control apparatus of the fifteenth embodiment comprises a phase compensator 25a', a phase compensator 25d' and a phase compensator 16, as shown in FIG. 57.

Phase compensator 25a' has a characteristic represented by the transfer function of executing an approximation differential. Phase compensator 25d' has a characteristic represented by the transfer function of executing a first-order delay. Phase compensator 16 25d compensates the phase in the frequency characteristic of steering torque according to the vehicle speed, the steering torque, and the steering speed (motor speed). The output of phase compensator 16 is sent to current command value calculation block 13k, and the phase compensation current command value is calculated therein.

Adders 13p, 13q, 13t, 13u, and 13r obtain the sum of the responsibility-compensation current command value, the inertia-compensation current command value, the viscosity-compensation current value, the second command value, the first command value and the phase-compensation current command value. The obtained sum is outputted to current control block 13d as a current command value. Since the other construction is the same as that of the fourteenth embodiment, the explanation thereof is omitted herein.

Next, there is discussed the operation of the fifteenth embodiment.

[Logic of Setting First Command Value and Second Command Value]

In the fifteenth embodiment, the steady assistance relative to the steering torque is determined by phase compensator 16 and current command value calculation block 13k. Phase compensator 16 is for securing the stability of a servo system like the usual electric power-steering control. The assist quantity, which is determined by the phase-compensated steering torque compensated at phase compensator 16 and the vehicle speed, is calculated by the map in current command value calculation block 13k.

Figure 58A:
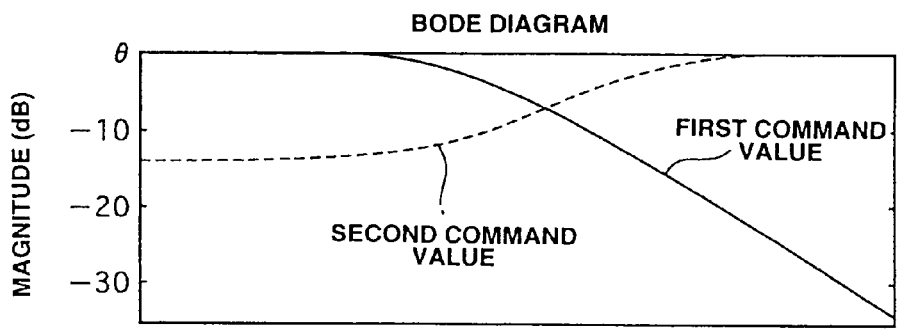
FIGS. 58A and 58B are graphs showing the frequency characteristics of the first command value and the second command value in the vehicular steering control apparatus of the fifteenth embodiment.
Figure 58B:
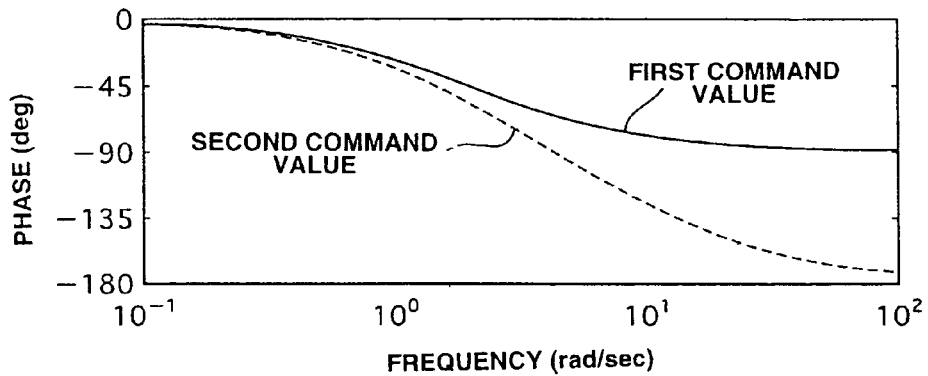

When phase compensator 25a' of producing the second command value is constructed by approximation differential as represented by the following expression (19), the frequency characteristic thereof is represented by a broken line in FIGS. 58A and 58B. The second command value obtained at compensator 25a' has a characteristic of assisting in the opposite direction to the steering torque as the frequency becomes high. That is, the phase delay becomes large and then inversed.

$$C2(S) = -\tau n S/(1+\tau den \cdot S) \quad (19)$$

Phase compensator 25a' momentarily produces an assist directed in the opposite direction when the torque input is a transient input such as a step-wise input. The magnitude of the assist in the opposite direction is determined by the advance time constant τnum. In the fifteenth embodiment, the first-order-advance time constant τnum is a function of the vehicle speed. The delay of the output is determined by the first-order-delay time constant τden.

Accordingly, controller 13 momentarily executes the inverse assist in the opposite direction of increasing the resistance force of steering wheel 1 immediately after the transient input is inputted as a target current value.

Since the assist is momentarily applied in the opposite direction relative to the driver's steering direction, the driver feels that the steering torque increased. Accordingly, by providing limiter 25b, unnecessary increase of the steering torque is prevented.

Subsequently, when phase compensator 25d' of producing the first command value is constructed by the first-order-delay as shown by the following expression (20), the frequency characteristic thereof is shown by the continuous line in FIGS. 58A and 58B. The first command value obtained at compensator 25 has a characteristic of decreasing the assist force relative to the steering torque as the frequency becomes high. The direction of the assisting force is opposite to the direction of the steering torque.

$$C1(S) = -A/(1+\tau 1 \cdot s) \quad (20)$$

The output of compensator 25d' is outputted directly with small phase delay and produces the assisting force in the direction of increasing the operation force of steering wheel 1, when the input to compensator 25d is slow. Since the output decreases and the phase delay increases as the frequency increases, the assist quantity almost becomes zero. The gain A thereof is a function of the vehicle speed in the fifteenth embodiment.

Next, there is discussed an effect of the fifteenth embodiment. The vehicular steering control apparatus of the fifteenth embodiment obtains the following effect.

(37) Since phase compensator 25a' executes the approximation differential, the control characteristic becomes simple as compared with that of the fourteenth embodiment. Therefore, the installation of phase compensator 25' to controller 13 is further facilitated.

Sixteenth Embodiment

A sixteenth embodiment of the present invention is specifically arranged to calculate a damping correction controlled variable of motor 5 according to the signal obtained by processing the steering speed by the first-order delay. Since the construction of the sixteenth embodiment is the same as that of the first embodiment, illustration and explanation there of are omitted herein.

Next, there is discussed the operation of the fifteenth embodiment.

[About Motor Command Value Calculation]

Figure 59:
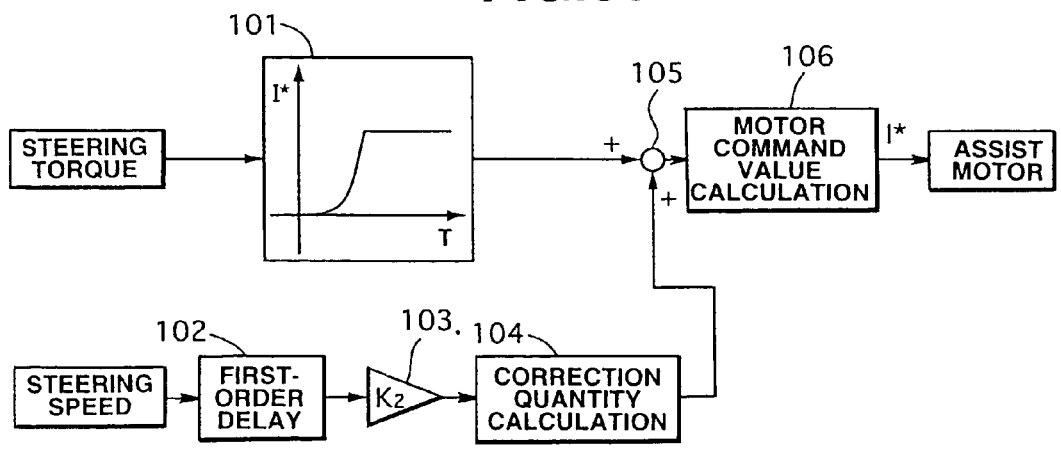
FIG. 59 is a control block diagram showing a motor command value calculation control of the vehicular steering control apparatus of a sixteenth embodiment.

FIG. 59 shows a block diagram showing a motor command value calculation control block. Block 101 calculates a motor current command value relative to the steering torque input. Block 102 processes the steering speed of steering wheel 1 by the first-order-delay function. The steering speed of steering wheel 1 is obtained from the revolution speed of motor 5 which is calculated using the motor terminal-to-terminal voltage and the motor current. This method of obtaining the steering speed corresponds to steering speed detecting means.

Figure 60:
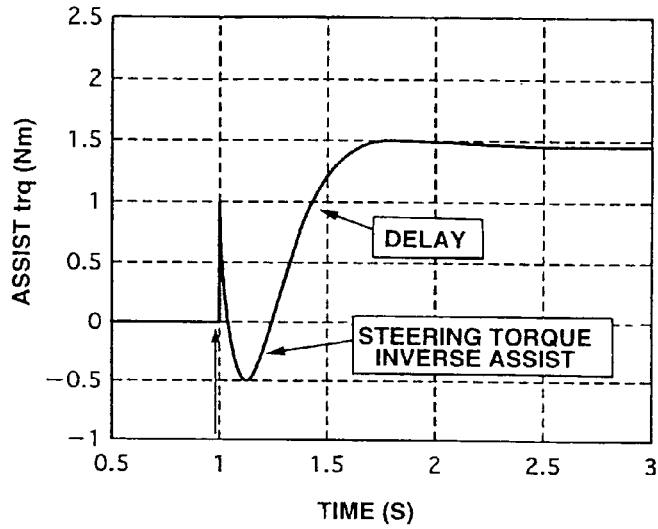
FIG. 60 is a graph showing a simulation result of the vehicular steering control apparatus of the sixteenth embodiment.

Block 103 multiplies the processed steering speed by a negative gain K2. Block 104 calculates the damping correction controlled variable from the output of block 103. Block 105 adds the damping correction controlled variable to the motor current command value. Block 106 calculates the motor command value on the basis of the output of block 105, and outputs the motor command value to motor 5. Blocks 102 through 105 constructs compensation controlling means for calculating the damping correction controlled variable on the basis of the first-order delay of the detected steering speed and executing a motor compensation control on the basis of the damping correction controlled variable and the basic controlled variable according to the steering torque. FIG. 60 shows a simulation result of the sixteenth embodiment in case that the first-order delay is set at 0.01/(0.01 s+1) and the gain $K_2$ is set at −1.

Figure 61A:
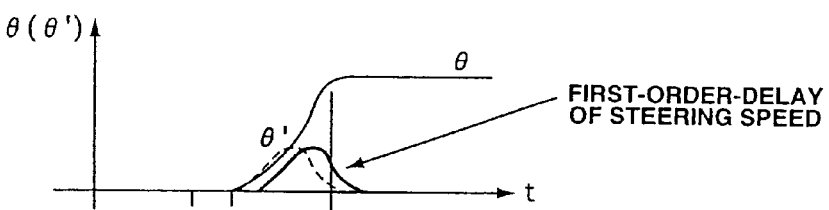
FIGS. 61A, 61B and 61C are time charts showing a damping correction control operation of the steering angle, the steering torque and a motor command signals in the vehicular steering control apparatus of the sixteenth embodiment.
Figure 61B:
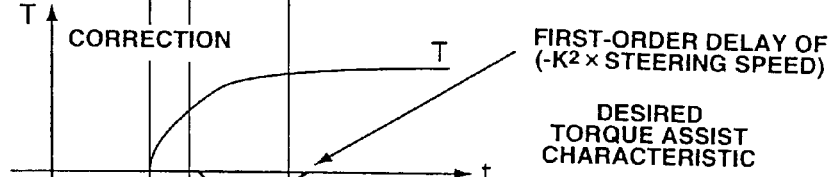
Figure 61C:
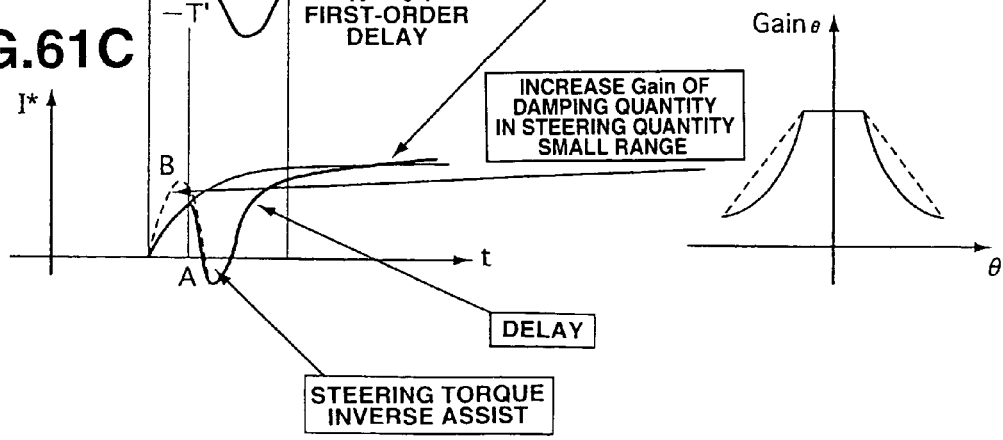

There is discussed the signal patterns of the fifteenth embodiment with reference to FIGS. 61A, 61B and 61C. Since the rising of steering torque T is very quick as compared with that of steering angle θ, by executing the operation of the sixteenth embodiment, motor current command value I* creates a waveform shown in FIG. 61C. Since a time period Δt from the rising of steering torque T to the rising of steering angle θ is very short. They are shown in FIGS. 61A and 61B so as to be simultaneous.

Accordingly, as shown in FIG. 61C, a desired assist characteristic is obtained. More specifically, the assist is momentarily produced in the opposite direction when turning of steering wheel 1 is started as shown by area A in FIG. 61C, and the assist is delayed relative to the rising of the torque as shown by area B in FIG. 61c. Therefore, slipping or radical returning of steering wheel 1 is prevented regardless of the steering speed and the vehicle speed. Further, the driver's safety feeling and the usability of the apparatus are improved, and the stable feeling in the vanity of the steering-wheel neutral position is obtained. Accordingly, the usable and suitable steering feeling is maintained.

During a time period from the rising of the steering torque to the rising for the steering angle, the assist is produced in the positive direction. This assist lightens the affect of the torque production delay caused by the friction of motor 5 and the torsion of the steering system and obtains the natural reaction force. Further, by increasing the gain when the steering quantity is small, the operation of the control is further effectively executed.

Figure 62A:
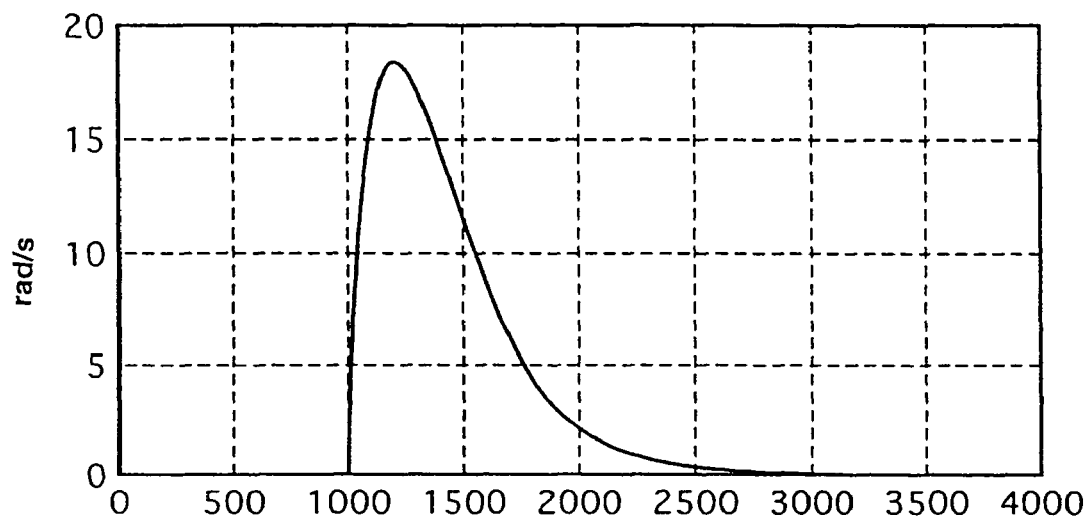
FIGS. 62A and 62B are time charts of a damping correction quantity in case that the steering speed is small, in the vehicular steering control apparatus of the sixteenth embodiment.
Figure 62B:
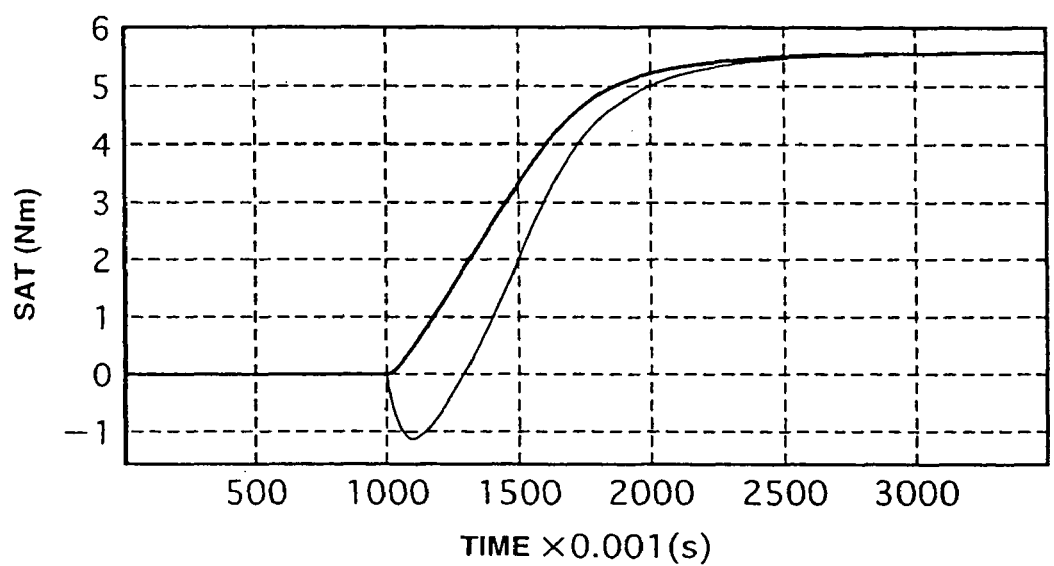
Figure 63A:
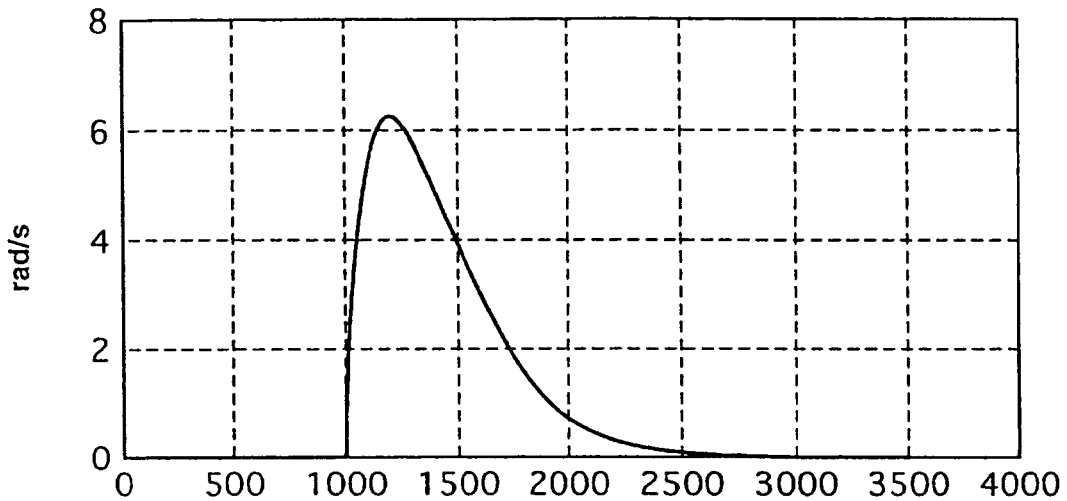
FIGS. 63A and 63B are time charts of a damping correction quantity in case that the steering speed is large, in the vehicular steering control apparatus of the sixteenth embodiment.
Figure 63B:
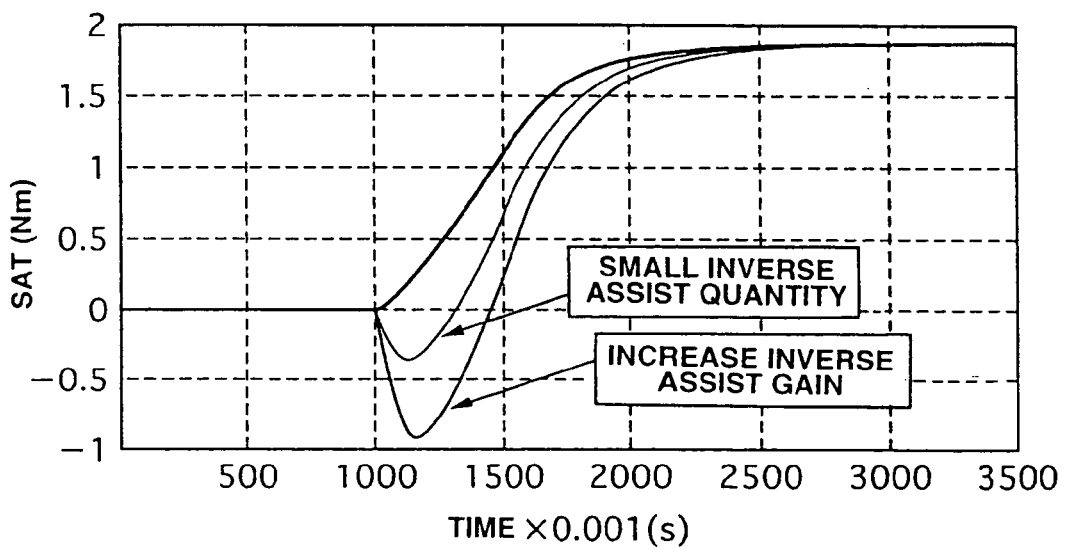

The steering speed becomes high when the steering quantity caused by the change of the steering speed as shown in FIG. 62A. According to the increase of the steering speed, the damping correction quantity increases as shown in FIG. 62B. However, since the steering speed becomes low when the steering quantity is small as shown in FIG. 63A, and therefore the damping quantity becomes short. Accordingly, by the arrangement of the sixteenth embodiment, the gain K2 of the damping quantity is increased as shown in FIG. 63B when the steering angle is small, that is, when the steering speed is low. This arrangement therefore functions to prevent the damping quantity from being differentiated according to the steered quantity of steering wheel 1.

[Concept of the Present Embodiment]

A conventional electric power steering (EPS) with a motor is arranged to produce an assist force relative to a steering-wheel turning operation by controlling the revolution speed of the motor according to a detected steering torque. For example, Japanese Patent No. 3412579 is arranged to suppress a slip or radical return of a steering wheel by adding a control variable according to a differential of the steering torque and by compensating a shortage of the assist force, which is caused by the steering torque due to an inertia force and friction of the electric motor, according to the vehicle speed and the steering speed.

As discussed in the first embodiment, FIG. 11 shows the frequency characteristic of the steering angle relative to the steering torque, for realizing the ideal steering characteristic. The following two operations are the important features of the ideal solution.

(I) To momentarily produce an assist force in the opposite direction when a turning of a steering wheel is started.

(II) To delay the assist relative to a rising of the steering torque.

Figure 64:
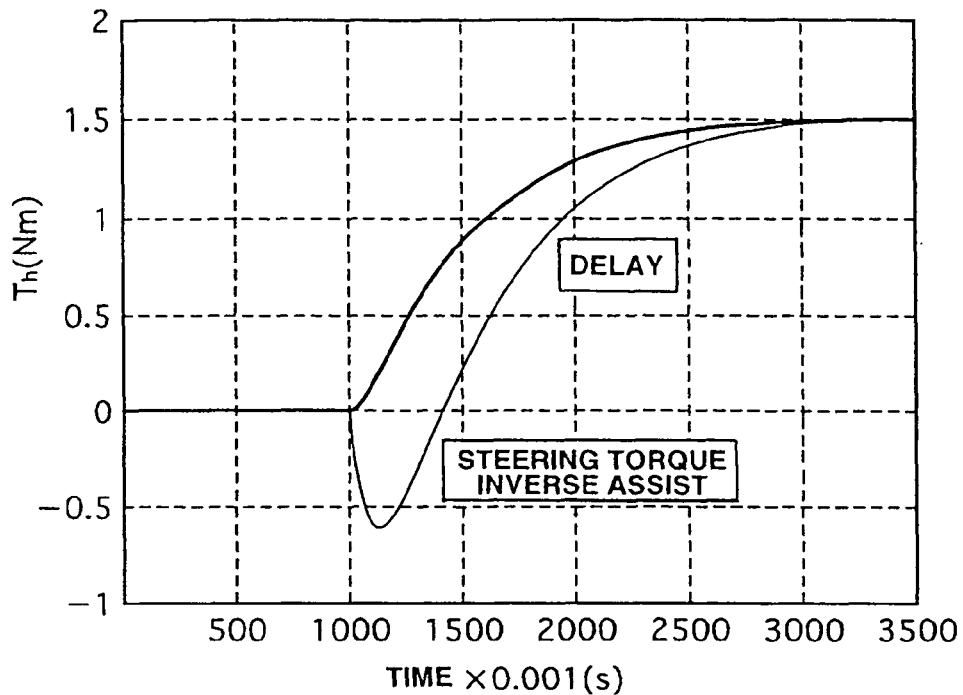
FIG. 64 is a time chart showing an ideal assist characteristic of the vehicular steering control apparatus of the sixteenth embodiment.

These two operations are represented as time-series data in FIG. 64.

Figure 65:
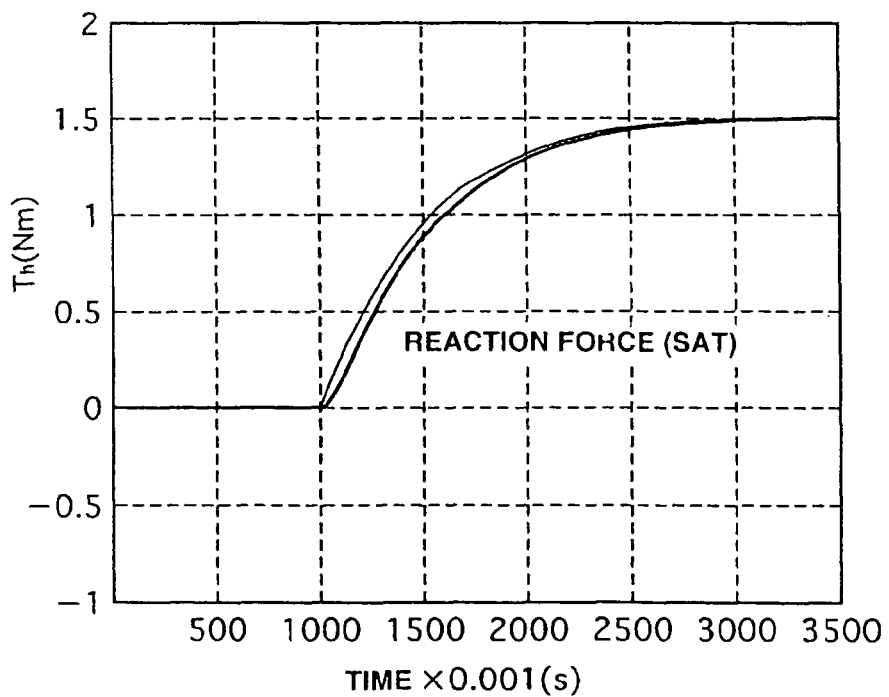
FIG. 65 is a time chart showing an assist characteristic of a conventional electric power steering apparatus.

However, the above-discussed conventional apparatus, which employs only a feature of improving the responsibility, could not produce the ideal assist characteristic, as shown in FIG. 65. Further, since this conventional apparatus remains the motor inertia to be compensated, the steering feeling thereof is still unnatural. For example, when a differential of the steering torque increases as the steering speed increases, the steering assist force by the electric motor also increases. Accordingly, the driver feels a difference between a steering reaction force caused by a slow steering operation and a steering reaction force caused by a quick steering operation. Further, when the steering wheel is returned, a positive/negative sign of the controlled variable according to the steering torque becomes different from a positive/negative sign of the controlled variable according to the differential of the steering torque. Accordingly, the conventional apparatus has not obtained a preferable steering characteristic for the reason that a driver feels a slip in the steering operation or a radical return of the steering wheel is caused.

In contrast, the vehicular steering control apparatus according to the sixteenth embodiment of the present invention is arranged to momentarily produce an assist force in the opposite direction when a turning of a steering wheel is started and to delay the assist relative to a rising of the steering torque. Accordingly, the damping of the vehicle behavior relative to the steering torque input is improved, and it becomes possible to obtain an almost ideal assist characteristic. Further, since the damping quantity decreases when the steering speed becomes slow due to the inverse assist to the steering torque, a holding performance and a straight running performance at a steering-wheel neutral position are improved, and a stable feeing at the time that steering wheel 1 slightly steered near the neutral position is also improved. Furthermore, since the damping quantity decreases when steering wheel 1 is radically steered or when the vehicle runs at high speed, a slip and a radical return of steering wheel 1 are prevented, and therefore a feeling of a natural steering, a safety feeling and an improvement in operation are obtained.

Next, there is discussed an effect of the sixteenth embodiment. The vehicular steering control apparatus of the sixteenth embodiment obtains the following effects.

(38) The sixteenth embodiment comprises the steering speed detecting means for detecting the steering speed and controller 13 which comprises the compensating means for calculating the damping correction quantity on the basis of the first-order delay of the detected steering speed and for executing the compensation control of motor 5 on the basis of the damping correction controlled variable and the basic controlled variable according to the steering torque. The compensating means corresponds to blocks 102 through 105. Therefore, it becomes possible to obtain the ideal assist characteristic which delays the assist relative to the rising of the steering torque. This prevents slip and radical return of the steering wheel during the steering-wheel operation regardless of the steering speed and the vehicle speed and realizes the improvement in a driver's safety feeling and an operability, and the stable feeling near the steering-wheel neutral position.

(39) Since the compensation control means increases the damping correction controlled variable when the steering speed is in a low speed range as compared with that when the steering speed is in a high speed range, it is possible that the damping quantity is largely varied according to the steering-wheel turn quantity.

Seventeenth Embodiment

A seventeenth embodiment according to the present invention is specifically arranged to calculate the damping correction controlled variable of motor 5 according to the first-order differential of the steering torque and a signal obtained by processing the steering speed by the first-order delay.

Next, There is discussed the operation of the seventeenth embodiment.

[About Motor Command Value Calculation]

Figure 66:
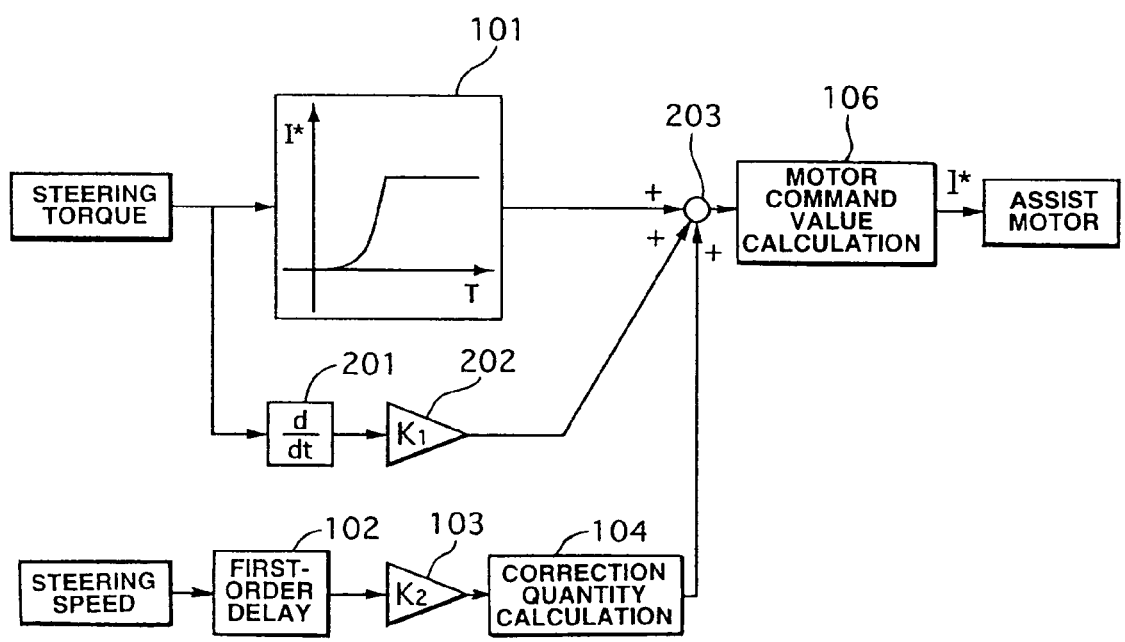
FIG. 66 is a control block diagram showing the motor command value calculation control of the vehicular steering control apparatus of a seventeenth embodiment.

FIG. 66 shows a block diagram showing the motor command value calculation. Blocks as same as those shown in FIG. 59 are denoted by the same reference numerals, and the explanation thereof is omitted herein.

Block 201 calculates the first-order differential of the detecting steering torque. Block 202 obtains the damping correction controlled variable by multiplying the first-order differential of the steering torque by the negative gain $K_2$. Block 203 adds the two damping correction quantities to the motor current command value. Blocks 102 through 104 and blocks 201 through 203 in FIG. 66 construct the compensation control means.

Figure 67A:
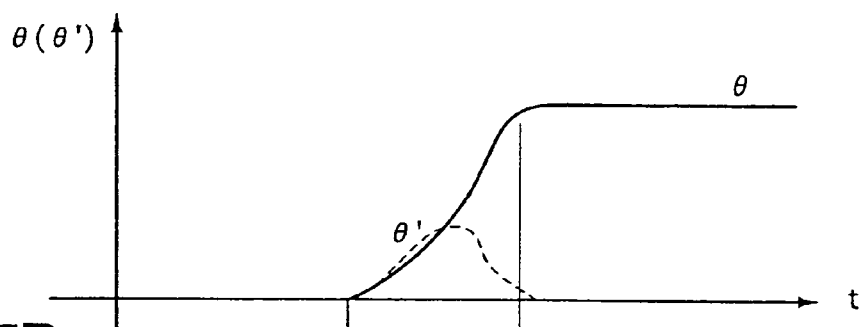
FIGS. 67A, 67B, 67C and 67D are time charts of the steering angle, the steering torque and the motor command signal, which show the damping correction control operation of the vehicular steering control apparatus of the seventeenth embodiment.
Figure 67B:
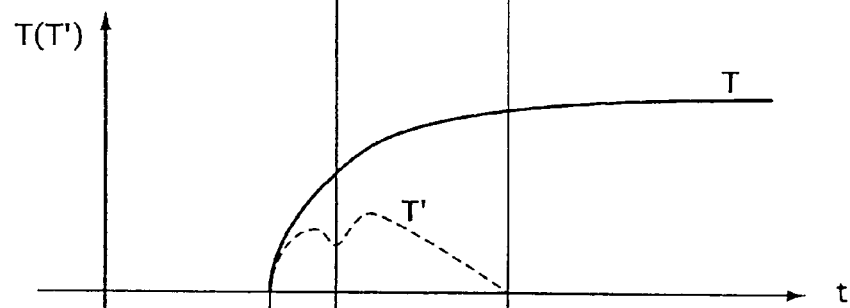
Figure 67C:
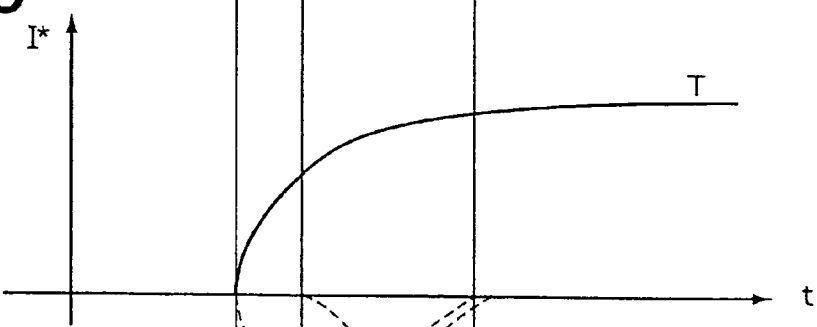
Figure 67D:
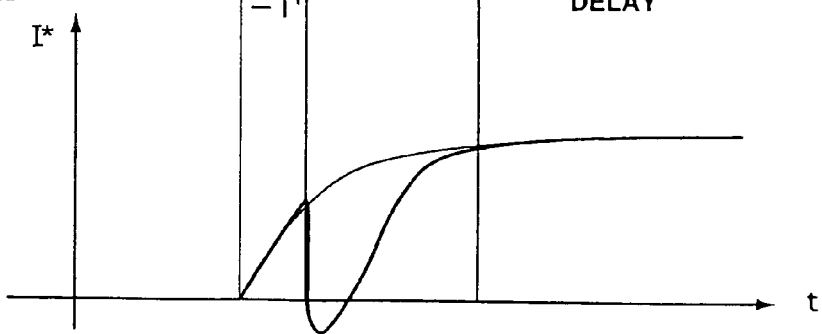

There are discussed the signal patterns of the seventeenth embodiment with reference to FIGS. 67A, 67B, 67C and 67D. By adding the product of the first-order differential T' of the steering torque T and the negative gain $K_1$ and the product of the first-order delay of the steering speed θ and the negative gain $K_2$ to the assist standard controlled variable according to the steering torque as shown in FIG. 67B, the motor command signal I* is obtained and has a wave form having the inverse assist and the delay as shown in FIG. 67D.

Figure 68:
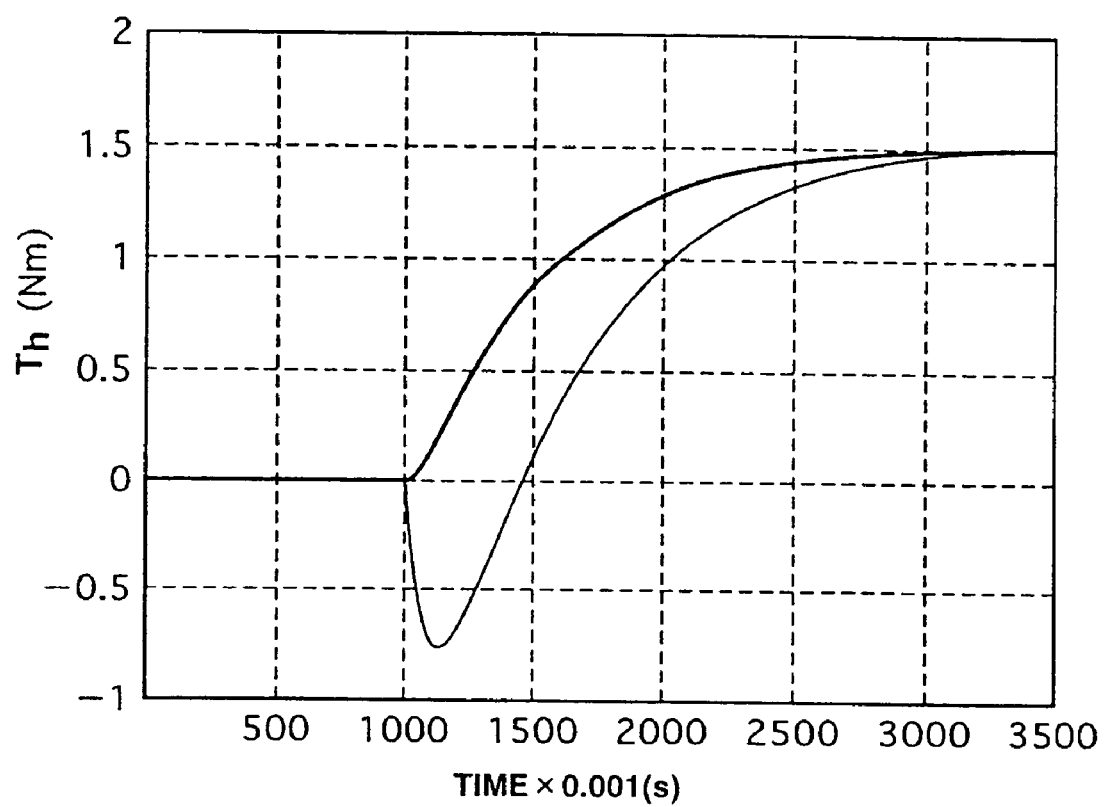
FIG. 68 is a graph showing a simulation result of the vehicular steering control apparatus of the seventeenth embodiment.

By this arrangement, it becomes possible to obtain the ideal assist characteristic which momentarily produces an assist force in the opposite direction and delays the assist relative to the rising of the steering torque. This prevents slip and radical return of steering wheel 1 during the steering-wheel operation regardless of the steering speed and the vehicle speed and realizes the improvement in a driver's safety feeling and an operability, and the stable feeling near the steering-wheel neutral position. Accordingly, the steering feeling having a further improved operability is ensured. Although this arrangement does not produce a positive-direction assist force relative to the delay of the steering angle, it effectively functions relative to the quick steer during the high speed running and the slip prevention. FIG. 68 shows a simulation result of the seventeenth embodiment in case that gain $K_1$ is 1000 and gain $K_2$ is −1.

Next, there is discussed an effect of the seventeenth embodiment. The vehicular steering control apparatus of the seventeenth embodiment obtains the following effect.

(40) Since the compensation control means (blocks 102 trough 104 and blocks 201 through 203) is arranged to calculate the damping correction controlled variable on the basis of the first-order differential of the steering torque, it becomes possible to obtain the ideal assist characteristic of delaying the assist relative to the rising of the steering torque. Therefore, slip and radical return of steering wheel 1 are prevented during the steering-wheel operation regardless of the steering speed and the vehicle speed, and the improvement in a driver's safety feeling, an operability, and the stable feeling near the steering-wheel neutral position are improved.

Eighteenth Embodiment

An eighteenth embodiment according to the present invention is specifically arranged to set the damping controlled variable determined by the first-order differential and the first-order delay of the steering speed as the function of the vehicle speed.

Next, there is discussed the operation of the eighteenth embodiment.

[Motor Command Value Calculation]

Figure 69:
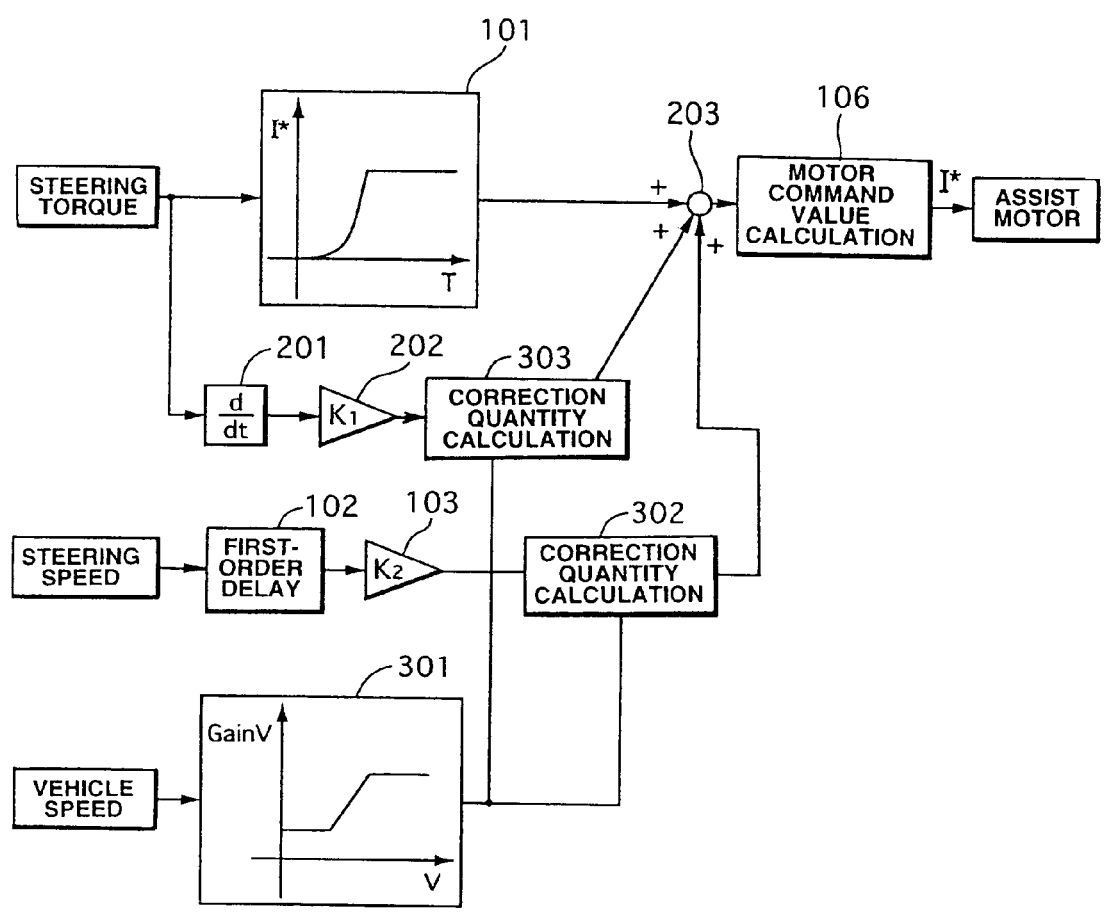
FIG. 69 is a control block diagram showing the motor command value calculation control of the vehicular steering control apparatus of an eighteenth embodiment.

FIG. 69 shows a block diagram of the motor command value calculation control. The same blocks as those shown in FIG. 66 are denoted by the same reference numerals, and the explanation thereof is omitted herein.

Block 301 set a control-variable gain GainV on the basis of the detected vehicle speed. As shown in block 301, the controlled-variable gain GainV is set to have a small value in a low vehicle speed range and a large value in a high vehicle speed range. Block 302 obtains the damping correction controlled variable by multiplying the output of block 103 by the controlled-variable gain GainV. Block 303 obtains the damping correction controlled variable by multiplying the output of block 202 by the controlled-variable gain GainV. The compensation controlling means is constructed by blocks 102, 103, 201 through 203 and 301 through 303.

Figure 70:
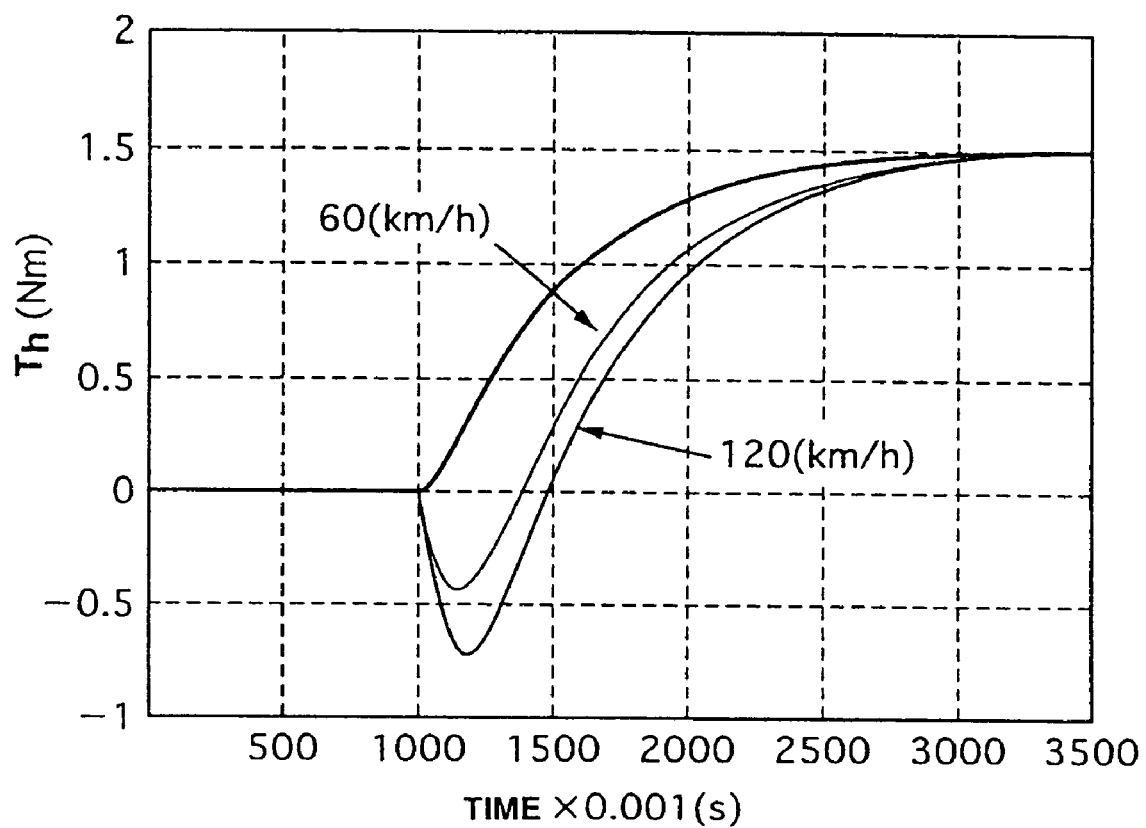
FIG. 70 is a graph showing a damping improving operation of the vehicular steering control apparatus of the eighteenth embodiment.

By this arrangement, it becomes possible to obtain the ideal assist characteristic which momentarily produces an assist force in the opposite direction and delays the assist relative to the rising of the steering torque. This prevents slip and radical return of steering wheel 1 during the steering-wheel operation regardless of the steering speed and the vehicle speed and realizes the improvement in a driver's safety feeling and an operability, and the stable feeling near the steering-wheel neutral position. Accordingly, the steering feeling having a further improved operability is ensured. Specifically, it becomes possible to execute the damping control according to the vehicle speed, and to effectively and certainly execute the damping in the high speed range where the damping is required, as shown in FIG. 70.

Next, there is discussed an effect of the eighteenth embodiment. The vehicular steering control apparatus of the eighteenth embodiment obtains the following effect in addition to the effects of the seventeenth embodiment.

(41) Since the eighteenth embodiment comprises the vehicle speed sensor 14 of detecting the vehicle speed and a compensation control means for decreasing the damping correction controlled variable when the steering speed is in the low speed range and increasing the damping correction controlled variable when the steering speed is in the high speed range, it is possible to execute the damping control according to the vehicle speed. Accordingly, it becomes possible to certainly improve the damping in the high speed range where the damping is required.

Nineteenth Embodiment

A nineteenth embodiment according to the present invention is specifically arranged to determine the damping correction controlled variable according to the steering angle and the steering torque, that is, to set the damping correction controlled variables as a function of the steering angle and the steering torque, in addition to the arrangement of the seventeenth embodiment.

Next, there is discussed the operation of the nineteenth embodiment.

[Motor Command Value Calculation]

Figure 71:
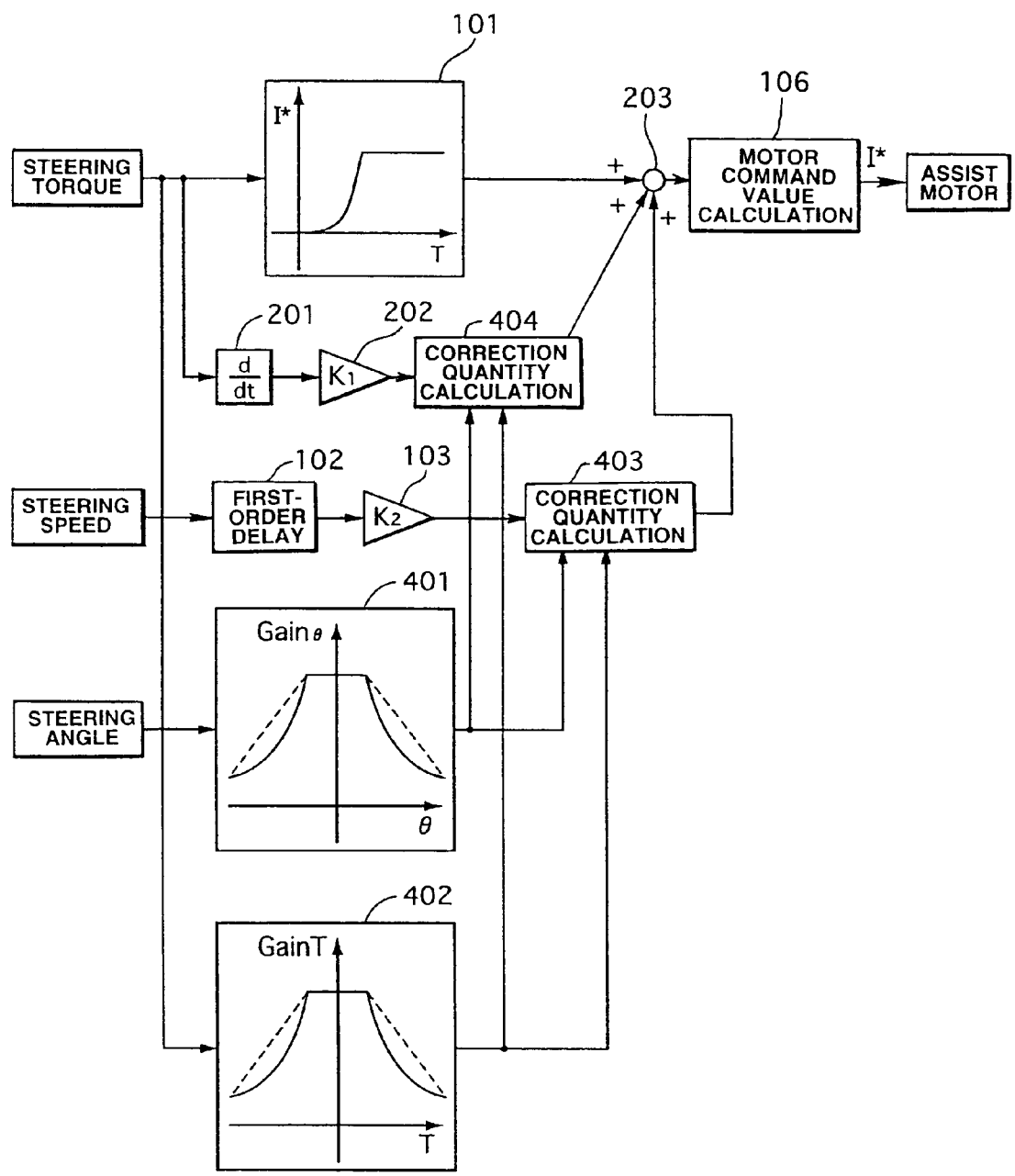
FIG. 71 is a control block diagram showing the motor command value calculation control of the vehicular steering control apparatus of a nineteenth embodiment.

FIG. 71 shows a block diagram of a motor command value calculation control of the nineteenth embodiment. The same blocks as those of the seventeenth embodiment shown in FIG. 6 are denoted by the same reference numerals, and the explanation thereof is omitted herein.

Block 401 sets the controlled-variable gain Gainθ on the basis of the detected steering angle. The controlled-variable gain Gainθ is set so as to be large in a steering-angle small range and to be small in a steering-angle large range as shown by block 401 in FIG. 71. Block 402 sets the controlled-variable gain GainT on the basis of the detected steering torque. The controlled-variable gain GainT is set so as to be large in a steering-torque small range and to be small in a steering-torque large range as shown by block 402 in FIG. 71.

Block 403 obtains the damping correction controlled variable by multiplying the output of block 103 by the product of the controlled-variable gain Gainθ set at block 401 and the controlled-variable gain GainT set at block 402. Block 404 obtains the damping correction controlled variable by multiplying the output of block 202 by the product of the controlled-variable gain Gainθ set at block 401 and the controlled-variable gain GainT set at block 402. The compensation controlling means is constructed by blocks 102, 103, 201 through 203, and 401 through 404.

Next, there is discussed the effects of the nineteenth embodiment. The vehicular steering control apparatus of the nineteenth embodiment obtains the following effects in addition to those in the seventeenth embodiment.

(42) Since the compensation controlling means, which is constructed by blocks 102, 103, 201 through 203, and 401 through 404, is arranged to increase the damping correction controlled variable in the steering-torque small range as compared with that in the steering-torque large range, it becomes possible to prevent the damping quantity from largely changing according to the magnitude of the steering torque.

(43) Since the compensation controlling means, which is constructed by blocks 102, 103, 201 through 203, and 401 through 404, is arranged to increase the damping correction controlled variable in the steering-angle small range as compared with that in the steering-angle large range, it becomes possible to prevent the damping quantity from largely changing according to the magnitude of the steering torque.

Twentieth Embodiment

A twentieth embodiment according to the present invention is specifically arranged to calculate the damping correction controlled variable on the basis of the first-order differential signal of the vehicle behavior (first-order differential signal of the yaw rate and first-order differential signal of the lateral acceleration) instead of the first-order delay signal of the steering speed.

Figure 72:
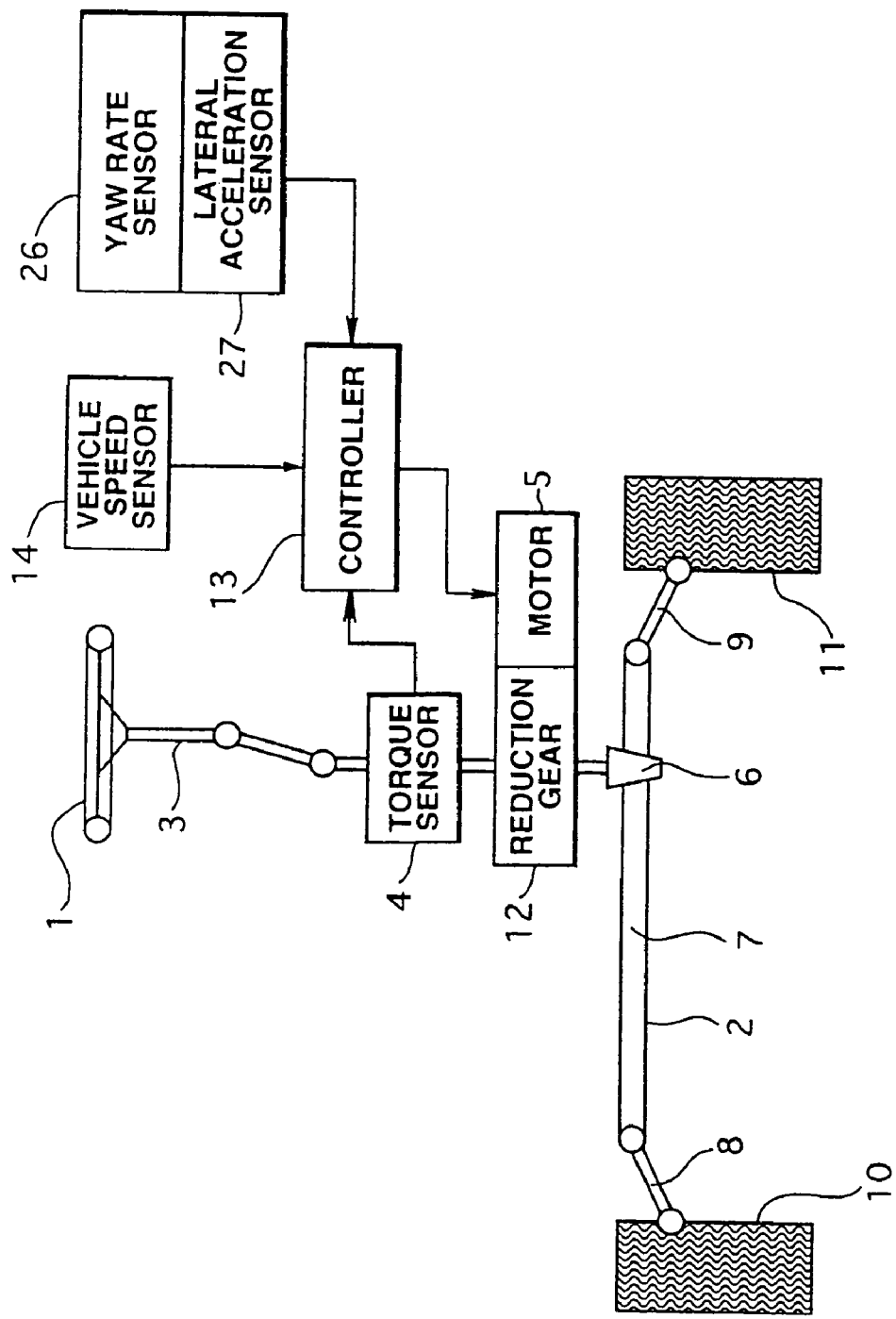
FIG. 72 is a view showing an electric power steering apparatus which employs the vehicle steering control apparatus according to a twenty embodiment.

FIG. 72 shows a whole view of an electric power steering apparatus which employs the vehicular steering control apparatus according to the twentieth embodiment of the present invention. A steering system of the electric power steering apparatus further comprises a yaw rate sensor 26 for detecting a yaw rate and a lateral acceleration sensor 27 for detecting a lateral acceleration of the vehicle in addition to the construction of the first embodiment shown in FIG. 1.

Twentieth Embodiment

Next, there is discussed the operation of the twentieth embodiment.

[Motor Command Value Calculation]

Figure 73:
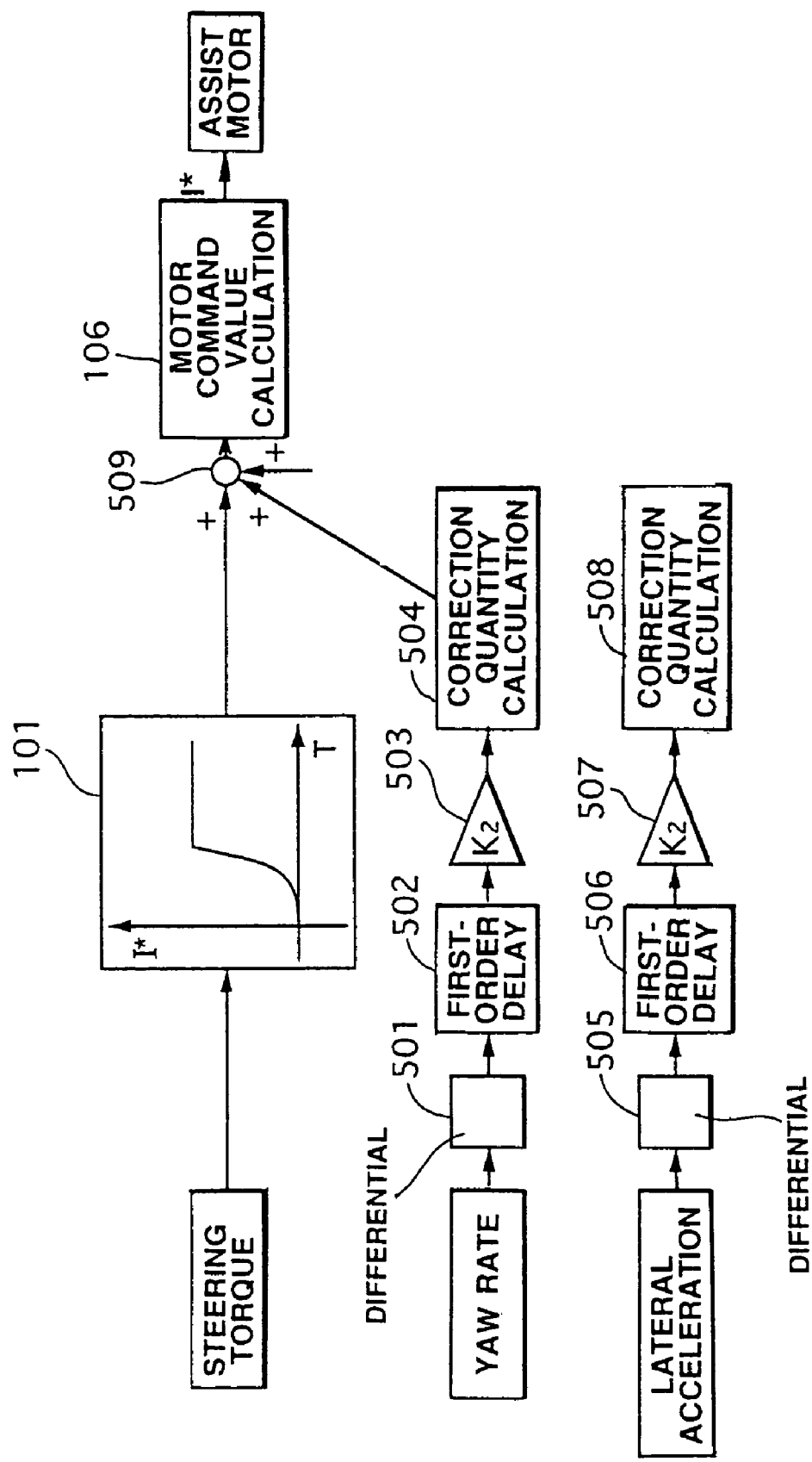
FIG. 73 is a control block diagram showing the motor command value calculation control of the vehicular steering control apparatus of the twenty embodiment.

FIG. 73 shows a block diagram of the motor command value calculation control. The same block as those shown in FIG. 59 are denoted by the same reference numerals, and the explanation thereof is omitted herein.

Block 501 obtains the first-order differential of the detected yaw rate. Block 502 processes the first-order differential of the yaw rate by the first-order delay. Block 503 multiplies the output of block 502 by the negative gain $K_2$. Block 504 calculates the damping correction controlled variable from the output of block 503.

Block 505 obtains a first-order differential of the detected lateral acceleration. Block 506 processes the first-order differential of the lateral acceleration by the first-order delay. Block 507 multiplies the output of block 506 by the negative gain $K_2$. Block 508 calculates the damping correction controlled variable from the output of block 507. Block 509 adds the two damping correction controlled variables outputted from blocks 504 and 508 to the motor command value outputted block 101. The compensation controlling means is constructed by blocks 102 and 501 through 509.

Next, there is discussed the effect of the twentieth embodiment. The vehicular steering-control apparatus of the twentieth embodiment obtains the following effect.

(44) Since there are provided the vehicle behavior detecting means (yaw rate sensor 36 and lateral acceleration sensor 27) for detecting the vehicle behavior (yaw rate and lateral acceleration), and the compensation controlling means (blocks 102 and 501 through 509) of calculating the damping correction controlled variable on the basis of the first-order differential of the detected vehicle behavior (yaw rate and lateral acceleration), it becomes possible to obtain the ideal assist characteristic of delaying the assist relative to the rising of the steering torque. This prevents slip and radical return of steering wheel 1 during the steering-wheel operation regardless of the steering speed and the vehicle speed and realizes the improvement in a driver's safety feeling and an operability, and the stable feeling near the steering-wheel neutral position.

Twenty-First Embodiment

A twenty-first embodiment is specifically arranged to limit the damping correction controlled variable by a limit value.

[Motor Command Value Calculation]

Figure 74:
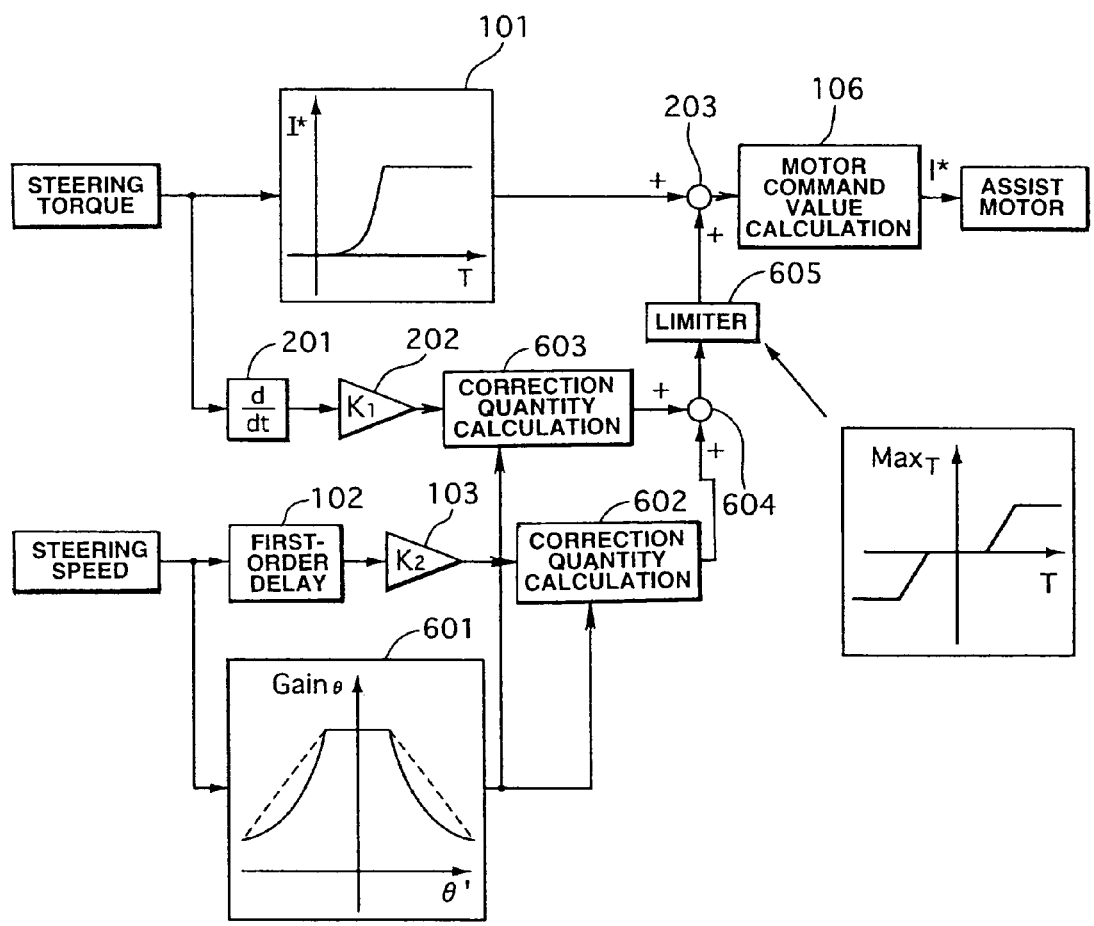
FIG. 74 is a control block diagram showing the motor command value calculation control of the vehicular steering control apparatus of a twenty-first embodiment.

FIG. 74 shows a block diagram of the motor command value calculation control of the twenty-first embodiment. The same blocks as those shown in FIG. 69 are denoted by the same reference numerals, and the explanation thereof is omitted herein.

Block 601 sets a controlled-variable gain Gainθ' on the basis of the steering speed. The controlled-variable gain Gainθ' is set at a large value when the steering speed θ' is low, and at a value which decreases as the steering speed θ' increases. Block 602 obtains the damping correction controlled variable by multiplying the output of block 103 by controlled-variable gain Gainθ' set at block 601. Block 603 obtains the damping correction controlled variable by multiplying the output of block 202 by controlled-variable gain Gainθ' set at block 601. Block 604 adds the damping correction controlled variable outputted from block 602 to the damping correction controlled variable outputted from block 603.

Block 605 sets a limit value relative to the output of block 604 using a limiter so as not to become out of a proper range as a correction value. The limiter of block 605 takes 0 when the steering torque T is small and a predetermined value when the steering torque T is large. Between these values of the steering torque, the limit value increases in proportion to the steering torque T. The compensation control means is constructed by blocks 102, 103, 201 through 203 and 601 through 605.

Next, there is discussed an effect of the twenty-first embodiment. The vehicular steering control apparatus of the twenty-first embodiment obtains the following effect.

(45) Since the compensation controlling means (blocks 102, 103, 201 through 203, and 601 through 605) is arranged to set the limit value relative to the damping correction controlled variable, it is possible to prevent the assist from being excessively executed for the reason of malfunction of motor 5, sensors and a command system, and to suppress the degradation of the steering feeling.

Twenty-Second Embodiment

A twenty-second embodiment according to the present invention is specifically arranged to determine the damping correction controlled variable by multiplying the steering speed by a negative gain in one of the sixteenth embodiment through twenty-first embodiment. Further, the inverse assist quantity for increasing the driver's steering torque is limited by a limit value.

Figure 75:
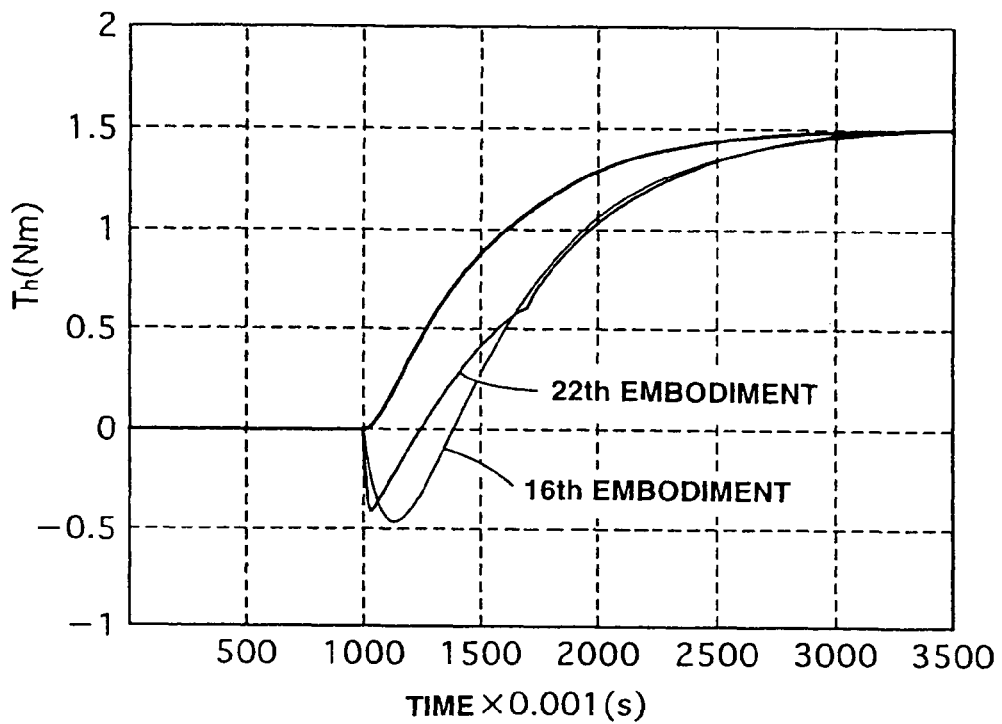
FIG. 75 is a graph showing a simulation result of the vehicular steering control apparatus of a twenty-second embodiment.

FIG. 75 shows simulation results of the twenty-second embodiment and the sixteenth embodiment as a comparative example. As is clearly shown in FIG. 75, the simulation result of the twenty-second embodiment shows the responsibility of the inverse assist and the magnitude thereof are easily determined as compared with those of the sixteenth embodiment. Consequently, the twenty-second embodiment improves the operability and the steering feeling when the feedback of the steering torque is the important information for the driver when the vehicle speed is high.

Twenty-Third Embodiment

Figure 76:
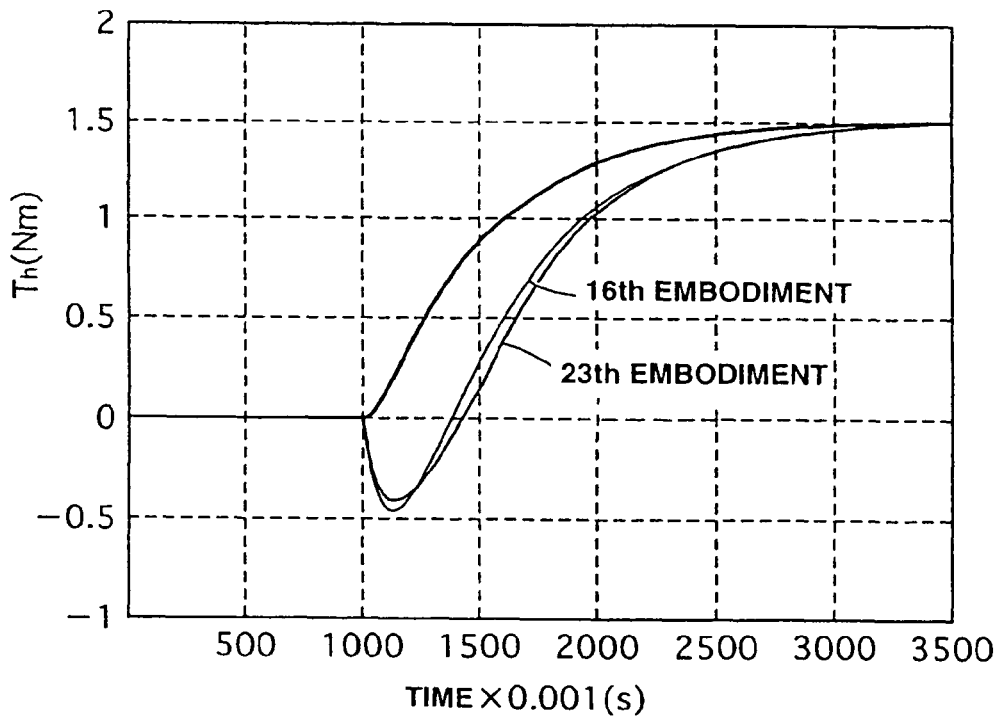
FIG. 76 is a graph showing a simulation result of the vehicular steering control apparatus of a twenty-third embodiment.

A twenty-third embodiment is arranged to determine the damping correction controlled variable from the first-order delay of the steering speed and the product of the steering speed and a proper negative gain in addition to the arrangement of the twenty-second embodiment. FIG. 76 shows simulation results of the twenty-third embodiment and the sixteenth embodiment as a comparative example. The simulation result of the twenty-second embodiment shows that the inverse assist quantity becomes large as compared to that of one of the sixteenth embodiment through twenty-first embodiment. Accordingly, when the vehicle runs in the high speed range where the feedback of the steering torque is the important information for the driver, the operability and the steering feeling are improved.

Twenty-Fourth Embodiment

A twenty-fourth embodiment is specifically arranged to comprise a dead zone relative to each of the steering torque signal and the steering speed signal and to limit the damping correction quantity by a limit.

Next, there is discussed the operation of the twenty-fourth embodiment.

[Motor Command Value Calculation]

Figure 77:
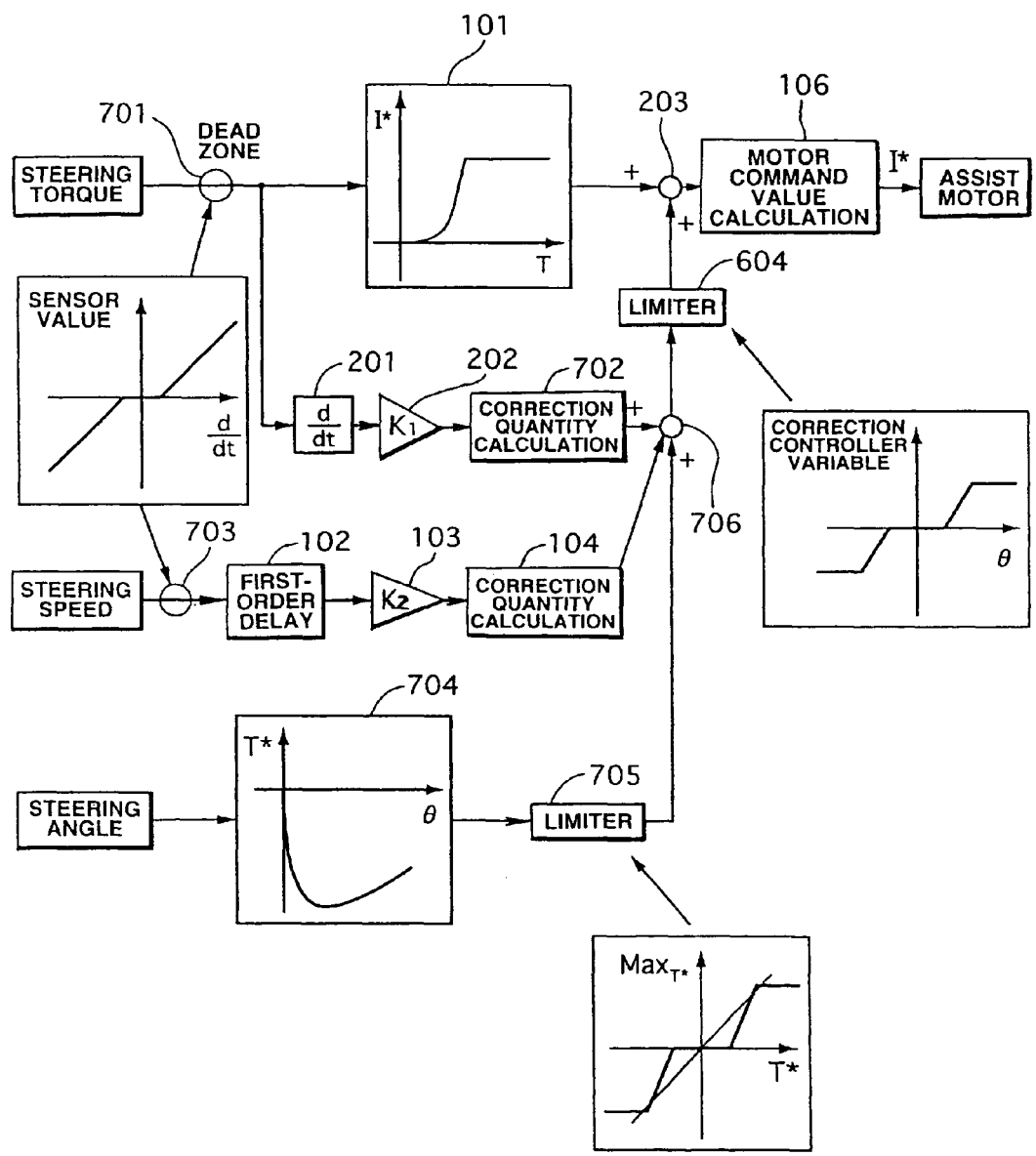
FIG. 77 is a control block diagram showing the motor command value calculation control of the vehicular steering control apparatus of a twenty-fourth embodiment.

FIG. 77 shows a block diagram of the motor command value calculation control. The same blocks as those shown in FIG. 74 are denoted by the same reference numeral, and the explanation thereof is omitted herein.

Block 701 sets the dead zone relative to the steering torque. Block 702 calculates the damping correction controlled variable from the output of block 202. Block 703 sets the dead zone relative to the steering speed. Block 704 calculates a target torque T* form the steering angle. The target torque T* is set at a negative value as shown by block 704 in FIG. 77. When the steering angle θ is smaller than or equal to a predetermined small angle, the target torque T* decreases as the steering angle θ increases. When the steering angle θ is greater than a predetermined small angle, the target torque T* increases as the steering angle θ increases.

Block 705 sets a limit value relative to the output of block 704 using a limiter. With this arrangement, it becomes possible to prevent the output of block 704 from becoming out of the proper range as a correction quantity. The limiter is set such that the limit value is set at 0 when the target torque T* is smaller than a first predetermined value, the limit value is set at a predetermined value when the target torque T* is greater than a second predetermined value greater than the first predetermined value, and the limit value increases in proportion to the increase of the target torque T* when the target torque T* is in a range between the first predetermined value and the second predetermined value.

Block 706 obtains the sum of the damping correction controlled variable of block 104, the damping correction controlled variable of bloc 702 and the output of block 705. The compensation controlling means is constructed by blocks 102 through 104, 201 through 203, 604, and 701 through 706.

That is, since the vehicular steering control apparatus of the twenty-fourth embodiment is arranged to set the dead zone (blocks 701 and 702) relative to the sensor signal, it become possible to prevent the inverse assist from being produced in response to noise, disturbance, slight sideward movement, or road cant, and thereby preventing the degradation of the operability and the steering feeling thereby.

Although the embodiments according to the present invention have been shown and described such that the steering speed is estimated using the counter electromotive force of motor 5, the steering speed may be obtained by attaching an angle sensor to steering wheel 1 and by obtaining a differential of an output of the angle sensor as a steering speed, or an angular speed sensor such as a tacho-generator may be attached to steering wheel 1. Further, a sensor for directing measuring an angle or angular speed of motor 5 may be provided.

Although the embodiments according to the present invention have been shown and described such that the phase compensation is first-order/first-order function represented by the expression $(K-\tau\text{num}\cdot S)/(1+\tau\text{den}\cdot S)$, this arranged is based on the essential concept that the steering torque is assisted in the opposite direction as the frequency increases. Accordingly, as far as the characteristic that the phase delay increases and the phase is inversed as the frequency increase, the other modification of the characteristic may be employed. For example, a high-order transfer function (strict solution) shown by a broken line in FIG. 11 may be employed, or only a delay factor shown by a dot-and-dash line in FIG. 14 may be employed. Further a dead time shown by a two-dots and dash line in FIG. 14 may be employed.

Although the embodiments according to the present invention have been shown and described such that the first-order advance time constant τnum of phase compensator 15 is changed according to the steering toque, the vehicle speed and the steering speed, the first-order advance time constant τnum may be changed according to at least one of the steering torque, the vehicle speed and the steering speed.

Although the embodiments according to the present invention have been shown and described such that such that the first-order delay time constant τden of phase compensator 15 is changed according to the steering toque, the vehicle speed and the steering speed, the first-order delay time constant τden may be changed according to at least one of the steering torque, the vehicle speed and the steering speed.

Although the steering state determining section 17 of the fourth embodiment has been arranged to employ the algorithm based on the polarities of the steering torque and the steering speed, the invention is not limited to this algorithm, and other determination method or signal may be employed.

Although the steering holding state determining section 20 of the sixth embodiment has been arranged to employ the algorithm based on the steering torque and the steering speed, the invention is not limited to this algorithm, and other determination method or signal may be employed.

Although the fourteenth embodiment according to the present invention has been shown and described such that the characteristic of the controlling section 20 is changed only according to the vehicle speed, the characteristic may be changed according to the steering angel, the steering force or the steering speed.

Although the twenty embodiment according to the present invention ahs been shown and deceased such that the first-order differentials of the yaw rate signal and the lateral acceleration signal are employed as the first differential signal of the vehicle behavior, the first-order differential signal of a vehicle side-slip angle may be employed as the first-order differential signal of the vehicle behavior.

Although the embodiments according to the present invention have been shown and described by the vehicular steering control apparatus which is applied to a motor assist control of an electric power steering apparatus, the invention is not limited by these embodiment, and it may be applied to an hydraulic assist torque control of a hydraulic power steering apparatus which is capable of producing an inverse assist by the control of a solenoid valve, to a reaction force control of a steering reaction force actuator of a steer-by-wire control system and to a steering angle holding control of a system provided with an actuator of applying an auxiliary steering angle to steered wheels. That is, the invention is applicable to a vehicle which comprises a torque-control actuator of a steering system including a steering torque inputting means (steering wheel), and a steering controlling means.

This application is based on Japanese Patent Applications No. 2004-280340 filed on Sep. 27, 2004 and No. 2005-106519 filed on Apr. 1, 2005 in Japan. The entire contents of these Japanese Patent Applications are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. A vehicular steering control apparatus comprising:
    a steering system receiving a steering torque inputted by a driver;
    a torque control actuator connected to the steering system to produce an actuator torque relative to the steering torque; and
    a steering controlling section connected to the torque control actuator, and programmed to:
    set a parameter so as to achieve a desired static gain of the actuator torque relative to the steering torque;
    increase a gain of the actuator torque relative to the steering torque from the static gain as the frequency of the inputted steering torque increases;
    increase a phase delay of the actuator torque relative to the steering torque toward about 180° as the frequency of the inputted steering torque increases; and
    output the actuator torque by the torque control actuator.

2. The vehicular steering control apparatus as claimed in claim 1, wherein the steering controlling section is programmed to set the phase delay to reach about 180° as the frequency of the inputted steering torque increases.

3. The vehicular steering control apparatus as claimed in claim 1, wherein the steering controlling section is programmed to maintain the phase delay at about 180° when the frequency of the steering torque is higher than or equal to a reference value.

4. The vehicular steering control apparatus as claimed in claim 1, wherein the steering controlling section is programmed to maintain the phase delay at about 180° when the frequency of the steering torque is higher than or equal to a reference value.

5. The vehicular steering control apparatus as claimed in claim 1, wherein the steering controlling section is programmed to obtain the frequency characteristic using a phase compensating section which compensates a phase delay and a phase advance which are determined by a vehicle and the steering system.

6. The vehicular steering control apparatus as claimed in claim 5, wherein the phase compensating section includes a first-order-advance/first-order-delay phase compensator which exhibits a characteristic expressed by the following expression:

$$(K-\tau num \cdot S)/(1+\tau den \cdot S)$$

wherein S is a Laplace operator, K is a gain ($=0, >0, <0$), τnum is a first-order advance time constant ($\geq 0$) and τden is a first-order delay time constant ($\geq 0$).

7. The vehicular steering control apparatus as claimed in claim 6, wherein the phase compensating section sets the first-order-advance time constant τnum so as to increase as the steering torque increases.

8. The vehicular steering control apparatus as claimed in claim 6, wherein the phase compensating section sets the first-order-advance time constant τnum so as to increase as a vehicle speed increases.

9. The vehicular steering control apparatus as claimed in claim 6, wherein the phase compensating section sets the first-order-advance time constant τnum so as to increase as a steering speed increases.

10. The vehicular steering control apparatus as claimed in claim 6, wherein the phase compensating section sets the first-order-delay time constant τden so as to change according to at least one of the steering torque, the vehicle speed and the steering speed.

11. The vehicular steering control apparatus as claimed in claim 6, wherein the phase compensating section sets the first-order-advance time constant τnum at a constant value when the steering torque is smaller than a first set value, at a value which increases according to the increase of the steering torque when the steering speed is in a steering range from the first set value to a second set value, and a value which decreases according to the increase of the steering torque when the steering torque is greater than the second set value.

12. The vehicular steering control apparatus as claimed in claim 6, wherein the phase compensating section sets the first-order-advance time constant τnum at a constant value when the steering speed is lower than a first set value, a value which increases according to the increase of the steering speed when the steering speed is in a steering range from the first set value to a second set value, and a value which decreases according to the increase of the steering speed when the steering speed is higher than the second set value.

13. The vehicular steering control apparatus as claimed in claim 6, wherein the phase compensating section executes the phase compensation control by factoring the expression (K−τnum·S)/(1+τden·S) into K/(1+τden·S)+(−τnum·S)/(1+τden·S) and by executing a first-order delay expressed by K/(1+τden·S) and an approximation differential compensation expressed by (−τnum·S)/(1+τden·S).

14. The vehicular steering control apparatus as claimed in claim 5, further comprising a steering-wheel turn/return determining section which determine whether a steering state is a steering-wheel turning state or steering-wheel returning state, wherein the phase compensating section limits a controlled variable by a first limit value during a steering-wheel turning state, and limits the controlled variable by a second limit value, which is smaller than the first limit value, during a steering-wheel returning state.

15. The vehicular steering control apparatus as claimed in claim 5, further comprising a steering-wheel turn/return determining section which determines whether a steering state is a steering-wheel turning state or steering-wheel returning state, wherein the phase compensating section multiplies a controlled output by a first gain during a steering-wheel turning state, and multiplies the controlled output by a second gain, which is smaller than the first gain, during a steering-wheel returning state.

16. The vehicular steering control apparatus as claimed in claim 5, further comprising a steering-wheel holding state determining section which determines whether a steering wheel is put in a holding state, wherein the phase compensating section increases a control gain immediately after the steering wheel is held.

17. The vehicular steering control apparatus as claimed in claim 5, further comprising a steering-wheel holding state determining section which determines whether a steering wheel is put in a holding state, wherein the phase compensating section decreases a phase compensation quantity during the steering-wheel holding state as compared with the phase compensation quantity during the steering-wheel steering state.

18. The vehicular steering control apparatus as claimed in claim 17, wherein the phase compensating section sets the phase compensation quantity during the steering-wheel holding state at 0.

19. The vehicular steering control apparatus as claimed in claim 17, wherein the phase compensating section decreases the phase compensation quantity according to an elapsed time from a moment that a steering state is changed from the steering-wheel steering state to the steering-wheel holding state.

20. The vehicular steering control apparatus as claimed in claim 19, wherein the phase compensating section converges the phase compensation quantity to 0.

21. The vehicular steering control apparatus as claimed in claim 5, further comprising a hand release determining section which determines whether a driver's hand is released from the steering wheel, wherein the phase compensating section increases the phase compensation quantity during the hand release state as compared with the phase compensation quantity during a non-hand-release state.

22. The vehicular steering control apparatus as claimed in claim 21, wherein the phase compensating section increases the phase compensation quantity during the hand release state as one of a driving speed of the actuator and a vehicle behavior increases.

23. The vehicular steering control apparatus as claimed in claim 21, wherein the phase compensating section increases the phase compensation quantity during the hand release state as the vehicle speed increases.

24. The vehicular steering control apparatus as claimed in claim 21, further comprising an estimated steering torque calculating section which calculates an estimated steering torque during the hand release state, wherein the phase compensating section decreases the phase compensation quantity during the hand release state as the estimated steering torque during the hand release state increases.

25. The vehicular steering control apparatus as claimed in claim 24, wherein the phase compensating section converges the phase compensation quantity during the hand release state to the phase compensation quantity during the non-hand-release state as the estimated steering torque during the hand release state increases.

26. The vehicular steering control apparatus as claimed in claim 5, further comprising a road friction coefficient estimating section which estimates a road friction coefficient of a running road from the steering input and the vehicle behavior, wherein the phase compensating section increases the phase delay quantity as the road friction coefficient decreases.

27. The vehicular steering control apparatus as claimed in claim 26, wherein the phase compensating section is a first-order-advance/first-order-delay phase compensator for setting a second command value and has the characteristic represented by a transfer function:

$$(K-\tau num \cdot S)/(a+\tau den \cdot S)$$

wherein S is a Laplace operator, K is a gain (≧0), τnum is a first-order advance time constant (≧0), a is a constant (>0) and τden is a first-order delay time constant (≧0).

28. The vehicular steering control apparatus as claimed in claim 27, wherein the phase compensating section decreases the gain K as the road friction coefficient decreases.

29. The vehicular steering control apparatus as claimed in claim 27, wherein the phase compensating section increases the first-order advance time constant τnum as the road friction coefficient decreases.

30. The vehicular steering control apparatus as claimed in claim 27, wherein the phase compensating section increases the first-order delay time constant τden as the road friction coefficient decreases.

31. The vehicular steering control apparatus as claimed in claim 26, wherein the phase compensating section increases the phase delay as the vehicle speed increases.

32. The vehicular steering control apparatus as claimed in claim 26, wherein the phase compensating section increases the phase compensation quantity as the vehicle speed increases.

33. The vehicular steering control apparatus as claimed in claim 2, wherein the steering controlling section is programmed to set a torque command value for the actuator on the basis of a negative first command value of decreasing a gain of the actuator torque relative to the steering torque as the frequency of the steering torque increases and a second command value of approaching the phase delay of the actuator torque relative to the steering torque as the frequency of the steering torque increases.

34. The vehicular steering control apparatus as claimed in claim 33, wherein the steering controlling section is programmed to set a delay time constant ($\tau 1$) of the first command value at a value greater than a delay time constant ($\tau den$) of the second command value.

35. The vehicular steering control apparatus as claimed in claim 33, wherein the steering controlling section comprises a first-order-advance/first-order-delay phase compensator for setting the second command value and having the characteristic represented by the following transfer function:

$$(K - \tau num \cdot S)/(a + \tau den \cdot S)$$

wherein S is a Laplace operator, K is a gain ($\geq 0$), $\tau num$ is a first-order advance time constant ($\geq 0$), a is a constant ($>0$) and $\tau den$ is a first-order delay time constant ($\geq 0$).

36. The vehicular steering control apparatus as claimed in claim 33, wherein a phase compensating section includes an approximation differential.

37. The vehicular steering control apparatus as claimed in claim 33, wherein the steering controlling section is programmed to increase an absolute value of a gain of at least one of the first command value and the second command value as the vehicle speed increases.

38. The vehicular steering control apparatus as claimed in claim 33, wherein the steering controlling section comprises a limit for limiting at least one of the first command value and the second command value.

39. The vehicular steering control apparatus as claimed in claim 33, wherein the steering controlling section comprises a dead zone for at least one of the first command value and the second command value.

40. The vehicular steering control apparatus as claimed in claim 4, further comprising a steering speed detecting section which detects a steering speed,
wherein the steering controlling section comprises a compensation controlling section which calculates a damping correction controlled variable on the basis of a first-order delay of the detected steering speed and for executing a compensation control of the actuator on the basis of the damping correction quantity and a basic controlled variable according to the steering torque.

41. The vehicular steering control apparatus as claimed in claim 40, wherein the compensation controlling section calculates the damping correction quantity on the basis of a first-order differential of the steering torque.

42. The vehicular steering control apparatus as claimed in claim 40, further comprising a vehicle behavior detecting section which detects a vehicle behavior,
wherein the compensation controlling section calculates the damping correction quantity on the basis of a first-order differential of the detected vehicle behavior.

43. The vehicular steering control apparatus as claimed in claim 40, further comprising a vehicle speed detecting section which detects a vehicle speed,
wherein the compensation controlling section decreases the damping correction controlled variable when the detected vehicle speed is in a high speed range, and increase the damping correction controlled variable when the detected vehicle speed is in a low speed range.

44. The vehicular steering control apparatus as claimed in claim 40, wherein the compensation controlling section increases the damping correction controlled variable when the steering speed is in a low speed range, as compared with the damping correction controlled variable when the steering speed is in a high speed range.

45. The vehicular steering control apparatus as claimed in claim 40, wherein the compensation controlling section increases the damping correction controlled variable when the steering torque is in a low torque range, as compared with the damping correction controlled variable when the steering torque is in a high torque range.

46. The vehicular steering control apparatus as claimed in claim 40, wherein the compensation controlling section increases the damping correction controlled variable when the steering angle is in a small angle range, as compared with the damping correction controlled variable when the steering angle is in a large angle range.

47. The vehicular steering control apparatus as claimed in claim 40, wherein the compensation controlling section is arranged to provide a dead zone at an output side of each detecting means for calculating the damping correction controlled variable.

48. The vehicular steering control apparatus as claimed in claim 40, wherein the compensation controlling section limits the damping correction controlled variable by a limit value.

49. A method of controlling a vehicular steering through a steering system which receives a steering torque inputted by a driver and a torque control actuator which is connected to the steering system to produce an actuator torque relative to the steering torque, the method comprising:
setting a parameter so as to achieve a desired static gain of the actuator torque relative to the steering torque;
increasing a gain of the actuator torque relative to the steering torque from the static gain as the frequency of the inputted steering torque increases;
increasing a phase delay of the actuator torque relative to the steering torque toward about 180° as the frequency of the inputted steering torque increases; and
outputting the actuator torque by the torque control actuator.

50. The method as claimed in claim 49, further comprising:
setting the phase delay to reach about 180° as the frequency of the inputted steering torque increases.

51. A vehicular steering control apparatus comprising:
steering means for receiving a steering torque inputted by a driver;
torque actuating means for producing an actuator torque relative to the steering torque; and
steering controlling means for controlling the torque actuating means, the steering controlling means setting a parameter so as to achieve a desired static gain of the actuator torque relative to the steering torque, increasing a gain of the actuator torque relative to the steering torque from the static gain as the frequency of the inputted steering torque increases, and increasing a phase delay of the actuator torque relative to the steering torque toward about 180° as the frequency of the inputted steering torque increases.

52. The vehicular steering control apparatus as claimed in claim 51, wherein
the steering controlling means sets the phase delay to reach about 180° as the frequency of the inputted steering torque increases.

53. The vehicular steering control apparatus as claimed in claim 1, wherein the steering controlling section is programmed to increase the parameter so as to increase the static gain of the actuator torque relative to the steering torque as the frequency of the inputted steering torque increases.

* * * * *